US008868374B2

(12) United States Patent
Khosravy et al.

(10) Patent No.: US 8,868,374 B2
(45) Date of Patent: *Oct. 21, 2014

(54) DATA SERVICES BASED ON GESTURE AND LOCATION INFORMATION OF DEVICE

(71) Applicant: Microsoft Corporation, Redmond, WA (US)

(72) Inventors: Moe Khosravy, Bellevue, WA (US); Lev Novik, Bellevue, WA (US); Katrika Marie Morris, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,737

(22) Filed: Jun. 3, 2013

(65) Prior Publication Data

US 2013/0265223 A1   Oct. 10, 2013

Related U.S. Application Data

(63) Continuation of application No. 12/437,857, filed on May 8, 2009, now Pat. No. 8,467,991.

(60) Provisional application No. 61/074,415, filed on Jun. 20, 2008, provisional application No. 61/074,590, filed on Jun. 20, 2008.

(51) Int. Cl.
*G01C 21/32* (2006.01)
*H04W 4/20* (2009.01)
(Continued)

(52) U.S. Cl.
CPC ............... *G06F 3/017* (2013.01); *H04W 4/206* (2013.01); *H04W 4/026* (2013.01);
(Continued)

(58) Field of Classification Search
USPC ......................................... 701/211; 702/153
See application file for complete search history.

(56) References Cited

U.S. PATENT DOCUMENTS 4,262,199 A   4/1981 Bridges et al.
4,745,545 A   5/1988 Schiffleger
(Continued)

FOREIGN PATENT DOCUMENTS

WO   WO0135307      5/2001
WO   WO 02073818    9/2002
(Continued)

OTHER PUBLICATIONS

Notice of Allowance dated Oct. 29, 2013 cited in U.S. Appl. No. 12/536,889.
(Continued)

*Primary Examiner* — John Pauls
(74) *Attorney, Agent, or Firm* — Nicholas Chen; David Andrews; Micky Minhas

(57) ABSTRACT

With the addition of directional information and gesture based input in a location based services environment, a variety of service(s) can be provided on top of user identification or interaction with specific object(s) of interest. For instance, when a user gestures at or points at a particular item, or gestures at a particular location or place, this creates an opportunity, e.g., an advertising opportunity, for anyone having an interest in that particular item or place to communicate with the user regarding that item or related items at a point in time when the user's focus is on the particular item. User context for the interaction can also be taken into account to supplement the provision of one or more interactive direction based services.

20 Claims, 50 Drawing Sheets

(51) Int. Cl.
| | |
|---|---|
| *H04W 4/02* | (2009.01) |
| *H04W 4/04* | (2009.01) |
| *G01C 21/20* | (2006.01) |
| *G06F 1/16* | (2006.01) |
| *G06Q 30/02* | (2012.01) |
| *G01C 21/36* | (2006.01) |
| *G06F 3/0488* | (2013.01) |
| *G06F 3/01* | (2006.01) |

(52) U.S. Cl.
CPC ............... *H04W 4/043* (2013.01); *G01C 21/20* (2013.01); *G06F 1/1626* (2013.01); *G06Q 30/02* (2013.01); *H04W 4/023* (2013.01); *G06F 1/1694* (2013.01); *G01C 21/3664* (2013.01); *G06F 3/04883* (2013.01); *G06F 2200/1637* (2013.01)
USPC ......................................................... 702/153

(56) References Cited

U.S. PATENT DOCUMENTS

| | | |
|---|---|---|
| 5,424,524 A | 6/1995 | Ruppert et al. |
| 5,767,795 A | 6/1998 | Schaphorst |
| 5,781,908 A | 7/1998 | Williams |
| 5,892,900 A | 4/1999 | Ginter |
| 5,948,040 A | 9/1999 | DeLorme |
| 6,133,947 A | 10/2000 | Mikuni |
| 6,141,014 A | 10/2000 | Endo |
| 6,243,076 B1 | 6/2001 | Hatfield |
| 6,252,544 B1 | 6/2001 | Hoffberg |
| 6,317,688 B1 | 11/2001 | Bruckner |
| 6,317,754 B1 | 11/2001 | Peng |
| 6,321,158 B1 | 11/2001 | DeLorme |
| 6,327,533 B1 | 12/2001 | Chou |
| 6,332,127 B1 | 12/2001 | Bandera |
| 6,353,398 B1 | 3/2002 | Amin |
| 6,360,167 B1 | 3/2002 | Millington |
| 6,372,974 B1 | 4/2002 | Gross |
| 6,374,180 B1 | 4/2002 | Slominski |
| 6,381,465 B1 | 4/2002 | Chern |
| 6,381,603 B1 | 4/2002 | Chan |
| 6,421,602 B1 | 7/2002 | Bullock |
| 6,466,938 B1 | 10/2002 | Goldberg |
| 6,470,264 B2 | 10/2002 | Bide |
| 6,526,335 B1 | 2/2003 | Treyz |
| 6,542,818 B1 | 4/2003 | Oesterling |
| 6,587,835 B1 | 7/2003 | Treyz et al. |
| 6,615,246 B2 | 9/2003 | Pivowar |
| 6,636,873 B1 | 10/2003 | Carini et al. |
| 6,643,669 B1 | 11/2003 | Novak et al. |
| 6,661,353 B1 | 12/2003 | Gopen |
| 6,672,506 B2 | 1/2004 | Swartz et al. |
| 6,678,882 B1 | 1/2004 | Hurley |
| 6,741,188 B1 | 5/2004 | Miller |
| 6,763,226 B1 | 7/2004 | McZeal |
| D494,584 S | 8/2004 | Schlieffers |
| 6,795,768 B2 | 9/2004 | Bragansa |
| 6,796,505 B2 | 9/2004 | Pellaumail |
| 6,810,405 B1 | 10/2004 | LaRue |
| 6,837,436 B2 | 1/2005 | Swartz et al. |
| 6,850,837 B2 | 2/2005 | Paulauskas |
| 6,895,503 B2 | 5/2005 | Tadayon |
| 6,898,517 B1 | 5/2005 | Froeberg |
| 6,912,398 B1 | 6/2005 | Domnitz |
| 6,930,715 B1 | 8/2005 | Mower |
| 6,983,293 B2 | 1/2006 | Wang |
| 6,992,619 B2 | 1/2006 | Harrison |
| 7,010,501 B1 | 3/2006 | Roslak |
| 7,031,875 B2 | 4/2006 | Ellenby |
| 7,032,003 B1 | 4/2006 | Shi |
| 7,040,541 B2 | 5/2006 | Swartz |
| 7,063,263 B2 | 6/2006 | Swartz |
| 7,064,706 B2 | 6/2006 | King |
| 7,082,365 B2 | 7/2006 | Sheha |
| 7,092,964 B1 | 8/2006 | Dougherty |
| 7,103,365 B2 | 9/2006 | Myllymaki |
| 7,103,370 B1 | 9/2006 | Creemer |
| 7,103,844 B2 | 9/2006 | Jones |
| 7,107,038 B2 | 9/2006 | Fitch |
| 7,133,892 B2 | 11/2006 | Khan |
| 7,136,945 B2 | 11/2006 | Gibbs |
| 7,171,378 B2 | 1/2007 | Petrovich |
| 7,191,218 B1 | 3/2007 | Innes |
| 7,195,157 B2 | 3/2007 | Swartz |
| 7,198,192 B2 | 4/2007 | Page et al. |
| 7,245,923 B2 | 7/2007 | Frank |
| 7,321,826 B2 | 1/2008 | Sheha |
| 7,340,333 B2 | 3/2008 | Lenneman |
| 7,385,501 B2 | 6/2008 | Miller |
| 7,389,179 B2 | 6/2008 | Jin |
| 7,428,418 B2 | 9/2008 | Cole |
| 7,460,953 B2 | 12/2008 | Herbst |
| 7,501,981 B2 | 3/2009 | Rahman |
| 7,587,276 B2 | 9/2009 | Gold |
| 7,602,944 B2 | 10/2009 | Campbell et al. |
| 7,620,404 B2 | 11/2009 | Chesnais et al. |
| 7,620,659 B2 | 11/2009 | Novik |
| 7,653,576 B2 | 1/2010 | Boss et al. |
| 7,720,844 B2 | 5/2010 | Chu |
| 7,747,528 B1 | 6/2010 | Robinson et al. |
| 7,783,523 B2 | 8/2010 | Lopez et al. |
| 7,788,032 B2 | 8/2010 | Moloney |
| 7,801,058 B2 | 9/2010 | Wang |
| 7,844,415 B1 | 11/2010 | Bryant |
| 7,941,269 B2 | 5/2011 | Laumeyer |
| 7,990,394 B2 | 8/2011 | Vincent |
| 8,014,763 B2 | 9/2011 | Hymes |
| 8,023,962 B2 | 9/2011 | Frank |
| 8,099,109 B2 | 1/2012 | Altman et al. |
| 8,165,034 B2 | 4/2012 | Buchwald |
| 8,170,795 B2 | 5/2012 | Bruelle-Drews et al. |
| 8,200,246 B2 | 6/2012 | Khosravy |
| 8,249,949 B2 | 8/2012 | Nash |
| 8,296,061 B2 | 10/2012 | Nesbitt |
| 8,407,003 B2 | 3/2013 | Geelen et al. |
| 8,447,331 B2 | 5/2013 | Busch |
| 2001/0030664 A1 | 10/2001 | Shulman |
| 2001/0036224 A1 | 11/2001 | Demello |
| 2001/0039546 A1 | 11/2001 | Moore et al. |
| 2002/0002504 A1 | 1/2002 | Engel |
| 2002/0042750 A1 | 4/2002 | Morrison |
| 2002/0059256 A1 | 5/2002 | Halim |
| 2002/0077905 A1 | 6/2002 | Arndt |
| 2002/0091568 A1 | 7/2002 | Kraft |
| 2002/0111873 A1 | 8/2002 | Ehrlich et al. |
| 2002/0124067 A1 | 9/2002 | Parupudi |
| 2002/0138196 A1 | 9/2002 | Polidi |
| 2002/0191034 A1 | 12/2002 | Sowizral |
| 2003/0036848 A1 | 2/2003 | Sheha et al. |
| 2003/0046158 A1 | 3/2003 | Kratky |
| 2003/0046164 A1 | 3/2003 | Sato |
| 2003/0061110 A1 | 3/2003 | Bodin |
| 2003/0069690 A1 | 4/2003 | Correia |
| 2003/0069693 A1 | 4/2003 | Snapp |
| 2003/0078002 A1 | 4/2003 | Sanjeev et al. |
| 2003/0142853 A1 | 7/2003 | Waehner et al. |
| 2003/0174838 A1 | 9/2003 | Bremer |
| 2003/0182319 A1 | 9/2003 | Morrison |
| 2003/0195851 A1 | 10/2003 | Ong |
| 2003/0208315 A1 | 11/2003 | Mays |
| 2003/0220966 A1 | 11/2003 | Hepper |
| 2004/0024727 A1 | 2/2004 | Bowman |
| 2004/0070602 A1 | 4/2004 | Kobuya |
| 2004/0107072 A1 | 6/2004 | Dietrich et al. |
| 2004/0122870 A1 | 6/2004 | Park |
| 2004/0128324 A1 | 7/2004 | Sheynman |
| 2004/0128499 A1 | 7/2004 | Peterka |
| 2004/0147329 A1 | 7/2004 | Meadows |
| 2004/0153473 A1 | 8/2004 | Hutchinson |
| 2004/0201500 A1 | 10/2004 | Miller |
| 2004/0203863 A1 | 10/2004 | Huomo |
| 2004/0259573 A1 | 12/2004 | Cheng |
| 2005/0015436 A1 | 1/2005 | Singh |

(56) References Cited

U.S. PATENT DOCUMENTS

| | | |
|---|---|---|
| 2005/0027755 A1 | 2/2005 | Shah |
| 2005/0044187 A1 | 2/2005 | Jhaveri |
| 2005/0049993 A1 | 3/2005 | Nori |
| 2005/0063563 A1 | 3/2005 | Soliman |
| 2005/0071280 A1 | 3/2005 | Irwin |
| 2005/0160014 A1 | 7/2005 | Moss |
| 2005/0172296 A1 | 8/2005 | Schleifer |
| 2005/0203905 A1 | 9/2005 | Jung |
| 2005/0212753 A1 | 9/2005 | Marvit |
| 2005/0223047 A1 | 10/2005 | Shah |
| 2005/0235018 A1 | 10/2005 | Tsinman |
| 2005/0240591 A1 | 10/2005 | Marceau |
| 2005/0256782 A1 | 11/2005 | Sands |
| 2005/0266858 A1 | 12/2005 | Miller |
| 2005/0272442 A1 | 12/2005 | Miller |
| 2006/0004713 A1 | 1/2006 | Korte |
| 2006/0019676 A1 | 1/2006 | Miller |
| 2006/0041663 A1 | 2/2006 | Brown |
| 2006/0047776 A1 | 3/2006 | Chieng |
| 2006/0058041 A1 | 3/2006 | Cheng |
| 2006/0061551 A1 | 3/2006 | Fateh |
| 2006/0064346 A1 | 3/2006 | Steenstra |
| 2006/0069798 A1 | 3/2006 | Li |
| 2006/0106879 A1 | 5/2006 | Zondervan |
| 2006/0106881 A1 | 5/2006 | Leung |
| 2006/0107330 A1 | 5/2006 | Ben-Yaacov |
| 2006/0123010 A1 | 6/2006 | Landry |
| 2006/0123053 A1 | 6/2006 | Scannel |
| 2006/0155778 A1 | 7/2006 | Sharma |
| 2006/0161379 A1 | 7/2006 | Ellenby |
| 2006/0161516 A1 | 7/2006 | Clarke |
| 2006/0176516 A1 | 8/2006 | Rothschild |
| 2006/0190497 A1 | 8/2006 | Inturi |
| 2006/0190572 A1 | 8/2006 | Novik |
| 2006/0194596 A1 | 8/2006 | Deng |
| 2006/0199536 A1 | 9/2006 | Eisenbach |
| 2006/0215569 A1 | 9/2006 | Khosravy |
| 2006/0223518 A1 | 10/2006 | Haney |
| 2006/0256007 A1 | 11/2006 | Rosenberg |
| 2006/0256008 A1 | 11/2006 | Rosenberg |
| 2006/0259574 A1 | 11/2006 | Rosenberg |
| 2006/0270421 A1 | 11/2006 | Phillips et al. |
| 2006/0271286 A1 | 11/2006 | Rosenberg |
| 2006/0288053 A1 | 12/2006 | Holt |
| 2006/0288344 A1 | 12/2006 | Brodersen |
| 2006/0291482 A1 | 12/2006 | Evans |
| 2007/0004451 A1 | 1/2007 | Anderson |
| 2007/0005243 A1 | 1/2007 | Horvitz |
| 2007/0006098 A1 | 1/2007 | Krumm |
| 2007/0008110 A1 | 1/2007 | Li |
| 2007/0015515 A1 | 1/2007 | Matsuda |
| 2007/0016368 A1 | 1/2007 | Chapin et al. |
| 2007/0032943 A1 | 2/2007 | Okabe |
| 2007/0053056 A1 | 3/2007 | Charlesworth |
| 2007/0078596 A1 | 4/2007 | Grace |
| 2007/0080216 A1 | 4/2007 | Ward |
| 2007/0091172 A1 | 4/2007 | Lee |
| 2007/0100834 A1 | 5/2007 | Landry |
| 2007/0118278 A1 | 5/2007 | Finn et al. |
| 2007/0130217 A1 | 6/2007 | Linyard |
| 2007/0139366 A1 | 6/2007 | Dunko et al. |
| 2007/0162942 A1 | 7/2007 | Hamynen |
| 2007/0165554 A1 | 7/2007 | Jefferson et al. |
| 2007/0219706 A1 | 9/2007 | Sheynblat |
| 2007/0219708 A1 | 9/2007 | Brasche |
| 2007/0233385 A1 | 10/2007 | Dicke |
| 2007/0242661 A1 | 10/2007 | Tran |
| 2007/0244633 A1 | 10/2007 | Phillips |
| 2007/0271317 A1 | 11/2007 | Carmel |
| 2007/0272738 A1 | 11/2007 | Berkun |
| 2007/0274563 A1 | 11/2007 | Jung |
| 2007/0275691 A1 | 11/2007 | Boda |
| 2007/0282564 A1 | 12/2007 | Sprague |
| 2007/0290037 A1 | 12/2007 | Arellanes |
| 2008/0004802 A1 | 1/2008 | Horvitz |
| 2008/0027632 A1 | 1/2008 | Mauderer |
| 2008/0028325 A1 | 1/2008 | Ferren |
| 2008/0036586 A1 | 2/2008 | Ohki |
| 2008/0036766 A1 | 2/2008 | Ishii |
| 2008/0043108 A1 | 2/2008 | Jung |
| 2008/0056535 A1 | 3/2008 | Bergmann |
| 2008/0065322 A1 | 3/2008 | Ng et al. |
| 2008/0065325 A1 | 3/2008 | Geelen |
| 2008/0071620 A1 | 3/2008 | Lowe |
| 2008/0077319 A1 | 3/2008 | Kato et al. |
| 2008/0082254 A1 | 4/2008 | Huhtala |
| 2008/0090591 A1 | 4/2008 | Miller |
| 2008/0091518 A1 | 4/2008 | Eisenson |
| 2008/0091537 A1 | 4/2008 | Miller |
| 2008/0097698 A1 | 4/2008 | Arnold-Huyser |
| 2008/0113674 A1 | 5/2008 | Baig |
| 2008/0122785 A1 | 5/2008 | Harmon |
| 2008/0132249 A1 | 6/2008 | Hamilton |
| 2008/0132251 A1 | 6/2008 | Altman |
| 2008/0140835 A1 | 6/2008 | Bradley |
| 2008/0147730 A1 | 6/2008 | Lee |
| 2008/0161018 A1 | 7/2008 | Miller |
| 2008/0172374 A1 | 7/2008 | Wolosin et al. |
| 2008/0172496 A1 | 7/2008 | Middleton et al. |
| 2008/0174679 A1 | 7/2008 | Tanino |
| 2008/0183380 A1 | 7/2008 | Blackwood |
| 2008/0201074 A1 | 8/2008 | Bleckman |
| 2008/0214166 A1 | 9/2008 | Ramer |
| 2008/0215202 A1 | 9/2008 | Breed |
| 2008/0234931 A1 | 9/2008 | Wang |
| 2008/0250337 A1 | 10/2008 | Lemmela |
| 2008/0268855 A1 | 10/2008 | Hanuni |
| 2008/0268876 A1 | 10/2008 | Gelfand |
| 2008/0273109 A1 | 11/2008 | Bamford |
| 2008/0281794 A1 | 11/2008 | Mathur |
| 2008/0288486 A1 | 11/2008 | Kim |
| 2008/0293431 A1 | 11/2008 | Buerger |
| 2009/0005021 A1 | 1/2009 | Forstall |
| 2009/0005076 A1 | 1/2009 | Forstall et al. |
| 2009/0005077 A1 | 1/2009 | Forstall et al. |
| 2009/0005080 A1 | 1/2009 | Forstall |
| 2009/0005968 A1 | 1/2009 | Vengroff |
| 2009/0005987 A1 | 1/2009 | Vengroff |
| 2009/0006194 A1 | 1/2009 | Sridharan |
| 2009/0030778 A1 | 1/2009 | Zapata |
| 2009/0033540 A1 | 2/2009 | Breed |
| 2009/0036145 A1 | 2/2009 | Rosenblum |
| 2009/0037273 A1 | 2/2009 | Zhu |
| 2009/0040370 A1 | 2/2009 | Varanasi |
| 2009/0076723 A1 | 3/2009 | Moloney |
| 2009/0102859 A1 | 4/2009 | Athsani et al. |
| 2009/0143078 A1 | 6/2009 | Tu et al. |
| 2009/0163228 A1 | 6/2009 | Blumberg |
| 2009/0192704 A1 | 7/2009 | Geelen |
| 2009/0198767 A1 | 8/2009 | Jakobson |
| 2009/0248288 A1 | 10/2009 | Bell et al. |
| 2009/0259568 A1 | 10/2009 | Lee |
| 2009/0315766 A1 | 12/2009 | Khosravy |
| 2009/0315775 A1 | 12/2009 | Khosravy |
| 2009/0315776 A1 | 12/2009 | Khosravy |
| 2009/0315995 A1 | 12/2009 | Khosravy |
| 2009/0319166 A1 | 12/2009 | Khosravy |
| 2009/0319175 A1 | 12/2009 | Khosravy |
| 2009/0319177 A1 | 12/2009 | Khosravy |
| 2009/0319178 A1 | 12/2009 | Khosravy |
| 2009/0319181 A1 | 12/2009 | Khosravy |
| 2009/0319348 A1 | 12/2009 | Khosravy |
| 2010/0008255 A1 | 1/2010 | Khosravy |
| 2010/0009662 A1 | 1/2010 | Khosravy |
| 2010/0016022 A1 | 1/2010 | Liu |
| 2010/0030646 A1 | 2/2010 | Riise |
| 2010/0076968 A1 | 3/2010 | Boyns |
| 2010/0228612 A1 | 9/2010 | Khosravy |
| 2010/0332324 A1 | 12/2010 | Khosravy |
| 2011/0046879 A1 | 2/2011 | Celli et al. |
| 2011/0093227 A1 | 4/2011 | Huang |
| 2012/0264457 A1 | 10/2012 | Khosravy |

(56) References Cited

U.S. PATENT DOCUMENTS

FOREIGN PATENT DOCUMENTS

| | | |
|---|---|---|
| WO | WO02095535 | 11/2002 |
| WO | WO 2005101200 | 10/2005 |
| WO | WO 2005116794 | 12/2005 |
| WO | WO 2006024873 | 3/2006 |
| WO | WO 2008007260 | 1/2008 |
| WO | WO 2008014255 | 1/2008 |

OTHER PUBLICATIONS

U.S. Appl. No. 12/437,863, Jun. 6, 2013, Office Action.
Office Action dated Sep. 26, 2013 cited in U.S. Appl. No. 12/437,863.
Notice of Allowance dated Sep. 23, 2013 cited in U.S. Appl. No. 12/362,093.
Notice of Allowance dated Aug. 21, 2013 cited in U.S. Appl. No. 13/485,320.
Sony NV-U92T Sat Nav Systems, Nov. 3, 2008, http://www.satellitenavigation.org.uk/category/sony/page/2/, 10 pages.
Sony NV-U80 Widescreen Portable Navigation, http://incarexpress.co.uk/view_product.php?partno+NVU80, Retrieved on Mar. 17, 2009, 2 pages.
Aymen A. Solyman, IbnBatota—Technology for a Mobile Map Application, Directions Magazine, http://www.directionsmag.com/article.php?article_id=807&trv=1, Retrieved on Mar. 17, 2009, 6 pages.
Daniel Sonntag, Context-Sensitive Multimodal Mobile Interfaces, 9th Intl. Conf on Human Computer Interaction with Mobile Devices and Services (MobileHCI'07), http://www.dfki.de/~Sonntag/mobilehci2007.pdf, pp. 142-148, 2007.
Sven Kratz & Rafael Ballagas, Gesture Recognition Using Motion Estimation on Mobile Phones, available at least as early as Dec. 2007 http://www.permid.org/2007/pdf/permid2007_dratz.pdf, 5 pages.
Ramaswamy Hariharan, et al., Web-Enhanced GPS, Feb. 2005 http://research.microsoft.com/en-us/um/people/horvits/web_gps.pdf, 10 pages.
Jim Denham, et al., Getting from Point A to Point B: A Review of Two GPS Systems, AFB AccessWorld, Nov. 2004 Issue, vol. 5, No. 6, http://www.afb.org/AFBPress/pub.asp?DocID=aw050605, 10 pages.
Egenhofer, et al. Beyond Desktop GIS. Http://www.spatial.maine.edu/~max/BeyondDesktopGIS.pdf. Last accessed Jan. 29, 2009, 3 pages.
Hi-406bt-C Bluetooth GPS Receiver with Digital Compass. Http://13030597.trustpass.alibaba.com/product/11705884/Hi_406bt_C_Bluetooth_GPS_Receiver_With_Digital_Compass.html Last accessed Jan. 29, 2009, 3 pages.
Brown. GPSTuner from Megalith. Http://www.clieuk.co.uk/gpstuner.shtml, Jun. 19, 2008, 9 pages.
Efficasoft GPS Utilities. Http://www.clickapps.com/moreinfo.htm?pid=14274&section=PPC&PHPSESSID=af43ec3aed820b0e01d0e8cfa68849b&T091620080618=1. Downloaded Jun. 19, 2008, 8 pages.
Rashid, et al. "Implementing Location Based Information/Advertising for Existing Mobile Phone Users in Indoor/Urban Environments", Proceedings of the International Conference on Mobile Business (ICMB ' 05). Http://ieeexplore.ieee.org/iel5/9999/32116/01493635.pdf?tp=isnumber=&arnumber=1493635. Last accessed Sep. 16, 2008, 7 pages.
The iPointer Platform Next Generation Location-Based Services Today. Http://www.i-spatialtech.com/PDF/ipointer_data_sheet.pdf. Last accessed May 19, 2009, 2 pages.
Simon, et al., Towards Orientation-Aware Location Based Mobile Services. Http://p2d.ftw.at/papers/SimonKunczierAnegg.pdf. Last accessed May 19, 2009, 8 pages.
Werbach. Location-Based Computing :Wherever You Go, There You Are. Esther Dyson's Monthly Report, Release 1.0, vol. 18, No. 6, Jun. 28, 2000, 32 pages.
Iwasaki, et al., "Azim: Direction Based Service Using Azimuth Based Position Estimation", Proceedings of the 24th International Conference on Distributed Computing Systems (ICDCS '04)., Current Version published Feb. 28, 2005, 10 pages.
Kim, et al., "Efficient and Dynamic Location-Based Event Service for Mobile Computing Environments", 0-7695-2945-310 IEEE, Fifth International Conference on Computational Science and Applications, Aug. 2007. http://ieeexplore.ieee.org/iel5/4301108/4301109/04301175.pdf. 7 pages.
Sense Networks Launches Software Platform that Indexes the Real World Using Mobile Location Data. Jun. 9, 2008, 1 pages.
Trusca, Sanoodi Releases Smap, a Free GPS Route Recording Mobile Application. Oct. 28, 2008., 2 pages.
Jaques. Vendors Plug-in to Connected Navigation. Apr. 16, 2008, 2 pages.
Liaw. Verizon Wireless Releases VZ Navigator Version 4. May 9, 2008, 6 pages.
POIAlert. Http://www.wayviewer.de/en/poialert.html. Last accessed Mar. 20, 2009, 4 pages.
Mitchell. Use GPS and Web Maps for Location-Aware Apps. Http://msdn.microsoft.com/en-us/magazine/2009.01.wm6gps.aspx. Jan. 2009, 6 pages.
Marsh, Sole Source Dead: Long Live Loran? Jun. 1, 2004. http://www.aviationtoday.com/av/issue/feature/920.html. 4 pages.
Benshoof. Civilian GPS Systems and Potential Vulneralbilities Sep. 2005 www.navcen.uscg.gov/cgsic/meetings/EISubcommittee/2005_presentations/06%20Vulner%20PRA.ppt. 23 pages.
Bond. GNSS Sole Means of Navigation and the Future Mix of Navigation Systems in ATC http://www.loran.orgILAArchive/LanghorneBondPapers/21FutureMixofNavigationSystemsinATC.pdf, Last accessed Mar. 16, 2009, 5 pages.
Rossmuller. Digital SLR GPS System. Mar. 11, 2007. http://www.letsgodigital.org/en/13416/slr_camera_gps_system/. Last accessed Mar. 20, 2009, 3 pages.
Dr. Marshall, Geotagging with GPS Capture and Process. Sep. 19, 2008. gttp://geotate.com/files/Geotate_CP_White_Paper.pdf. Last accessed Mar. 20, 2009, 25 pages.
Pashtan, etal. Personal Service Areas for Mobile Web Applications. IEEE 1089-7801/04. http://www.ece.northwestern.edu/~peters/references/personal_serv_areas_IEEE-IC.pdf. Last accessed Mar. 23, 2009, 7 pages.
Mircea, et al. CellID positioning method for virtual tour guides travel services. ECAI 2007—International Conference—Second Edition, Electronics, Computers and Artificial Intelligence, Jun. 29-30, 2007, Pitesti Romania http://www.ici.ro/sium/index_files_/ECAI-UPIT/Lucrare%20UPIT-ICI-Mircea-en_v04.pdf. Last accessed Mar. 23, 2009, 6 pages.
Stewart, et al., Accessible Contextual Information for Urban Orientation. UbiComp'08, Sep. 21-24, 2008, Seoul, Korea. ACM 978-1-60558-136-1/08/09. http://www.si.umich.edu/mwnewman/pubs/ubicomp08-stewart-talkingpoints.pdf, 4 pages.
Chris Weider, et al., "LDAP Multi-Master Replication Protocol" http://hegel.ittc.ku.edu/topics/internet/internet-drafts/ draft-i/draftietf-asid-ldap-mult-mast-rep-02.txt, Dec. 15, 2006.
"Administrator's Guide", Red Hat Directory Server, Version 7.1, May 2005.
Coatta, et al. A Data Synchronization Service for Ad Hoc Groups. WCNC 2004/IEEE Communications Society, 0-7803-8344-3/04 IEEE. Http://ieeexplore.ieee.org/iel5/9178/29114/01311592.pdf. Mar. 2004. 6 pages.
Juszczyk, et al., Web Service Discovery, Replication, and Synchronization in Ad-Hoc Networks. In: Proceedings of the First International Conference on Availability, Reliability and Security (ARES'06). 0-7695-2567-9/06 IEEE. Http://www.infosys.tuwien.ac.at/Staff/sd/papers/Web%20Service%20Discovery,%20Replication,%20and%20Synchronization%20in%20Ad-Hoc%20Networks.pdf. 8 pages. Apr. 2006.
Advantages of Microsoft Merge Replication for Mobile and Distributed Applications (White Paper). Published: Feb. 2006. http://download.microsoft.com/download/3/d/9/3d93d494-6ad0-4651-86de-09elbd43d03f/SQL2005MergeComparitive. Doc., 13 pages.
Liu, et al., A License-Sharing Scheme in Digital Rights Management http://smealsearch2.psu.edu/cach/papers/Business/1574/http:zSzzSzwww.smartinternet.com.

(56) References Cited

OTHER PUBLICATIONS auzSzSitwebzSzpublicationzSzfileszSz136_zCz24zCz24zCz24_36879zszp03_043.pdf/a-license-sharing-scheme.pdf/. Last accessed Dec. 12, 2006, 13 pages.

Brogan. Enhancing Digital Rights Management Using the Family Domain. In: Proceedings of the 4th Winona Comuter Science Undergraduate Research Seminar, Apr. 20-21, 2004, Winona, MN, US., 7 pages.

Kwok, et al., A License Management Model to Support B2C and C2C Music Sharing. Http://wwwconf.ecs.soton.ac.uk/archive/00000143/01/1008.pdf. Last accessed Dec. 13, 2006, 2 pages.

Reti, et al., DiMaS: Distributing Multimedia on Peer-to-Peer File Sharing Networks. MM'04, Oct. 10-16, 2004, New York, New York, USA. ACM, 2 pages.

Sagiraju, et al. A Novel Advertising Application Using GPS and GIS. Http://www.gisdevelopment.net/application/Miscellaneous/mi08_67.html, Last Accessed Mar. 24, 2009, 5 pages.

Stojanovic, et al. Modeling and Querying Mobile Objects in Location-Based Services. Facta Universitatis (NI'S) Ser. Math. Inform. 18 (2003), 59-80. http://facta.junis.ni.ac.rs/mai/mai18/mai18-05.pdf. Last Accessed Mar. 24, 2009, 22 pages.

"New Technology Product Links Online Shoppers WithBrick-And-Mortar Merchants; Yclip, First Data", Business Wire, May 18, 2000, http://www.allbusiness.com/marketing-advertising/6443230-1.html, 3 pages.

U.S. Appl. No. 12/476,406, Apr. 18, 2011, Office Action.
U.S. Appl. No. 12/362,093, Apr. 27, 2011, Office Action.
U.S. Appl. No. 12/437,857, May 31, 2011, Office Action.
U.S. Appl. No. 12/437,863, Jun. 22, 2011, Office Action.
U.S. Appl. No. 12/483,982, Jul. 20, 2011, Office Action.
U.S. Appl. No. 12/437,857, Jul. 27, 2011, Office Action.
U.S. Appl. No. 12/476,417, Aug. 9, 2011, Office Action.
U.S. Appl. No. 11/673,415, Nov. 24, 2008, Office Action.
U.S. Appl. No. 11/673,415, Jul. 14, 2009, Notice of Allowance.
U.S. Appl. No. 12/362,093, Sep. 28, 2011, Office Action.
U.S. Appl. No. 12/476,426, Aug. 3, 2011, Office Action.
U.S. Appl. No. 12/364,936, Oct. 5, 2011, Office Action.
U.S. Appl. No. 12/363,655, Sep. 20, 2011, Office Action.
U.S. Appl. No. 12/491,519, Sep. 29, 2011, Office Action.
U.S. Appl. No. 12/476,406, Oct. 14, 2011, Office Action.
U.S. Appl. No. 12/483,982, Oct. 17, 2011, Office Action.
U.S. Appl. No. 12/536,917, Oct. 6, 2011, Office Action.
U.S. Appl. No. 12/400,087, Oct. 11, 2011, Office Action.
U.S. Appl. No. 12/476,426, Dec. 7, 2011, Office Action.
U.S. Appl. No. 12/536,937, Nov. 9, 2011, Office Action.
U.S. Appl. No. 12/363,655, Jan. 5, 2012, Office Action.
U.S. Appl. No. 12/483,920, Dec. 12, 2011, Office Action.
U.S. Appl. No. 12/476,417, Jan. 11, 2012, Office Action.
U.S. Appl. No. 12/437,863, Feb. 7, 2012, Office Action.
U.S. Appl. No. 12/536,889, Feb. 10, 2012, Office Action.
U.S. Appl. No. 12/483,982, Feb. 21, 2012, Notice of Allowance.
U.S. Appl. No. 12/400,087, Mar. 16, 2012, Office Action.
U.S. Appl. No. 12/491,519, Mar. 16, 2012, Office Action.
U.S. Appl. No. 12/536,917, Mar. 16, 2012, Office Action.
U.S. Appl. No. 12/483,920, May 7, 2012, Notice of Allowance.
U.S. Appl. No. 12/536,889, May 24, 2012, Office Action.
U.S. Appl. No. 12/364,936, Jun. 7, 2012, Office Action.
U.S. Appl. No. 12/476,406, Jun. 21, 2012, Notice of Allowance.
U.S. Appl. No. 12/536,937, Jun. 21, 2012, Office Action.
U.S. Appl. No. 12/437,863, Aug. 30, 2012, Office Action.
U.S. Appl. No. 13/485,320, Sep. 10, 2012, Office Action.
U.S. Appl. No. 12/437,857, May 8, 2009, Office Action.
U.S. Appl. No. 13/485,320, Dec. 19, 2012, Office Action.
U.S. Appl. No. 12/437,863, Jan. 3, 2013, Office Action.
U.S. Appl. No. 12/363,655, Jan. 29, 2013, Office Action.
U.S. Appl. No. 12/437,857, Feb. 14, 2013, Notice of Allowance.
Office Action dated Dec. 19, 2013 cited in U.S. Appl. No. 12/363,655.
Office Action dated Feb. 24, 2014 cited in U.S. Appl. No. 12/536,937.
Office Action dated May 22, 2014 cited in U.S. Appl. No. 12/491,519.
Office Action dated May 22, 2014 cited in U.S. Appl. No. 12/400,087.
Office Action dated Jul. 23, 2014 cited in U.S. Appl. No. 12/476,417.
Notice of Allowance dated Jul. 16, 2014 cited in U.S. Appl. No. 12/476,426.
Office Action dated Jun. 6, 2014 cited in U.S. Appl. No. 12/536,917.
Office Action dated Jun. 24, 2014 cited in U.S. Appl. No. 12/364,936.

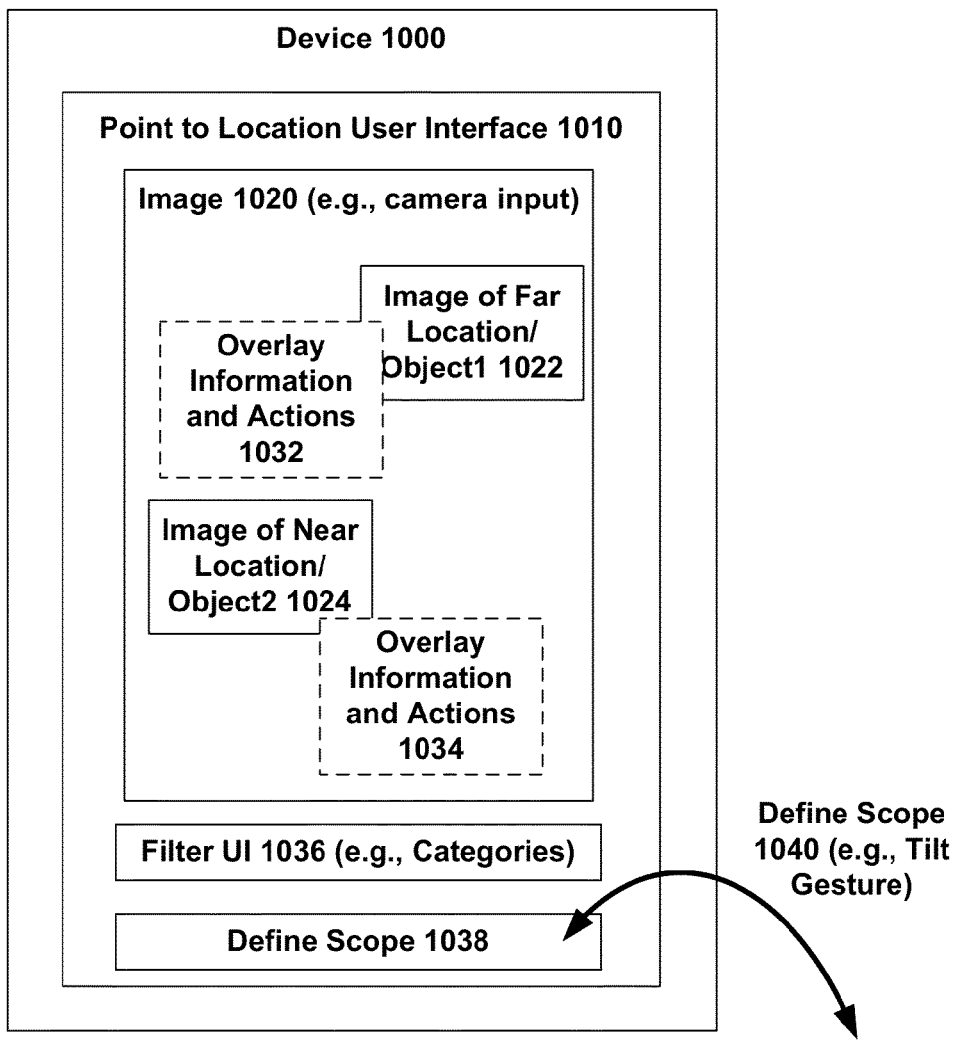
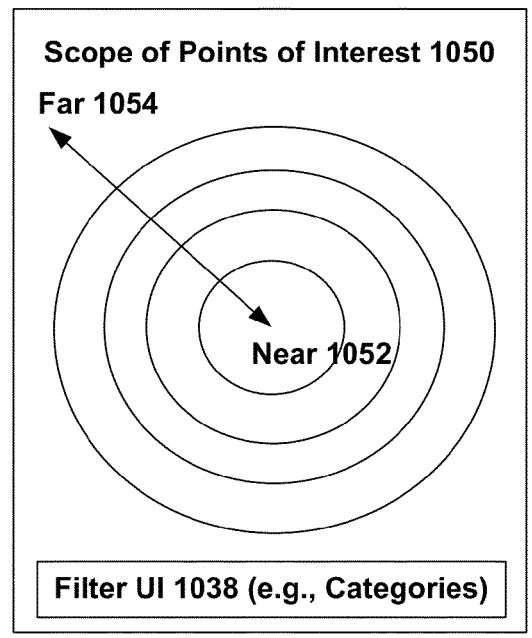
Examples for Point to Location User Interface
FIG. 10

Examples for Point to Real Estate User Interface

Determine Object at which Mobile Device is Pointed based on Location (e.g., GPS) and Motion Vector (e.g., Compass, Accelerometer, etc.)

DATA SERVICES BASED ON GESTURE AND LOCATION INFORMATION OF DEVICE

CROSS-REFERENCE TO RELATED APPLICATIONS

This application is a continuation of U.S. patent application Ser. No. 12/437,857, filed on May 8, 2009, entitled "DATA SERVICES BASED ON GESTURE AND LOCATION INFORMATION OF DEVICE," which application claims priority to U.S. Provisional Application Ser. No. 61/074,415, filed on Jun. 20, 2008, entitled "MOBILE COMPUTING SERVICES BASED ON DEVICES WITH DYNAMIC DIRECTION INFORMATION," and U.S. Provisional Application Ser. No. 61/074,590, filed on Jun. 20, 2008, entitled "MOBILE COMPUTING SERVICES BASED ON DEVICES WITH DYNAMIC DIRECTION INFORMATION." The contents of each of the foregoing applications are incorporated herein by reference in their entirety.

TECHNICAL FIELD

The subject disclosure relates to mobile computing devices, and the provision of data and/or network services based on gesture and location information of the devices.

BACKGROUND

By way of background concerning some conventional systems, mobile devices, such as portable laptops, PDAs, mobile phones, navigation devices, and the like have been equipped with location based services, such as global positioning system (GPS) systems, WiFi, cell tower triangulation, etc. that can determine and record a position of mobile devices. For instance, GPS systems use triangulation of signals received from various satellites placed in orbit around Earth to determine device position. A variety of map-based services have emerged from the inclusion of such location based systems that help users of these devices to be found on a map and to facilitate point to point navigation in real-time and search for locations near a point on a map.

However, such navigation and search scenarios are currently limited to displaying relatively static information about endpoints and navigation routes. While some of these devices with location based navigation or search capabilities allow update of the bulk data representing endpoint information via a network, e.g., when connected to a networked portable computer (PC) or laptop, such data again becomes fixed in time. Accordingly, it would be desirable to provide a set of richer experiences for users than conventional experiences predicated on location and conventional processing of static bulk data representing potential endpoints of interest. In addition, considering the complexity of input on touchscreens or tiny alphanumeric keypads typically provided for portable electronic devices, current ways for invoking benefits of location-based services are inadequate.

The above-described deficiencies of today's location based systems and devices are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Direction based pointing services are provided for portable devices or mobile endpoints. Mobile endpoints can include a positional component for receiving positional information as a function of a location of the portable electronic device, a directional component that outputs direction information as a function of an orientation of the portable electronic device and a motion component that outputs motion information e.g., from accelerometer(s), based on motion experienced by the portable device. Based on an analysis of any one or more of the motion information, the direction information or the location information, a set of device gestures are determined.

At least one processor of the device processes the any one or more of the motion information, the direction information or the location information to determine a gesture or set of gestures, which determine action or a request for action to be taken with respect to location based services. For a non-limiting example, gesture(s) can be determined based on an analysis of path information determined from the motion information as well as direction information of the device for a given period of time while undergoing the two-dimensional (2-D) or three-dimensional (3-D) path defined by the path information. Alternatively, the information can be wholly or partly processed by a network service.

Where applicable for a given scenario, to determine an item to which the gesture applies, the at least one processor processes the positional information and the direction information to determine a subset of points of interest relative to the portable electronic device as a function of the positional information and/or the direction information.

Devices or endpoints can include compass(es), e.g., magnetic or gyroscopic, to determine a direction and location based systems for determining location, e.g., GPS. To supplement the positional information and/or the direction information, devices or endpoints can also include component(s) for determining displacement, speed and/or acceleration information for processing.

With the addition of directional information and gesturing in a location based ecosystem, a variety of service(s) can be provided on top of user identification or interaction with specific object(s) of interest. For instance, when a user points at a particular item at a particular location or place, this creates an opportunity for anyone having an interest in that particular item to communicate, or otherwise interact, with the user regarding that item or related items at a point in time when the user's focus is on the particular item. User context for the interaction can also be taken into account to supplement the provision of one or more interactive direction based services.

These and many other non-limiting embodiments are described in more detail below.

BRIEF DESCRIPTION OF THE DRAWINGS

Various non-limiting embodiments are further described with reference to the accompanying drawings in which:

FIG. 10 is a block diagram providing a non-limiting implementation for a point to location user interface for a device;

DETAILED DESCRIPTION

Overview

Figure 1:
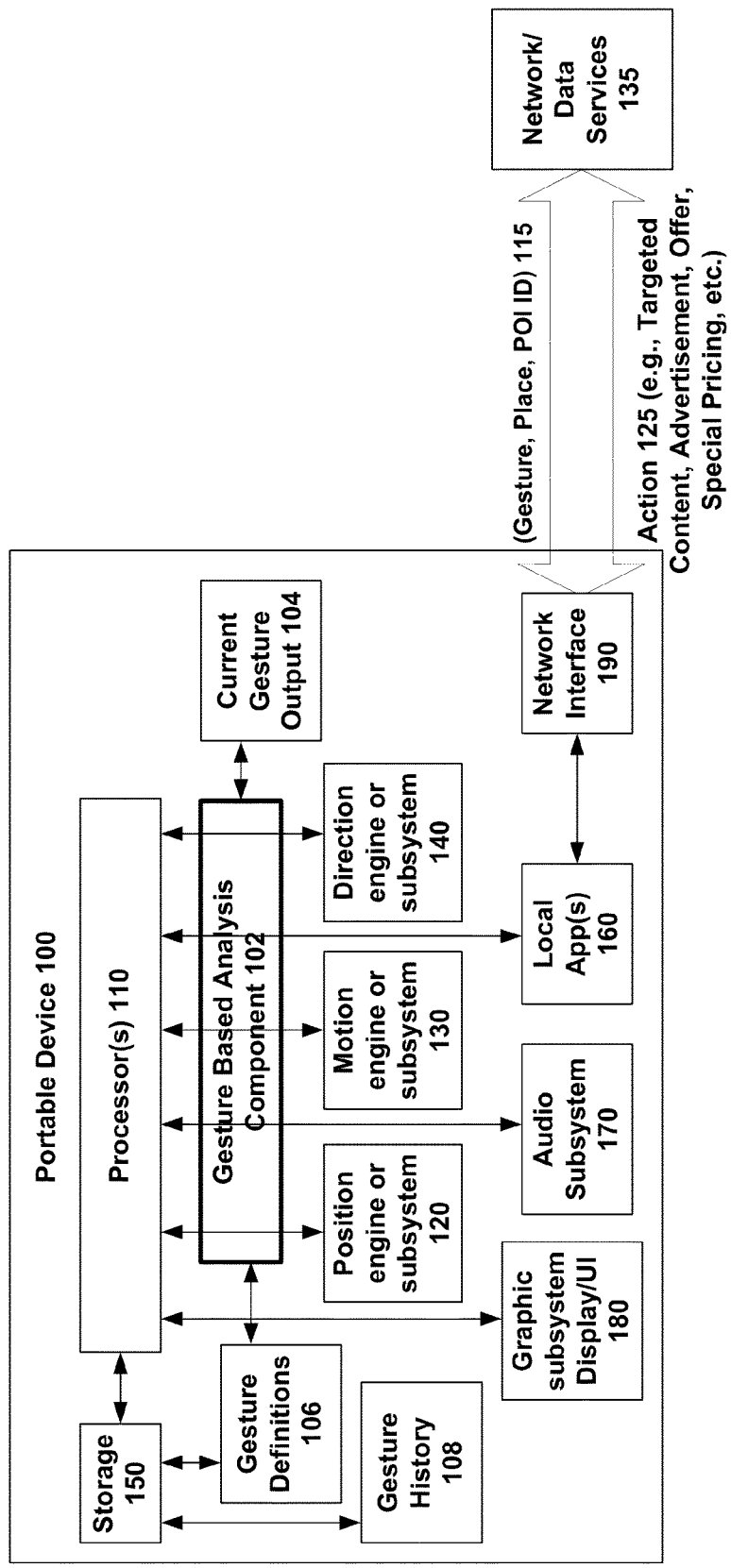
FIG. 1 illustrates a portable electronic device 100 according to an embodiment including a positional component, a motion component and a directional component for performing gesture based analysis as described in one or more embodiments and scenarios.

As discussed in the background, among other things, current location services systems and services, e.g., GPS, cell triangulation, P2P location service, such as Bluetooth, WiFi, etc., tend to be based on the location of the device only, and tend to provide static experiences that are not tailored to a user because the data about endpoints of interest is relatively static. In addition, input to engage such static location based services is frustrating at best for portable devices, such as cell phones, PDAs, music players, notebooks, netbooks, etc. For instance, input to such devices when the user is "on the go" has been conventionally limited to error prone input processes, e.g., due to limited space, which are error prone even when a user is not moving and the device is stationary.

At least partly in consideration of these deficiencies of conventional location based services, various embodiments of a portable device are provided that enable users to point a device directionally and receive static and/or dynamic information in response from a networked service, such as provided by one or more servers, or as part of a cloud services experience. Moreover, by determining gestured made by the device based on any one or more of direction information, motion information or location information, input for various scenarios and device contexts are greatly facilitated, and can be tailored to context based on the location, or given point(s) of interest pointed at by a pointing device.

In the various alternative embodiments described herein, leveraging digital compasses and location services to provide direction and location information enables a next-generation of direction or pointer based location search services, scan services, discoverability services, etc. In this regard, the digital compass and location information, such as GPS, can be used to point at objects of interest, thus defining the entry point for one or more data transactions or interactions between the device and one or more third party devices providing service(s) for the object(s) of interest at which the device is pointed. Using a digital compass, e.g., solid state, magnetic, sun/moon based, etc. on a mobile endpoint facilitates point and upload scenarios, point and synchronize geographical information to a Web service, cloud services or another endpoint.

As reflected in various embodiments, a device is provided that can hone in on, interact with, or otherwise transact with, a specific object or specific objects of interest by way of location and direction of the device, creating a new advertising model not previously known. As an example, when a user interacts with a particular product on a shelf at a retail store in connection with a direction based service, this creates an opportunity for anyone having an interest in the particular product to engage the user, e.g., communicate some information to that user. Any context that can be discerned from the user's actions and interactions can also be taken into account when acting on the opportunity. In this regard, a variety of gestures can facilitate these actions and interactions without requiring the complexity of input alluded to in the background.

In this regard, with a gesture (pre-defined or user defined), users can interact with the endpoints in a host of context sensitive ways to provide or update information associated with endpoints of interest, or to receive beneficial information or instruments (e.g., coupons, offers, etc.) from entities associated with the endpoints of interest, or according to any of the many non-examples described in more detail below.

In one embodiment, a portable electronic device comprises a positional component that outputs position information as a function of a location of the portable electronic device, a motion component that outputs motion information as a function of movement(s) of the portable device and a directional component that outputs direction information as a function of an orientation of the portable electronic device. The device is configured to process at least the position information to determine point(s) of interest relating to the position information and configured to process at least the motion information and the direction information to determine pre-defined gesture(s) undergone by the portable electronic device with respect to the point(s) of interest, wherein the portable electronic device automatically makes a request based on the pre-defined gesture(s) and the point(s) of interest.

The point(s) of interest can be determined from the position information and the direction information. The at least one pre-defined gesture can be determined from any one or more of the position information, the motion information and the direction information. The portable electronic device can automatically make a request based on the gesture(s) and identifier(s) associated with the point(s) of interest. The gesture(s) can be determined based on a pre-defined gesture definition or a user-defined gesture definition. A positional component can include a global positioning satellite (GPS) component for receiving and processing GPS signals or a component for receiving position information based on triangulation to wireless base stations, an image recognition system for recognizing at least one object in image data and determining a position of the device relative to the at least one object in the image data, or other means for measuring location.

The directional component can include a digital compass and can also include an image recognition system for recognizing an object in real space and determining the direction of the object and therefore the device by detecting the side of the object, or detecting the object relative to other objects fixed in real space. The motion component can include accelerometer(s) for measuring an acceleration of the device. The motion component can include at least two accelerometers for measuring a tilt or rotation of at least part of the device.

In one embodiment, a process determines a location of a portable device based on location information determined for the device, the location information representing a global position of the device. Direction information representing an orientation of the portable device and the location information are analyzed to determine point(s) of interest towards which the portable device is substantially oriented. In this regard, path information representing a path traversed by the portable device is analyzed based on at least the direction information to determine gesture(s) made by the portable device. A request is transmitted to a network service based on the gesture(s) and the point of interest.

The analyzing of path information can include processing acceleration information measuring acceleration of the device, processing velocity information measuring velocity of the device, analyzing the path information for a given time span or analyzing a set of vectors representing the path traversed by the device from a start time to a stop time. Moreover, the analyzing of path information can include analyzing three dimensional (3-D) path information representing three degrees of freedom of movement for the device, but can also include analyzing three dimensional (3-D) path information as 2-D path information by collapsing a degree of freedom.

In another embodiment, a method includes determining whether a viewing plane of a portable device is aligned with a substantially horizontal plane that is substantially parallel to a ground plane or aligned with a substantially vertical plane that is substantially orthogonal to the ground plane. If the portable device is aligned with the substantially horizontal plane, a topographical map view of a geographical area map determined based on location and direction information measured by the portable device is displayed and indication(s) of point(s) of interest on the geographical area map are displayed. If the portable device is aligned with the substantially vertical plane, an image based view of three-dimensional (3-D) space extending at least one pre-defined direction from the portable device is displayed and indication(s) of point(s) of interest pertaining to the 3-D space represented by the image based view can be displayed.

Details of various other exemplary, non-limiting embodiments are provided below

Gesture Based Input to Computing Device with Direction Information

With the addition of directional information in a location based environment, a variety of mobile scanning experiences are enabled on top of user identification of or interaction with specific object(s) of interest by pointing, or gesturing, at an object of interest. For instance, when a user gestures, e.g., points, at a particular item at a particular location or place, this creates an opportunity for anyone having an interest in that particular item to interact with the user regarding that item or related items at a point at a time when the user's focus is on the particular item. User context for the interaction can also be taken into account to supplement the provision of one or more interactive direction based services.

A gesture subsystem can optionally be included in a device, which can be predicated on any one or more of the motion information, location information or direction information. In this regard, not only can direction information and location information be used to define a set of unique gestures, but also motion information (such as speed and acceleration) can be used to define a more sophisticated set of gestures. In this regard, one can appreciate that a variety of algorithms could be adopted for a gesture subsystem. For instance, a simple click-event when in the "pointing mode" for the device can result in determining a set of points of interest for the user.

The pointing information, however produced according to an underlying set of measurement components and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest, e.g., those that span a certain angle defined by a panning gesture by the user.

In this respect, a gesturing component can also be included in the device to determine a current gesture of a user of the portable electronic device from a set of pre-defined gestures. For example, gestures can include zoom in, zoom out, panning to define an arc, all to help filter over potential subsets of points of interest for the user.

In addition, a device includes an algorithm for discerning items substantially along a direction at which the device is pointing, and those not substantially along a direction at which the device is pointing. In this respect, while motion vector might implicate POI, without a specific panning gesture that encompassed more directions/vectors, POIs would likely not be within the scope of points of interest defined by motion vector. The distance or reach of a vector can also be tuned by a user, e.g., via a slider control or other control, to quickly expand or contract the scope of endpoints encompassed by a given "pointing" interaction with the device.

Other gestures that can be of interest in for a gesturing subsystem include recognizing a user's gesture for zoom in or zoom out. Zoom in/zoom out can be done in terms of distance. A device pointed in direction may include a zoomed in view which includes points of interest within distance and arc, or a medium zoomed view representing points of interest between distance, or a zoomed out view representing points of interest beyond distance. These zoom zones correspond to POIs. More or less zones can be considered depending upon a variety of factors, the service, user preference, etc.

For another non-limiting example, with location information and direction information, a user can input a first direction via a click, and then a second direction after moving the device via a second click, which in effect defines an arc for objects of interest. For instance, via first pointing act by the user at time in direction and a second pointing act at time by the user in direction, an arc is implicitly defined. The area of interest implicitly includes a search of points of object within a distance, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions can also be implemented.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment.

Furthermore, with relatively accurate upward and downward tilt of the device, in addition to directional information such as calibrated and compensated heading/directional information, other services can be enabled. Typically, if a device is ground level, the user is outside, and the device is "pointed" up towards the top of buildings, the granularity of information about points of interest sought by the user (building level) is different than if the user was pointing at the first floor shops of the building (shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

A device can also include a Hardware Abstraction Layer (HAL) having components responsible for abstracting the way the client communicates with the measuring instruments, e.g., the GPS driver for positioning and LOS accuracy (e.g., open eGPS), magnetic compass for heading and rotational information (e.g., gyroscopic), one or more accelerometers for gestured input and tilt (achieves 3D positional algorithms, assuming gyroscopic compass).

FIG. 1 illustrates a portable electronic device 100 according to an embodiment including processor(s) 110, a positional component 120 that outputs position information as a function of location of the portable electronic device, a motion component 130 that outputs motion information as a function of movement of the portable device and a directional component 140 that outputs direction information as a function of orientation of the portable electronic device.

In cooperation with gesture based analysis component 102, and optionally local applications or services 160 (or remote services 135), processor(s) 110 process the position information and/or the direction information to determine a set of points of interest relating to the position/direction information. Processor(s) 110 also process the motion information, direction information and/or position information to determine pre-defined gesture(s) undergone by the portable electronic device with respect to one or more points of interest of the set. In response to the pre-defined gesture(s), the portable electronic device automatically makes a request based on the pre-defined gesture(s) and identifier(s) associated with the one or more points of interest of the set.

The gesture based analysis component 102 can determine a set of current gesture(s) 104 based on one or more of the position information, such as but not limited to GPS information, output from position engine or subsystem 120, the motion information, such as but limited to accelerometer information, of motion engine or subsystem 130, or the direction information, such as digital compass information, output from direction engine or subsystem 140. Gesture based analysis component 102 determines gesture(s) 104 relative to gesture definitions 106, which can be statically defined on the device, defined by the user of the device, retrieved from a gesture definition network provider (not shown), etc. Gesture history 108 coupled with other place and point of interest information can be a rich source for intelligent applications 160 or network services 135 to understand context for a given device gesture based on historical interaction.

Device 100 can include storage 150 for storing any of position information, motion information, direction information, gesture definitions 106, gesture history 108, application information, etc. The device 100 can also include a graphics subsystem display and associated user interface 180 for display of information and/or for receiving touchscreen input. An audio subsystem 170 can also be included for voice or other sound input, or sound output in connection with the provision of gesture and pointing based services.

For instance, via network interface 190, based on a current gesture 104, an automatic request 115 can be made to network/data services 135 based on the gesture and place or point of interest identification. As a result, a variety of actions 125 can take place, e.g., targeted content, advertising, offers, deals, price comparisons, etc. Local applications 160 and storage 150 are optional as any of the functionality of providing gesture based services can be pushed to the network data services 135, or conversely, functionality of data services 135 can be implemented by a local application 160.

Figure 2:
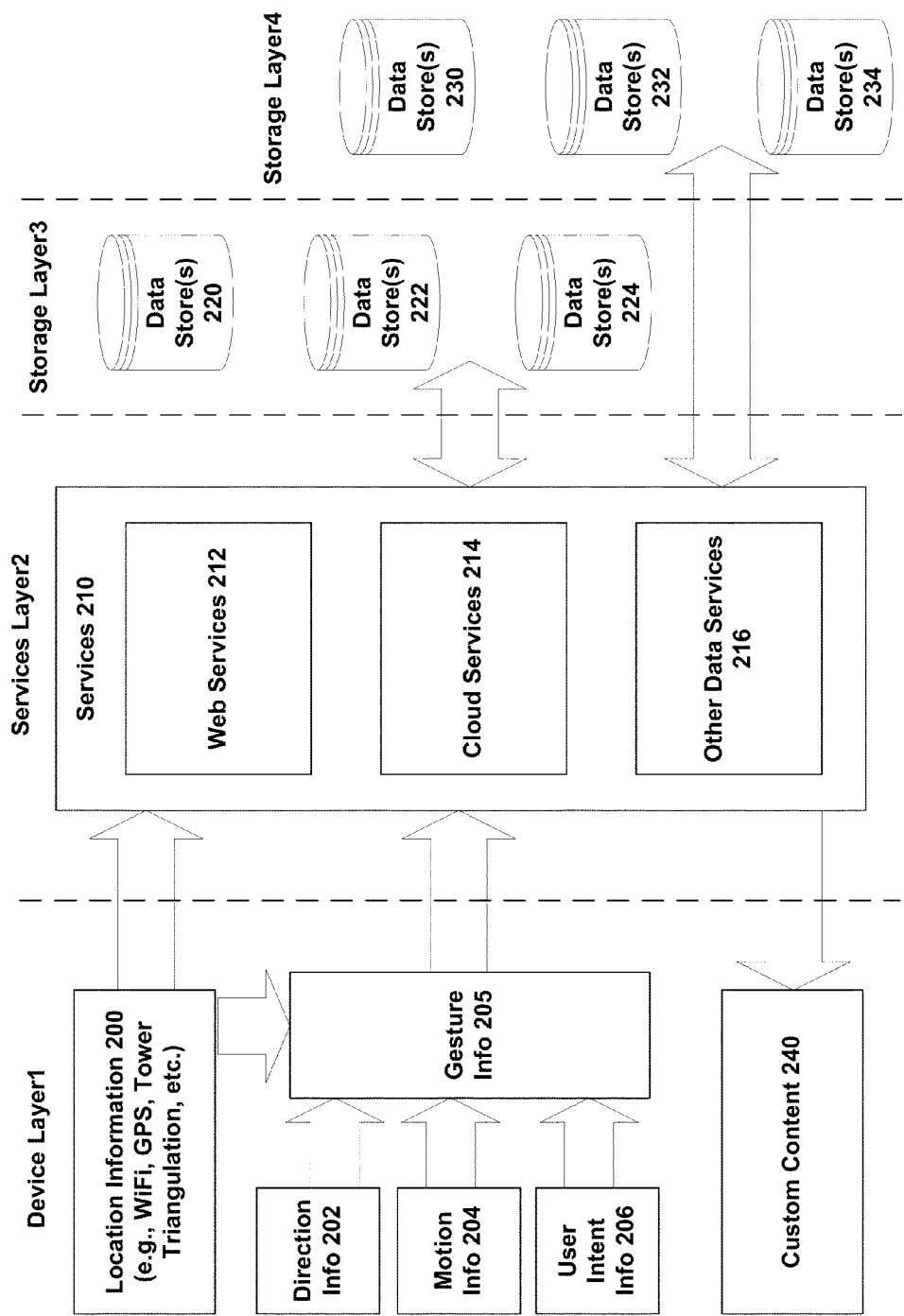
FIG. 2 is an exemplary non-limiting diagram of an architecture for achieving one or more embodiments described herein.

FIG. 2 is an exemplary non-limiting diagram of an architecture for achieving one or more embodiments described herein. At the device layer Layer1, location information 200, direction information 202, motion information 204 and user intent information 206 can be input to a Layer2 with various service 210, including web services 212, cloud services 214, other data services 216, etc. Gesture information 205 can be derived from any of location information 200, direction information 202, motion information 204 or user intent information 206. Any of services 210 can have input to a set of brick and mortar store databases in Layer3, such as data store(s) 220, 222, 224, etc. or set of online or electronic retailer databases in Layer4, such as data store(s) 230, 232, 234, etc. In this regard, user intent 204 coupled with a place of the device can be utilized by one or more services 210 to retrieve and deliver custom content 240 to the device from a variety of retail and online vendors based on gesture information 205 of the device.

Figure 3:
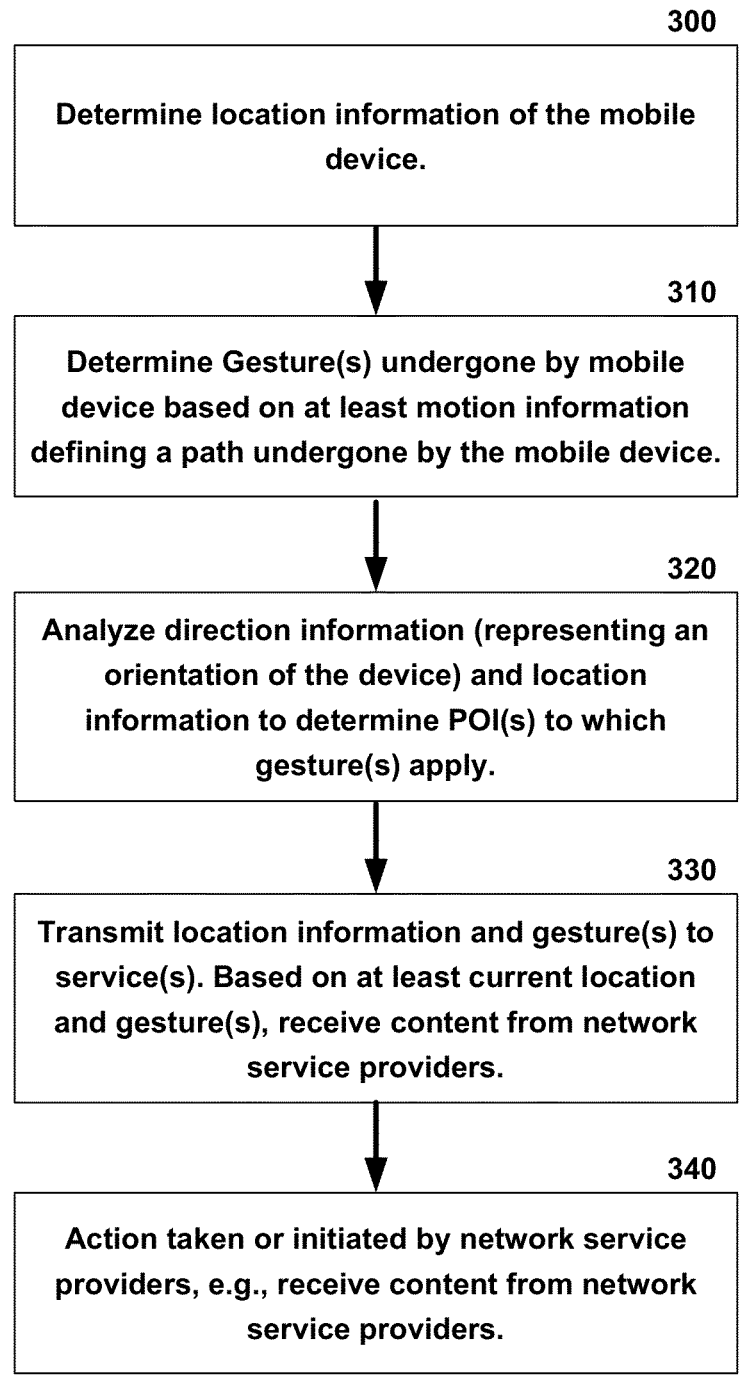
FIG. 3 is a flow diagram illustrating an exemplary sequence of actions of a non-limiting embodiment.

FIG. 3 is a flow diagram illustrating an exemplary sequence of actions of a non-limiting embodiment. At 300, location information of the mobile device is determined by a location subsystem of a mobile device. At 310, one or more gestures undergone by mobile device are determined based on at least motion information defining a path undergone by the mobile device. At 320, direction information (representing an orientation of the device) and location information are analyzed to determine a set of point(s) of interest, or POI(s), to which the gesture(s) apply. At 330, location information and the gesture(s) are transmitted to one or more service(s). Based on at least current location and gesture(s), content is received from various network service providers. At 340, action can be initiated or taken by the network service providers, e.g., content may be received from network service providers.

Figure 4:
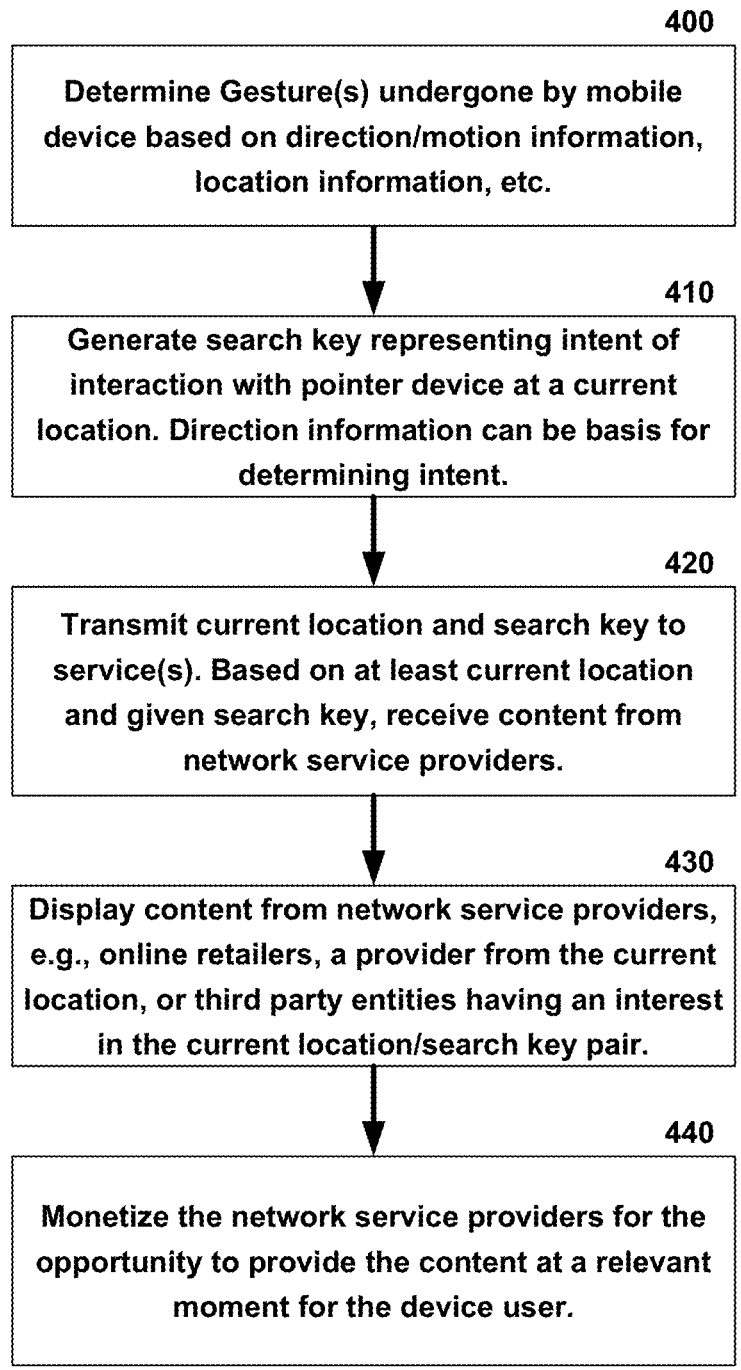
FIG. 4 is a flow diagram illustrating an exemplary sequence of actions of another non-limiting embodiment.

FIG. 4 is a flow diagram illustrating an exemplary sequence of actions of a non-limiting embodiment.

At 400, gesture(s) undergone by a mobile device are determined based on direction/motion information, location information, etc., i.e., the path of the device is discerned in 2-D or 3-D. At 410, a search key representing intent of interaction with the pointer device at a current location is generated. Direction information can be basis for determining intent. At 420, the current location and search key are transmitted to the service(s). Based on the current location and given search key, content from network service providers may be received. At 430, the content from the network service providers is displayed, e.g., online retailers, a provider from the current location, or third party entities having an interest in the current location/search key pair. At 440, the network service providers can be monetized by a billing system, for the opportunity to provide the content at a relevant moment for the device user.

Figure 5:
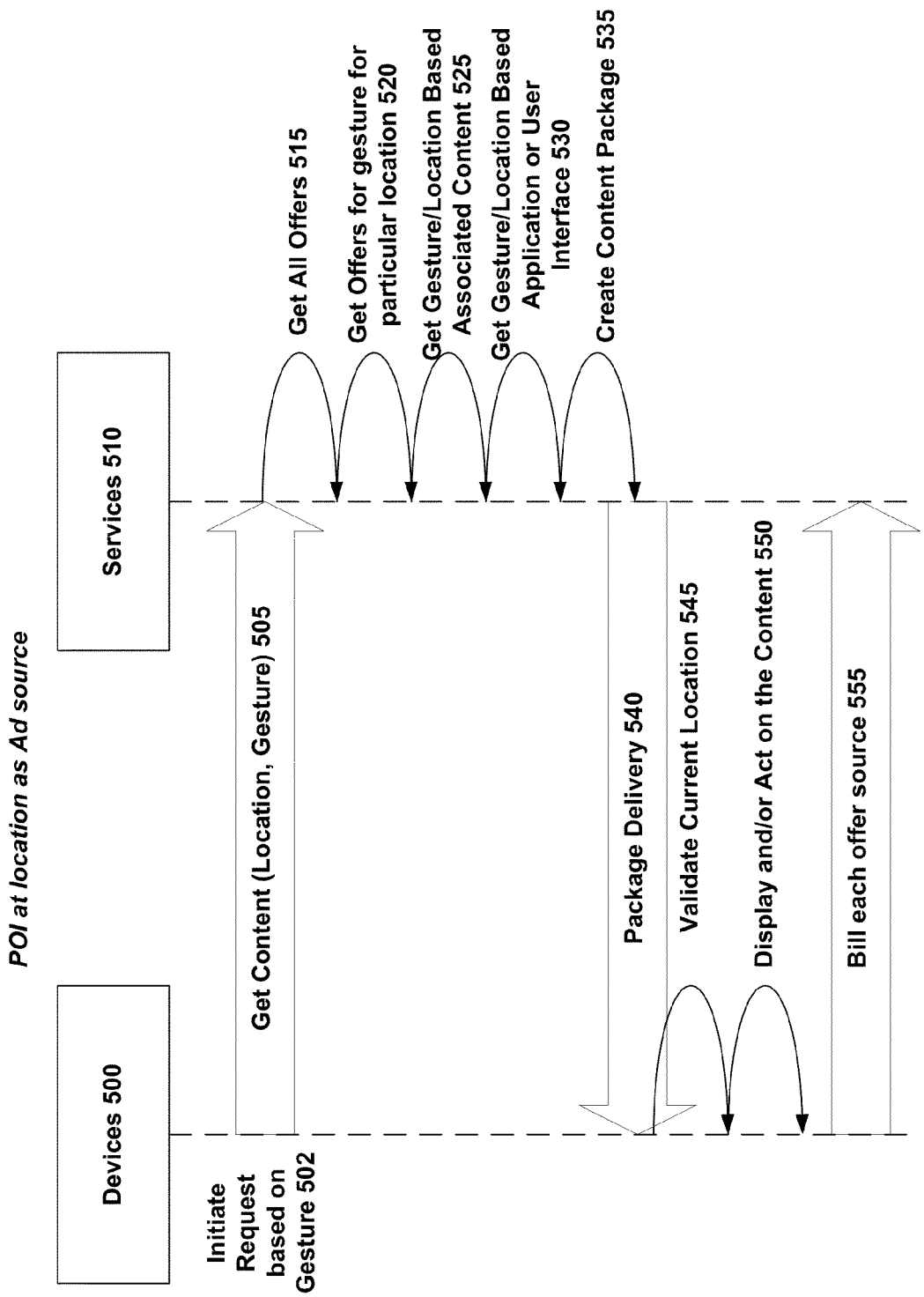
FIG. 5 is a block diagram illustrating an exemplary non-limiting implementation of an exchange between a device and service in accordance with gesture based interactions.

FIG. 5 is a block diagram illustrating an exemplary non-limiting implementation of an exchange between a device 500 and service 510. After start 502, e.g., initiated by a gesture, an example request 505 for illustrative purpose is made by a device 500 to a service 510, such as "get special offers," which includes data related to the location of the device and a search key for use by the service in determining content for retrieval. For instance, as a result of a "get offers" gesture and location based request, then, at 515, the service 510 gets all offers, at 520, gets the offers for the given location (or given point of interest if identified). At 525, the service 510 may get content associated with the location along with an optional branded user interface at 530. At 535, a content package is created and delivered to the device 500 at 540. The device can undergo a check for the current location at 545. Optionally, the results can be modified, e.g., re-ordered at 550. Lastly, based on an advertising model, the content providers or owners can be billed at 555.

Figure 6:
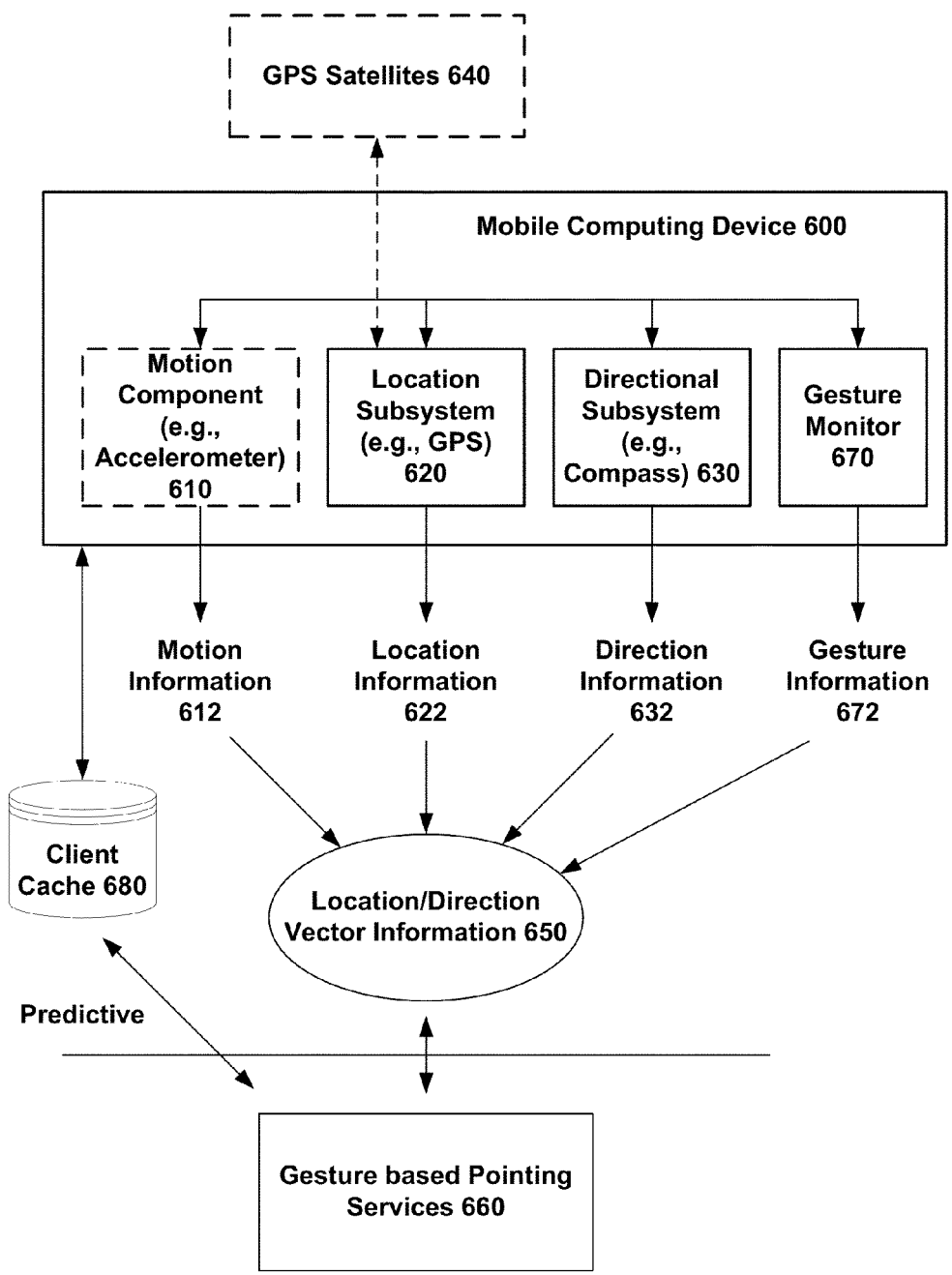
FIG. 6 illustrates a mobile computing device according to an embodiment upon which a set of gesture and direction based services can be built according to one or more embodiments.

FIG. 6 illustrates a mobile computing device 600 according to an embodiment. In this regard, a set of services 660 can be built based on motion information 612, location information 622 and/or direction information 632 collected by a mobile device, such as a phone. For instance, location information 622 can be recorded by a location subsystem 620 such as a GPS subsystem communicating with GPS satellites 640. Direction or pointing information 632 can be collected by a direction subsystem 630, such as a compass, e.g., gyroscopic, magnetic, digital compass, etc. In addition, movement information 612 can be gathered by the device 600, e.g., via tower triangulation algorithms, and/or acceleration of the device 600 can be measured as well, e.g., with an accelerometer. From any one or more of the motion information 612, location information 622 and/or direction information 632, gesture information 672 can be determined by a gesture monitor component 670.

The collective information 650 can be used to gain a sense of not only where the device 600 is located in relation to other potential points of interest tracked or known by the overall set of services 660, to understand what direction the user is pointing the device 600 so that the services 660 can appreciate at whom or what the user is pointing the device 600 and to further gain a sense of how the user wishes to interact with the place or point of interest via the gesture information 672.

Gesture subsystem 670 can be predicated on any one or more of the motion information 612, location information 622 or direction information 632. In this regard, not only can direction information 632 and location information 622 be used to define a set of unique gestures, but also motion information 612 (such as speed and acceleration) can be used to define a more sophisticated set of gestures.

FIG. 6 thus illustrates a gesture subsystem 670 can be included in a device 600 to enable a host of scenarios where the user may not be able to make detailed input to the device 600 by conventional methods. In this regard, one can appreciate that a variety of algorithms could be adopted for a gesture subsystem 670. For a non-limiting example of a simple gesture, a click and aim event when in the "pointing mode" for the device 600 can result in determining a set of points of interest for the user. A client cache 680 can be included in the system. By saving information about points of interest of potential interest to the device 600 in client cache 680, a user of the mobile computing device 600 need not always derive the benefit of the gesture based interaction from a network service 660, but rather can be satisfied locally by predictively pre-fetching information of probable interest to the device 600.

Figure 7:
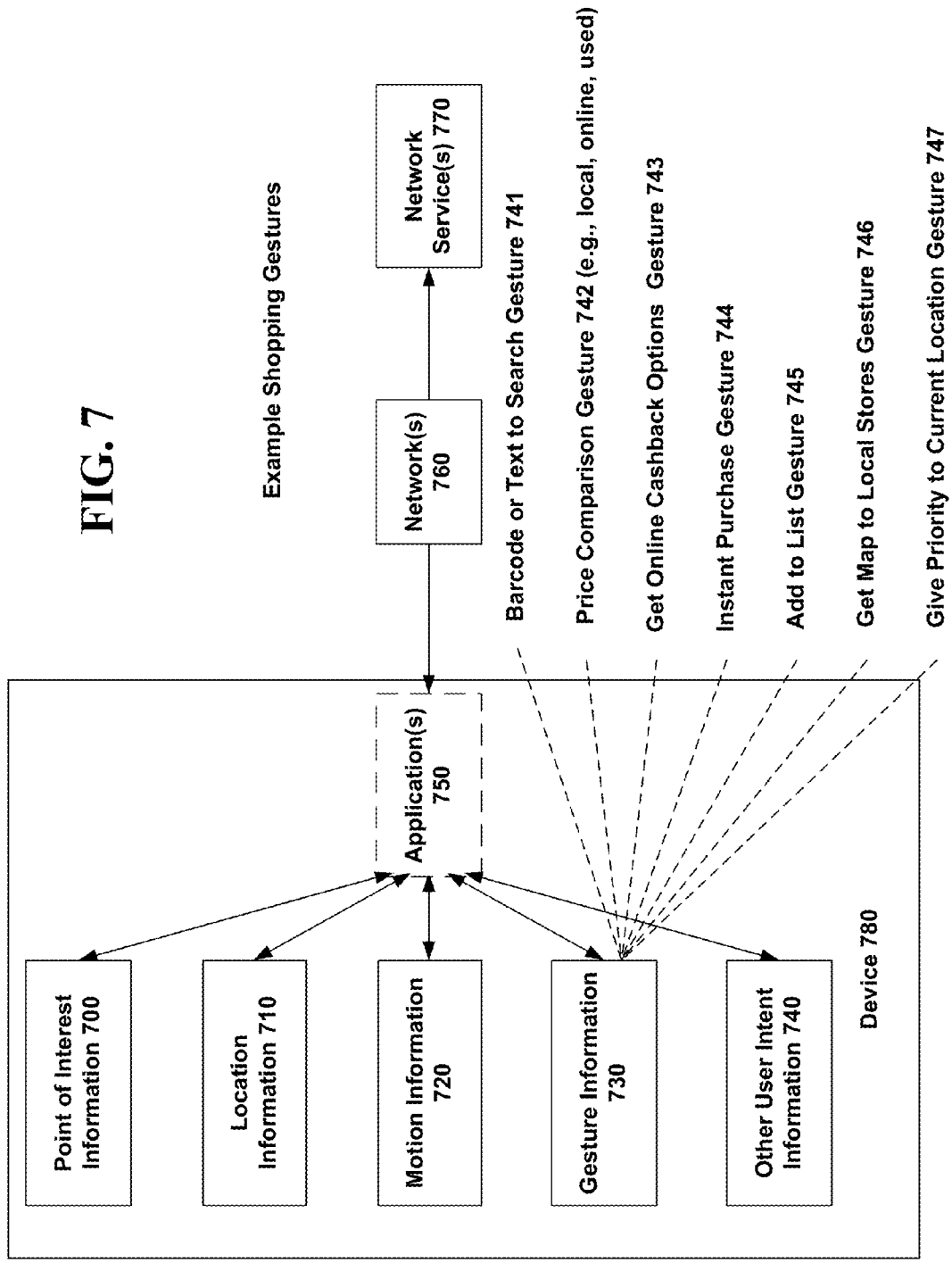
FIG. 7 is a block diagram of a device illustrating a variety of gesture based actions in accordance with various embodiments.

FIG. 7 is a block diagram of a device 780 in an exemplary embodiment illustrating a variety of gesture based actions that can be taken by device 780 based on any of point of interest information 700, location information 710, motion information 720, gesture information 730 or other user intent information 740 brokered by the device 780 to network services 770 via networks 760. Optionally, applications 750 can be provided to facilitate local processing and a layer (not shown) can be provided exposing the various pieces of information to predicate direction based services to the application layer 750.

In this regard, FIG. 7 illustrates that a variety of pre-defined gestures can be designed to represent gestures in a shopping environment, such as but not limited to a barcode or text to search gesture 741 that automatically initiates a search based on a barcode swipe or gesture with respect to a keyword, a price comparison gesture 742 (e.g., comparing local, online, used goods), a get online cashback options gesture 743 that initiates an inquiry into deals pertaining to an item of interest, an instant purchase gesture 744 that enables an immediate purchase of an item of interest such as a ticket to an event, an add to list gesture 745 that automatically adds the item to a list or set of lists, a get map to local stores gesture 746 that retrieves local information via a local network about points of interest not generally available, such as a topographical map laying out the store and various points of interest in that store, and a give priority to current location gesture 747 which biases one or more applications, services, requests, etc. to a current location for purposes of shopping.

Figure 8:
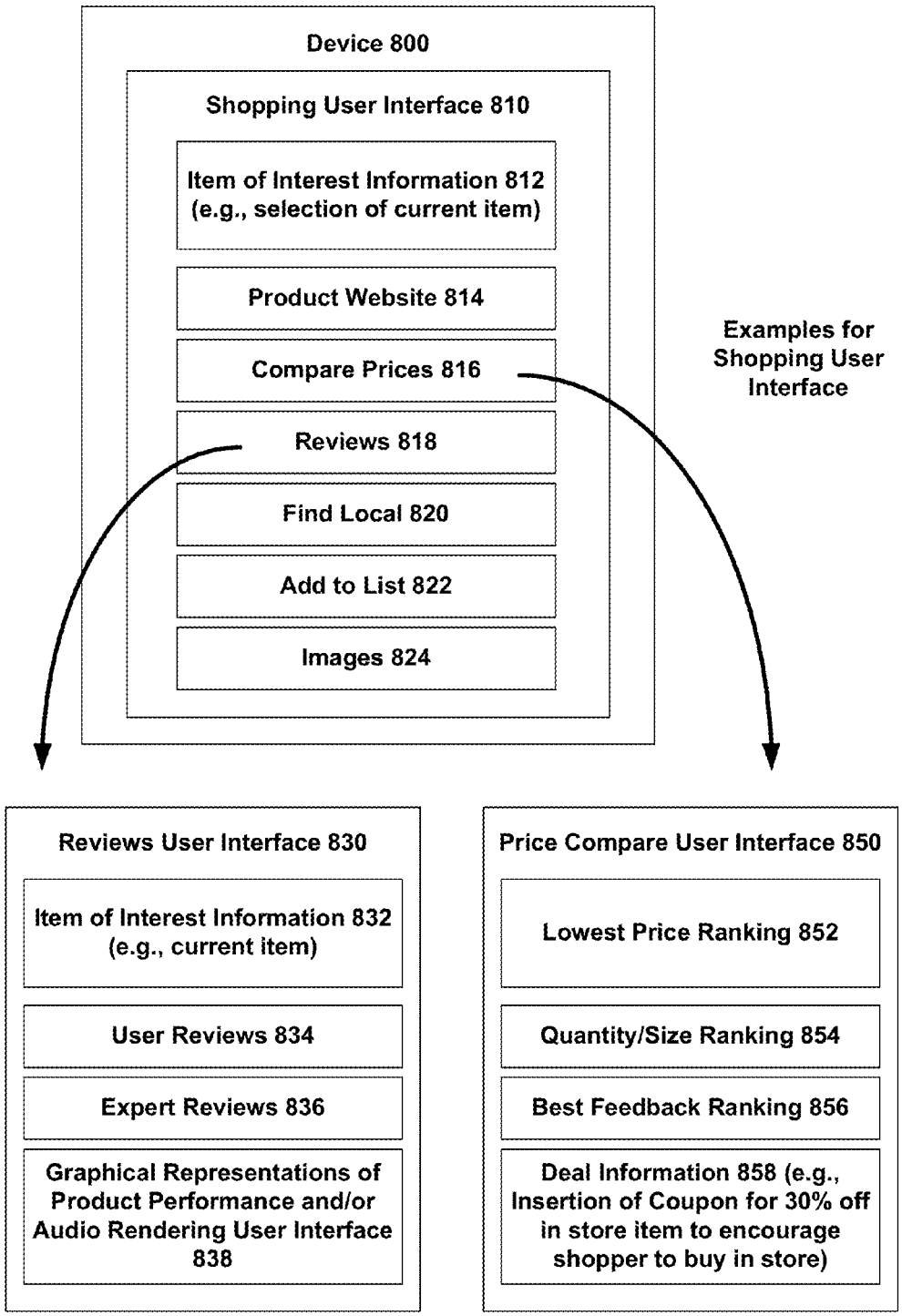
FIG. 8 is a block diagram illustrating non-limiting user interfaces that can be implemented in connection with a shopping experience.

FIG. 8 is a block diagram illustrating non-limiting user interfaces 810, 830, 850 of a device 800 that can be implemented in connection with a shopping experience. For instance, the following are some non-limiting examples of shopping experiences and interactions that can be invoked by way of explicit input or a pre-defined gesture via shopping user interface 810: item of interest information 812, e.g., showing a selection of a current item, request for product website 814, request for price comparison 816, request for reviews 818, find local store information 820, add item of interest to list 822, or request images 824.

Similarly, the following are some non-limiting examples of shopping experiences and interactions that can be invoked by way of explicit input or a pre-defined gesture via reviews user interface 830: information 832 about an item of interest, e.g., a currently selected item, request for user reviews 834, request for expert reviews 836, or request for graphical representations of product performance and/or audio rendering 838.

To further illustrate, the following are some non-limiting examples of shopping experiences and interactions that can be invoked by way of explicit input or a pre-defined gesture via request for price compare user interface 850: request for lowest price ranking 852, request for quantity/size ranking 854, request for best feedback ranking 856, request for deal information 858, e.g., insertion of coupon for 30% off in store item to encourage shopper to buy in store.

Figure 9:
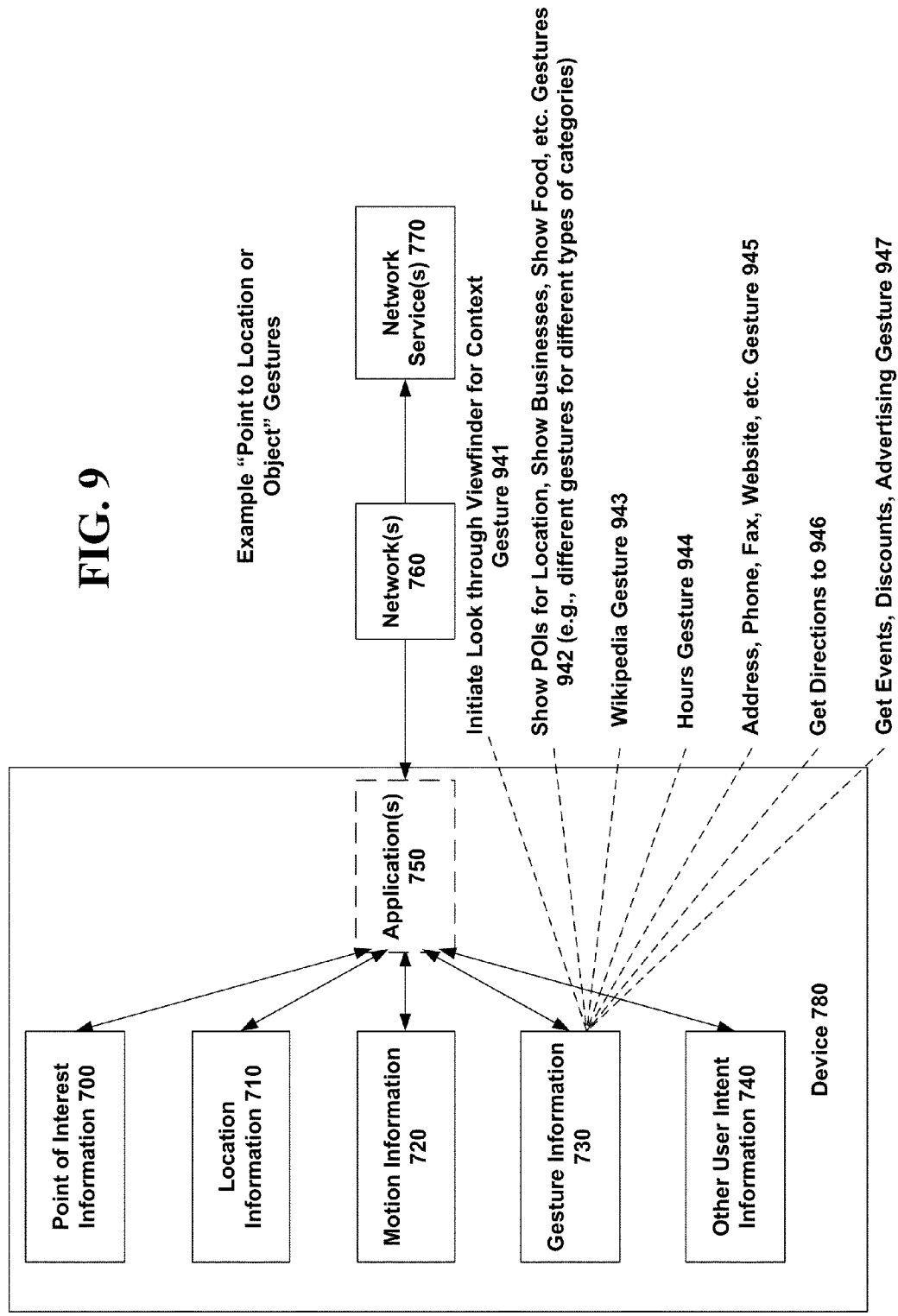
FIG. 9 illustrates that a variety of pre-defined gestures can be designed to represent gestures in a general environment having items or points of interest, or locations, that can be pointed at or to by a device.

Like FIG. 7, FIG. 9 is another block diagram of a device 780 in an exemplary embodiment illustrating a variety of gesture based actions that can be taken by device 780 based on any of point of interest information 700, location information 710, motion information 720, gesture information 730 or other user intent information 740 brokered by the device 780 to network services 770 via networks 760, optionally, via applications 750.

More specifically, FIG. 9 illustrates that a variety of pre-defined gestures can be designed to represent gestures in a general environment having items or points of interest, or locations, that can be pointed at or to by a device, such as but not limited to, a request to analyze the image content of a viewfinder for context gesture 941, such as show POIs for a location/direction gesture 942, e.g., show just businesses, show only food options, i.e., different gestures for different types of categories, a wikipedia gesture 943 that brings up Wikipedia knowledge regarding the given POI based on an associated keyword, an hours gesture 944 that brings up current status and when the POI maintains business hours, a request for information about the POI gesture 945, e.g., request for address, phone, fax, website, etc., a get directions to POI gesture 946, or a get events, discounts, advertising associated with a POI gesture 947.

FIG. 10 is a block diagram providing a non-limiting implementation for a point to location user interface 1010 for a device 1000. The point to location user interface 1010 includes an image section 1020, e.g., input from a camera included with the device 1000, wherein various POIs 1022, 1024, etc. are identified in the scene. In one embodiment, overlay information and actions 1032, 1034 are displayed over or near the POIs 1022, 1024, respectively (sample non-limiting locations for overlay shown). Filter UI 1036 allows a user of the device to filter the kinds or types of POIs that are found within the image section 1020. A gesture or other explicit input can also be made to define scope of the POIs shown in the image section 1020, e.g., the scope of POIs in terms of distance from the device 1000.

A non-limiting implementation of scope definition 1040 is shown in scope of points of interest UI 1050 in which the user selects a degree of scope ranging for near 1052 to far 1054. A similar exercise can be applied to set an elevation scope to capture towering POIs, such as buildings, mountains, lighthouses, etc. In this example, POI 1022 is far whereas POI 1024 is near, and so depending on how the gesture or input is made, one or the other POI may be selected based on the scope of POIs. In one embodiment, a tilt gesture achieves the desired effect, by tilting the viewfinder of a camera up, for example, the scope is extended outwards, whereas by tilting toward the ground, the scope retracts inwards. A user can pre-define unique gestures via a gesture definition application that help the user customize gestures of the phone that take action.

Figure 11:
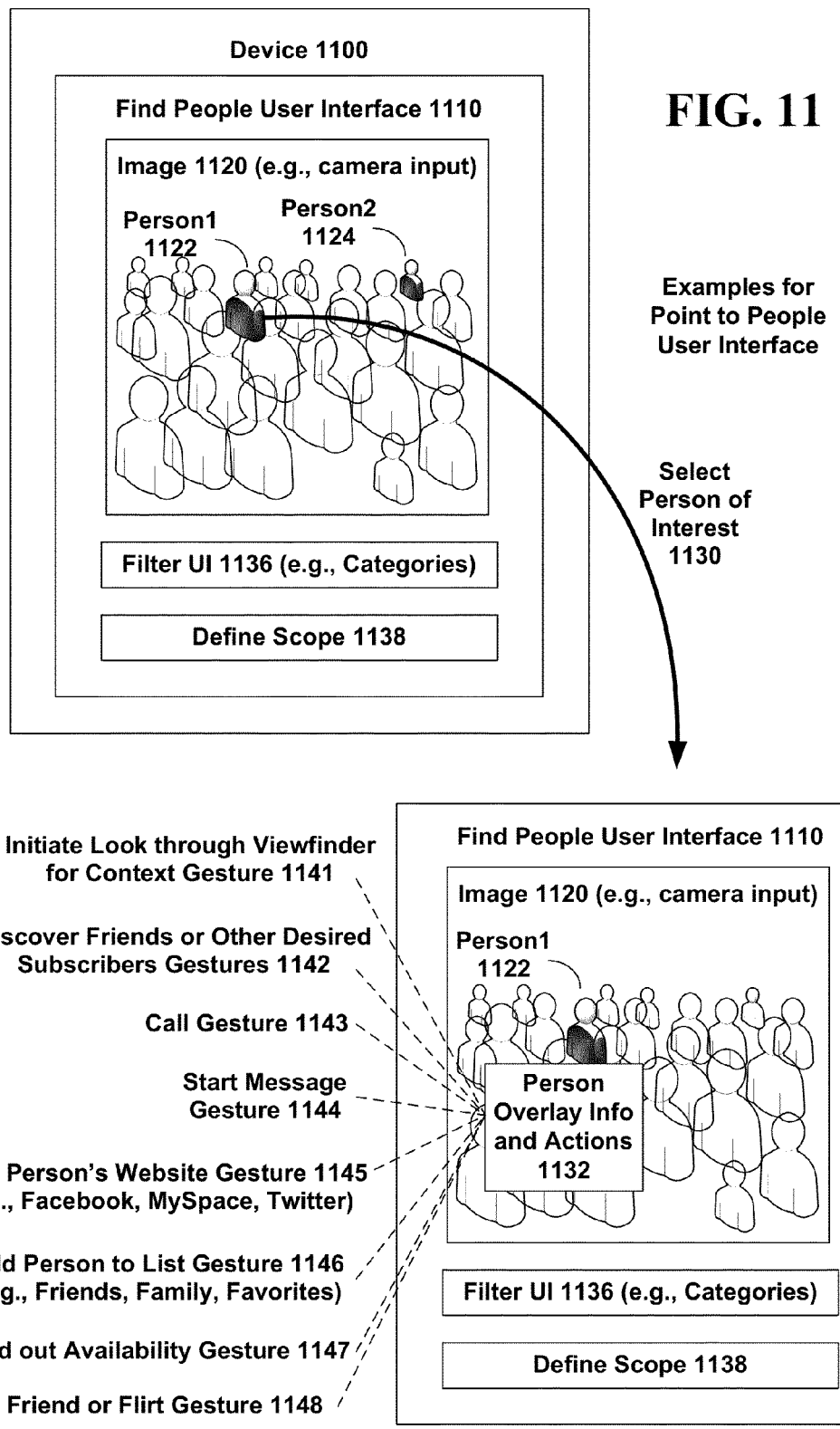
FIG. 11 is a block diagram providing a non-limiting implementation for a point to people user interface for a device.

FIG. 11 is a block diagram providing a non-limiting implementation for a point to people user interface 1110 for a device 1100. In this regard, find people user interface 1110 includes an image section 1120, e.g., camera input, whereby persons of interest person1 1122 and person2 1124 are illustrated for simplicity of example in a crowd of people. Again, a filter UI 1136 can be used to sort categories and a scope definition UI 1138 can help define the scope of physical space to be encompassed by the POI discovery. In the present example, a gesture towards a given person could initiate action or interaction in relation to that user. In so doing, a person of interest such as person of interest 1122 can be selected resulting in overlay information and actions 1132 over or nearby the selected person of interest.

Once a person or persons are selected, a user can gesture with the device in a variety of pre-defined or user defined ways per the following non-limiting examples: initiate look through viewfinder for context gesture 1141, discover friends or other desired subscribers gesture 1142, call gesture 1143, start message gesture 1144, view person's website gesture 1145, e.g., Facebook, MySpace, Twitter, add person to list gesture 1146, e.g., Friends, Family, Favorites, find out schedule availability gesture 1147, or friend or flirt gesture 1148, e.g., make a heart shape in 2-D with the device with respect to a person.

Figure 12:
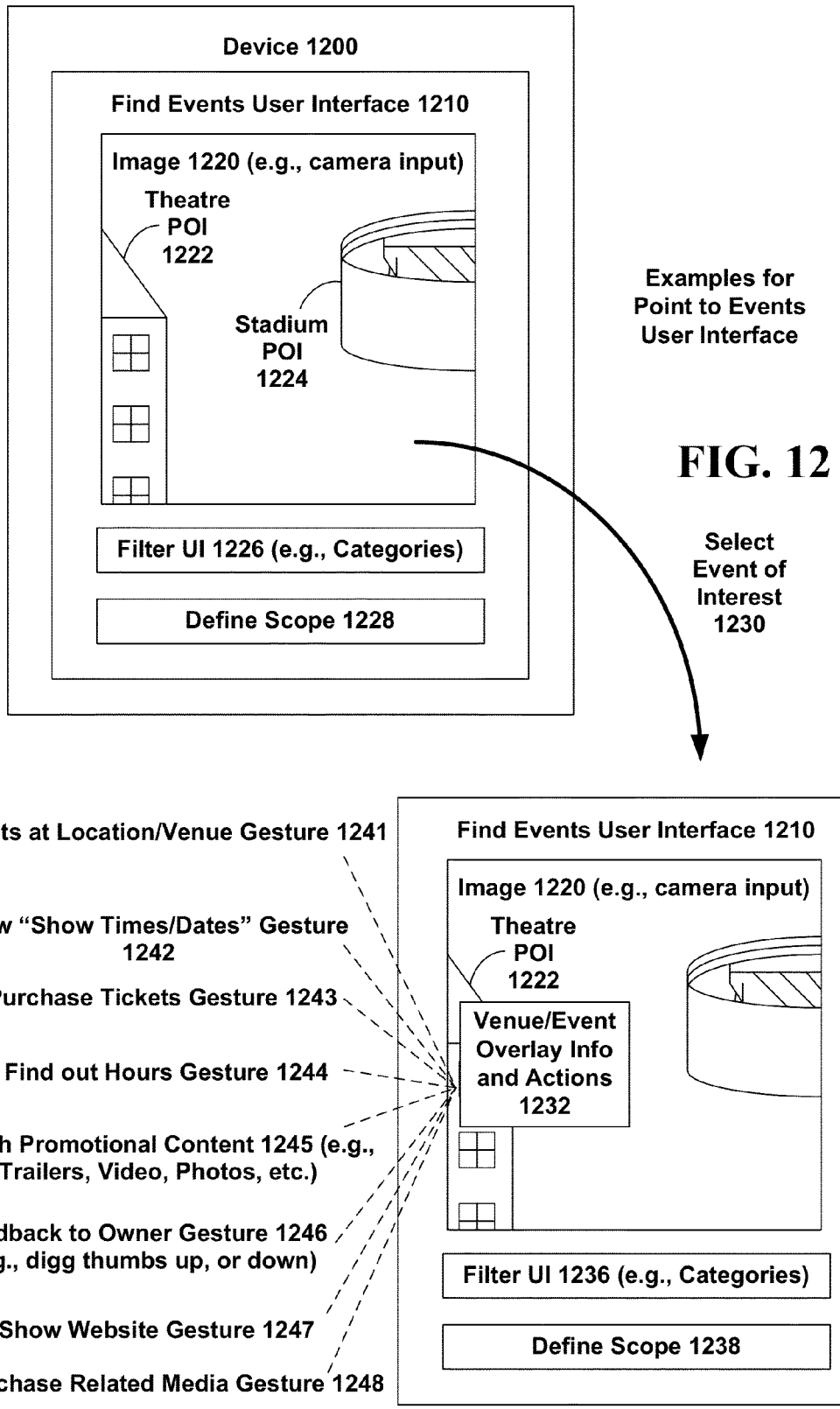
FIG. 12 is a block diagram providing a non-limiting implementation for a point to events user interface for a device.

FIG. 12 is a block diagram providing a non-limiting implementation for a point to events user interface 1210 for a device 1200. In this embodiment, a find events user interface 1210 is presented to a user. In image section 1220, POIs 1222 and 1224 are determined for a theatre and stadium, respectively, in the viewfinder as places that have events, which can be scoped with UI 1228 and filtered with UI 1226 similar to the above-described embodiments. By selecting a place 1230, such as the theatre POI 1222, venue/event information and actions 1232 are overlaid near or over the selected POI.

Once a place and associated events are selected, a user can gesture with the device in a variety of pre-defined or user defined ways per the following non-limiting examples: request for information about events at location/venue gesture 1241, show "Show Times/Dates" gesture 1242, purchase tickets gesture 1243, find out hours gesture 1244, watch promotional content 1245, e.g., Trailers, Video, Photos, etc., feedback to owner gesture 1246, e.g., digg thumbs up, or down, or a request for website gesture 1247.

Figure 13:
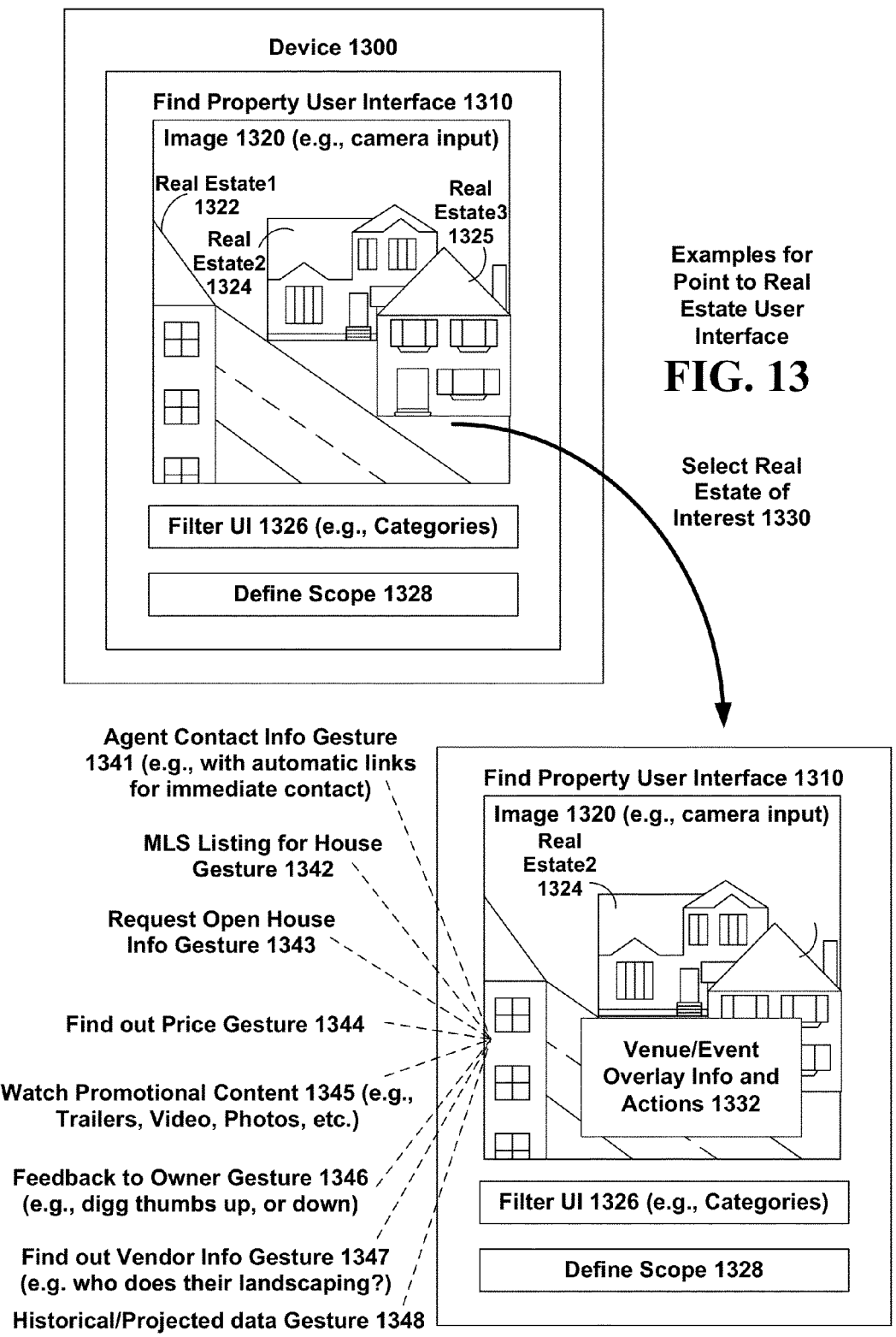
FIG. 13 is a block diagram providing a non-limiting implementation for a point to real estate user interface for a device.

FIG. 13 is a block diagram providing a non-limiting implementation for a point to real estate user interface 1310 for a device 1300. In this regard, find real estate user interface 1310 includes an image section 1320, e.g., camera input, whereby properties of interest real estate1 1322, real estate2 1124 and real estate3 1325 are illustrated for simplicity of example in a real estate setting. Again, a filter UI 1336 can be used to sort categories and a scope definition UI 1338 can help define the scope of physical space to be encompassed by the discovery of property. In the present example, a gesture towards or otherwise with respect to a property could initiate action or interaction in relation to that property. In so doing, a property of interest such as property of interest 1324 can be selected resulting in overlay information and actions 1332 over or nearby the selected property of interest.

Once a property or properties are selected at 1330, a user can gesture with the device in a variety of pre-defined or user defined ways per the following non-limiting examples: agent contact info gesture 1341, e.g., with automatic links for immediate contact, multiple listing service (MLS) listing for house gesture 1342, request open house info gesture 1343, find out price gesture 1344, watch promotional content 1345, e.g., trailers, video, photos, etc., give feedback to owner gesture 1346, e.g., digg thumbs up, or down, find out vendor info gesture 1347, e.g., find out who does the landscaping, or a request for historical/projected data gesture 1348.

Figure 14:
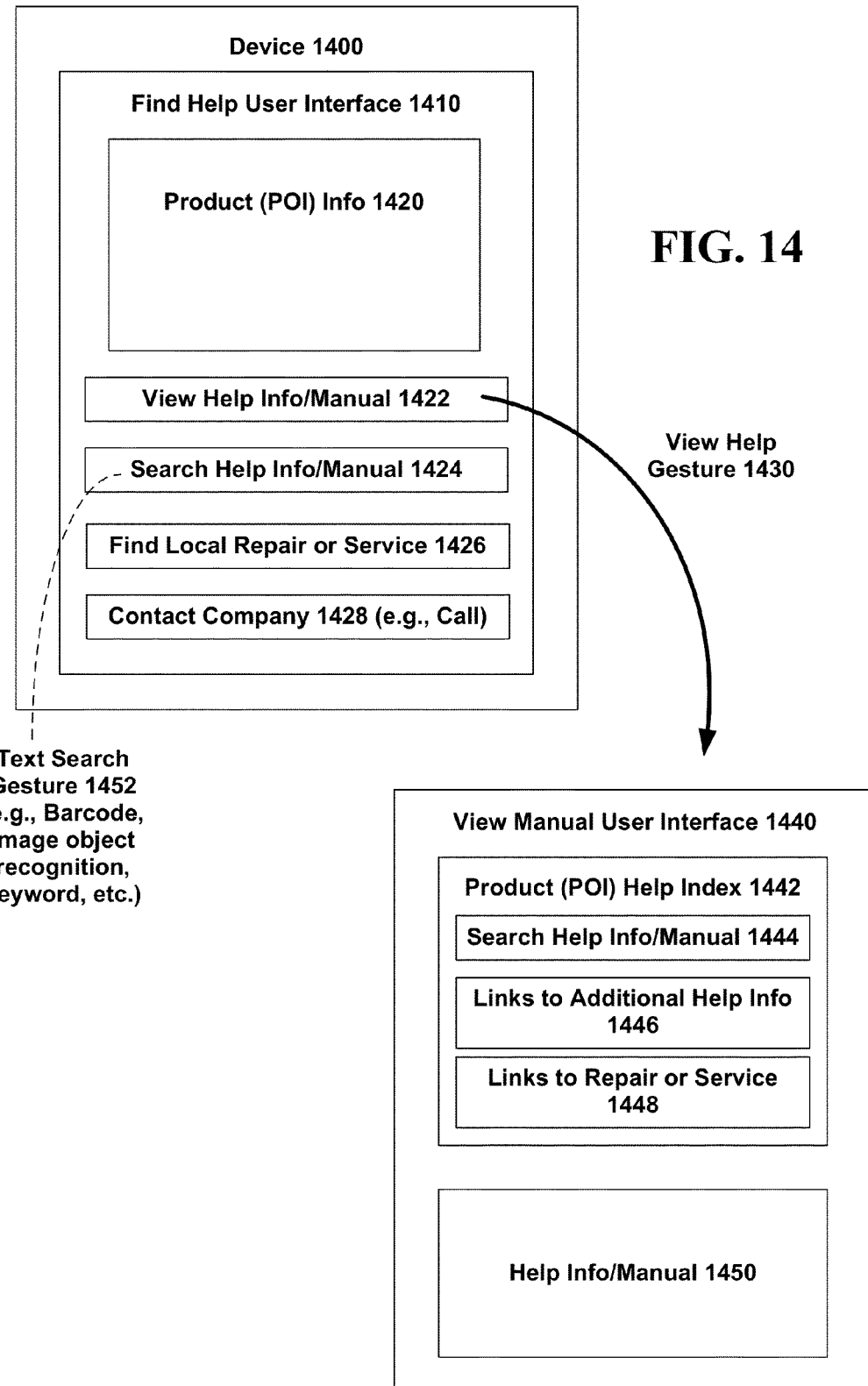
FIG. 14 is a block diagram providing a non-limiting implementation for a find help user interface for a device.

FIG. 14 is a block diagram providing a non-limiting implementation for a find help user interface 1410 for a device 1400. There are a variety of situations where a user may be interacting with a point of interest, such as a product selected and displayed in product (POI) info area 1420, in which case a user may wish to perform a text search gesture 1452 with respect to the POI, e.g., by scanning the object with bar code, image recognition, automatic keyword association. In such a case, for instance, a user may wish to view help information/manual information 1422 concerning the POI, search help info/manual 1424, find a local repair or service 1426, or contact the company 1428, e.g., call the company. In this regard, the present embodiment enables a user to gesture at an object, and in effect automatically retrieve valuable supplemental information helpful in warning about or using the product.

For instance, a view manual user interface 1440 can be invoked by performing a view help gesture 1430. View manual user interface 1440 may include product (POI) help index 1422, and correspondingly include the ability to search 144, link to supplemental help 1446, or link to repair or service for the item, as well as display a given section of the help information in section 1450.

Figure 15:
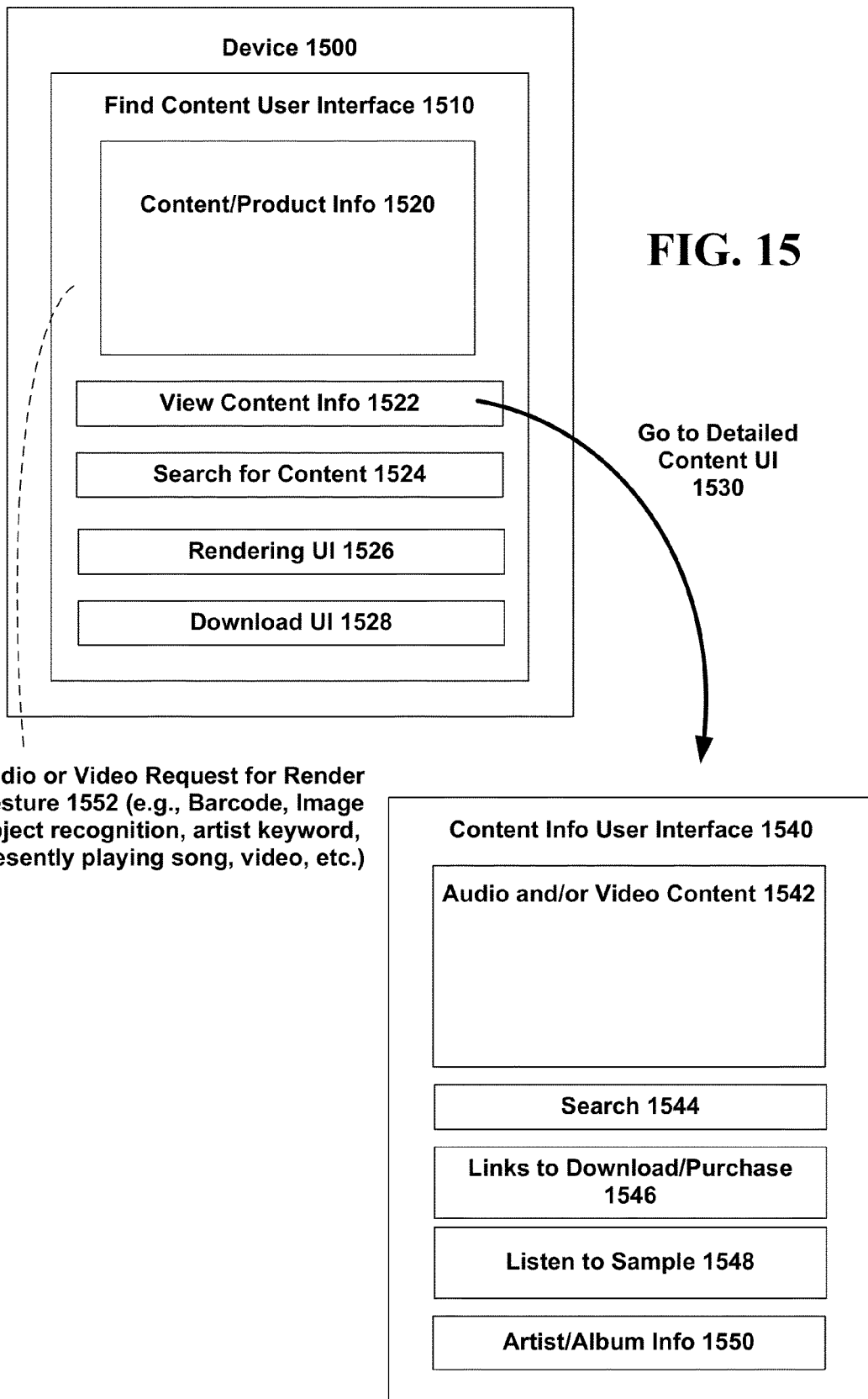
FIG. 15 is a block diagram providing a non-limiting implementation for a find content user interface for a device.

FIG. 15 is a block diagram providing a non-limiting implementation for a find content user interface 1510 for a device 1500. Content/product info is maintained in section 1520 for selected content. Content can be requested with an audio or video request for render gesture 1552 (e.g., by scanning a barcode, recognizing an object pertaining to music, movie, etc., by keyword of an artist, presently playing content, etc.). Find content user interface 1510 includes the ability to view content info 1522, an ability to search for content 1524, a rendering UI 1526, or a download UI to download content 1528. For more detailed content, a user can go to detailed content UI 1540 and view audio and/or video content 1542, search 1544, link to download/purchase 1546, listen to a sample 1548, discover artist/album info 1550, etc.

Figure 16:
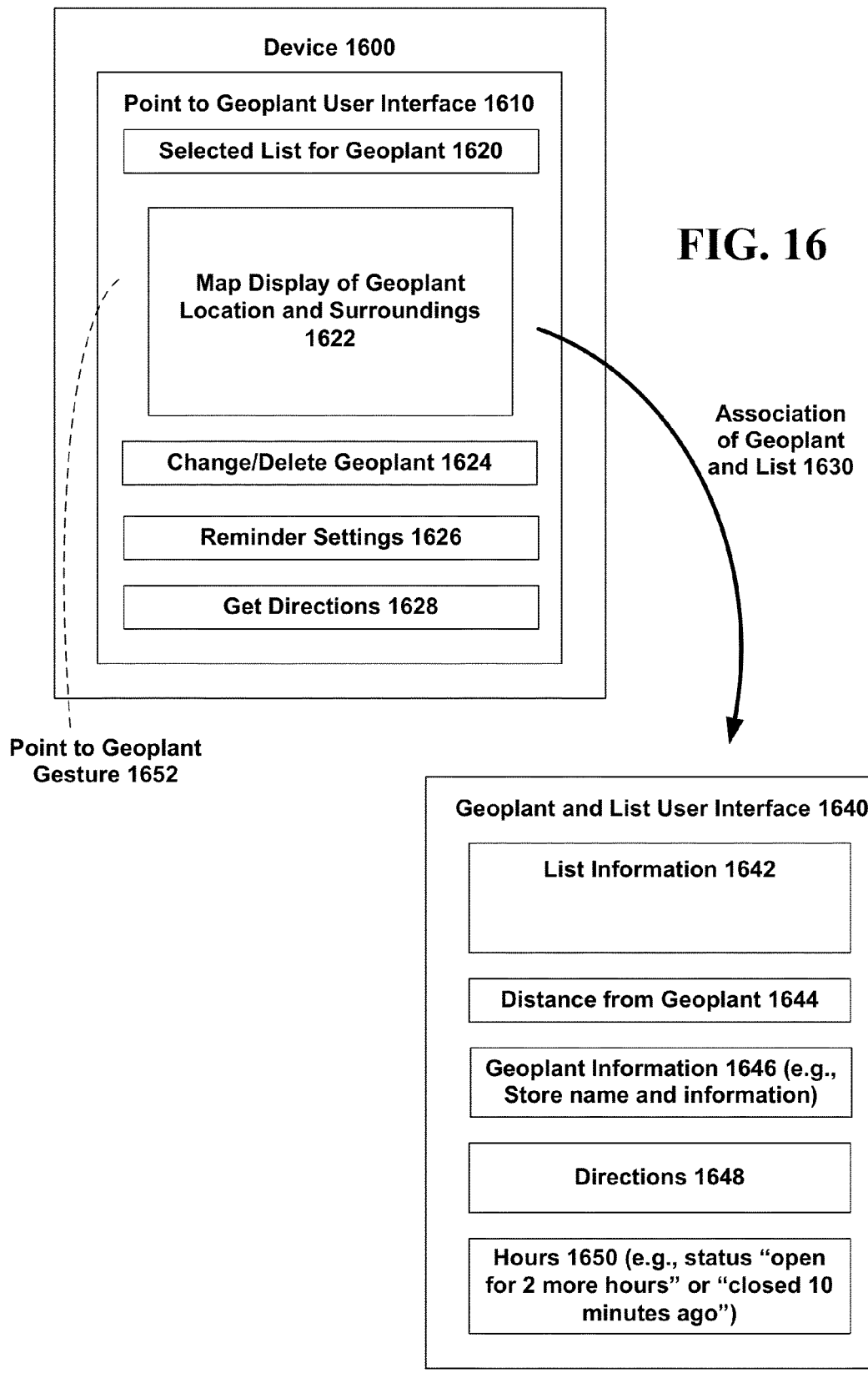
FIG. 16 is a block diagram providing a non-limiting implementation for a point to geoplant user interface for a device.

FIG. 16 is a block diagram providing a non-limiting implementation for a point to geoplant user interface 1610 for a device 1600. Point to geoplant user interface 1610, for example, enables device users to geoplant items for discovery later as they interact with the universe. For instance, geoplant list 1620 displays a selected list (e.g., groceries, birthday wish list, etc.) and area 1622 can display a current location and surroundings along with geoplanted items on the map if pertinent. Geoplant information can be changed/deleted 1624, various reminder settings 1626 can be configured, such as how close a user comes to an item before being notified of its being nearby. Once a geoplanted item is selected on the map, e.g., via a point to geoplant gesture 1652, a user can get directions 1628.

In the present non-limiting implementation, a user can add an item by geoplanting it and associating with a list 1630 and invoke geoplant and list user interface 1640, with list information 1642, distance from geoplant 1644, geoplant information 1646, e.g., store name and information, directions 1648, or hours 1650, e.g., status "open for 2 more hours" or "closed 10 minutes ago."

Figure 17:
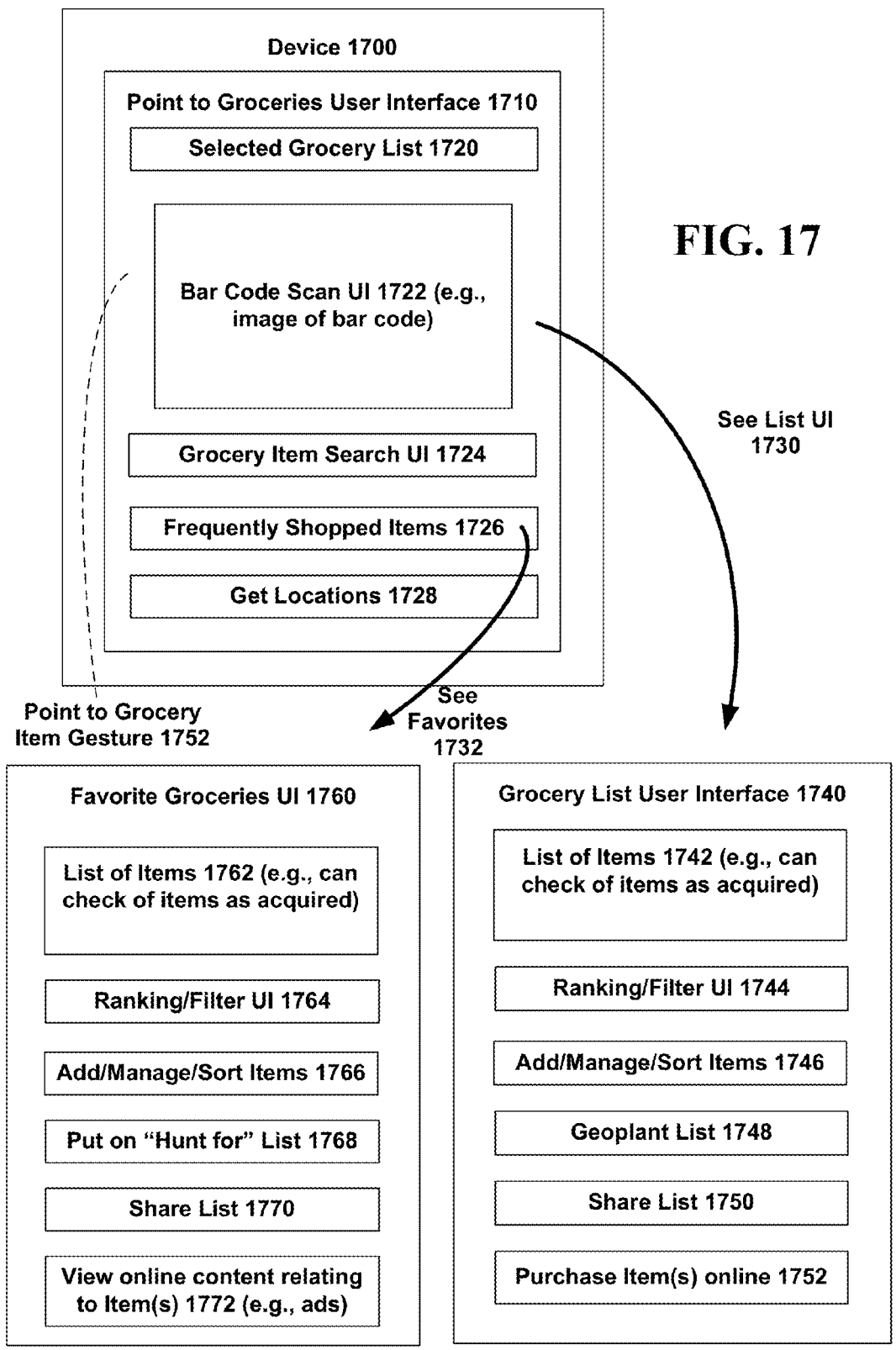
FIG. 17 is a block diagram providing a non-limiting implementation for a point to groceries user interface for a device.

FIG. 17 is a block diagram providing a non-limiting implementation for a point to groceries user interface 1710 for a device 1700. Point to groceries user interface 1710 enables a user of device 1700 to maintain a virtual shopping list that can remind the user when the user is nearby an item on the shopping list. For instance, a selected grocery list is displayed in area 1720, and perhaps a barcode scan image UI, or image of the object itself, is displayed in section 1722. A grocery item search UI is provisioned in section 1724. UI for frequently shopped items 1726 and get nearby locations 1728 can also be included. Thus, via a point to grocery item gesture 1752, the above functionality and addition of an item to a grocery list can be achieved.

With respect to the list, an operation might be to see the list UI 1730, thereby bringing up grocery list user interface 1740 including a list of items 1742, e.g., can check of items as acquired, ranking/filter UI 1744, add/manage/sort items 1746, geoplant list 1748, share list 1750, or purchase item(s) online 1752. Another operation with respect to groceries might be to see favorites 1732 via favorite groceries UI 1760, which may include a list of favorite items 1762, e.g., can check items as acquired, ranking/filter UI 1764, add/manage/sort items 1766, put on "Hunt for" list 1768 (described in more detail below), share list 1770 or view online content relating to item(s) 1772, e.g., ads.

Figure 18:
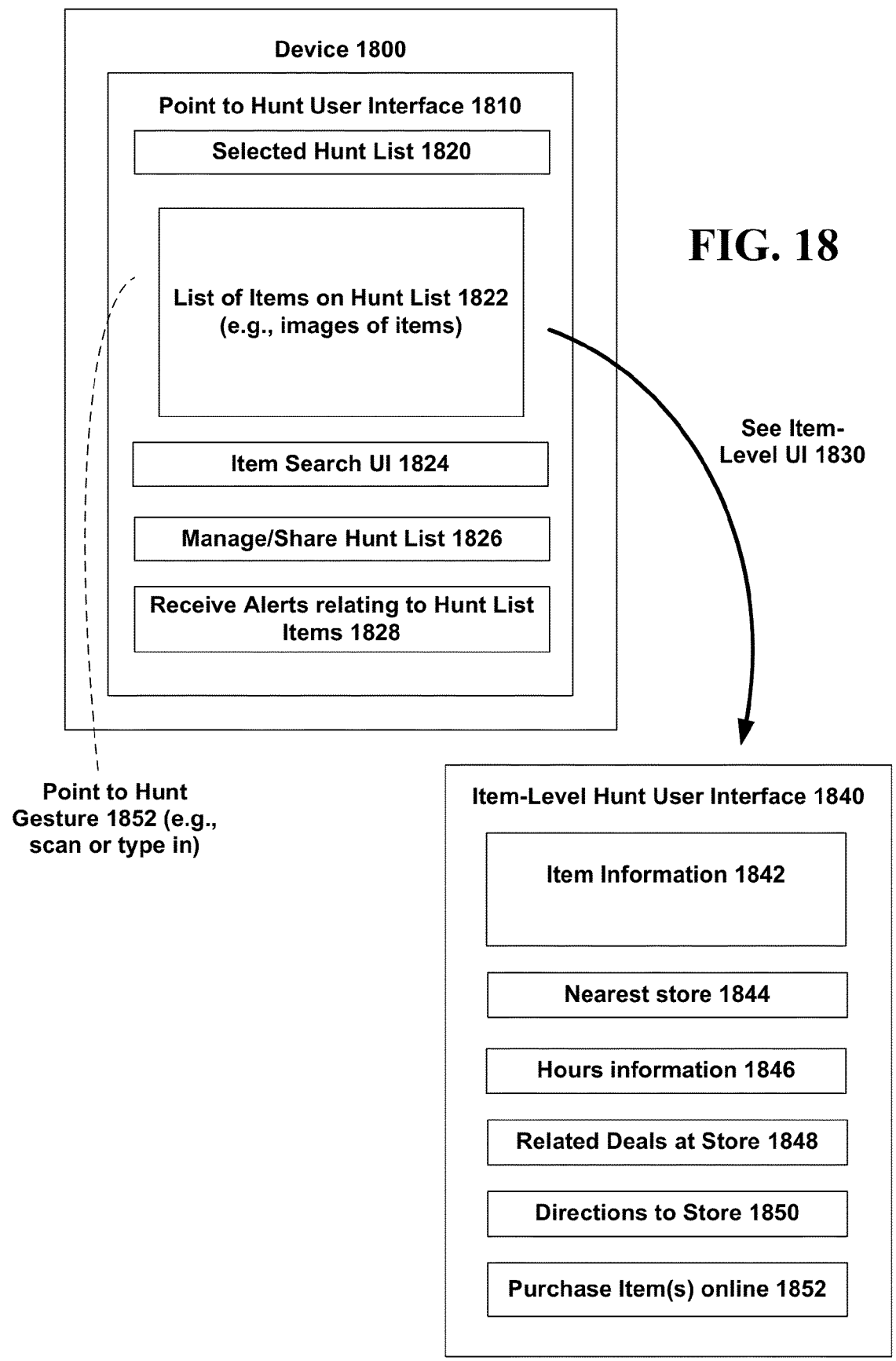
FIG. 18 is a block diagram providing a non-limiting implementation for a point to hunt user interface for a device.

FIG. 18 is a block diagram providing a non-limiting implementation for a point to hunt user interface 1810 for a device 1800. In a point to hunt scenario with point to hunt user interface 1810, a selected hunt list 1820 defines a list of items for which the user is hunting. To add an item to the list, a user can gesture 1852 to scan or type in the item. A current list of items on the selected hunt list 1820 can be displayed in area 1822. An item search UI 1824 can be includes along with a facility 1826 to manage and share hunt lists with others. In addition, alerts can be received relating to the hunt list items 1828, e.g., when the user enters a store having one or more items.

To learn more about an item on the hunt list 1820, a user can select an item 1830 and invoke item-level hunt user interface 1840, which can include item information 1842, nearest store information 1844, hours information 184, related deals 1848, directions to store(s) 1850, or enable purchase of item(s) online 1852.

Figure 19:
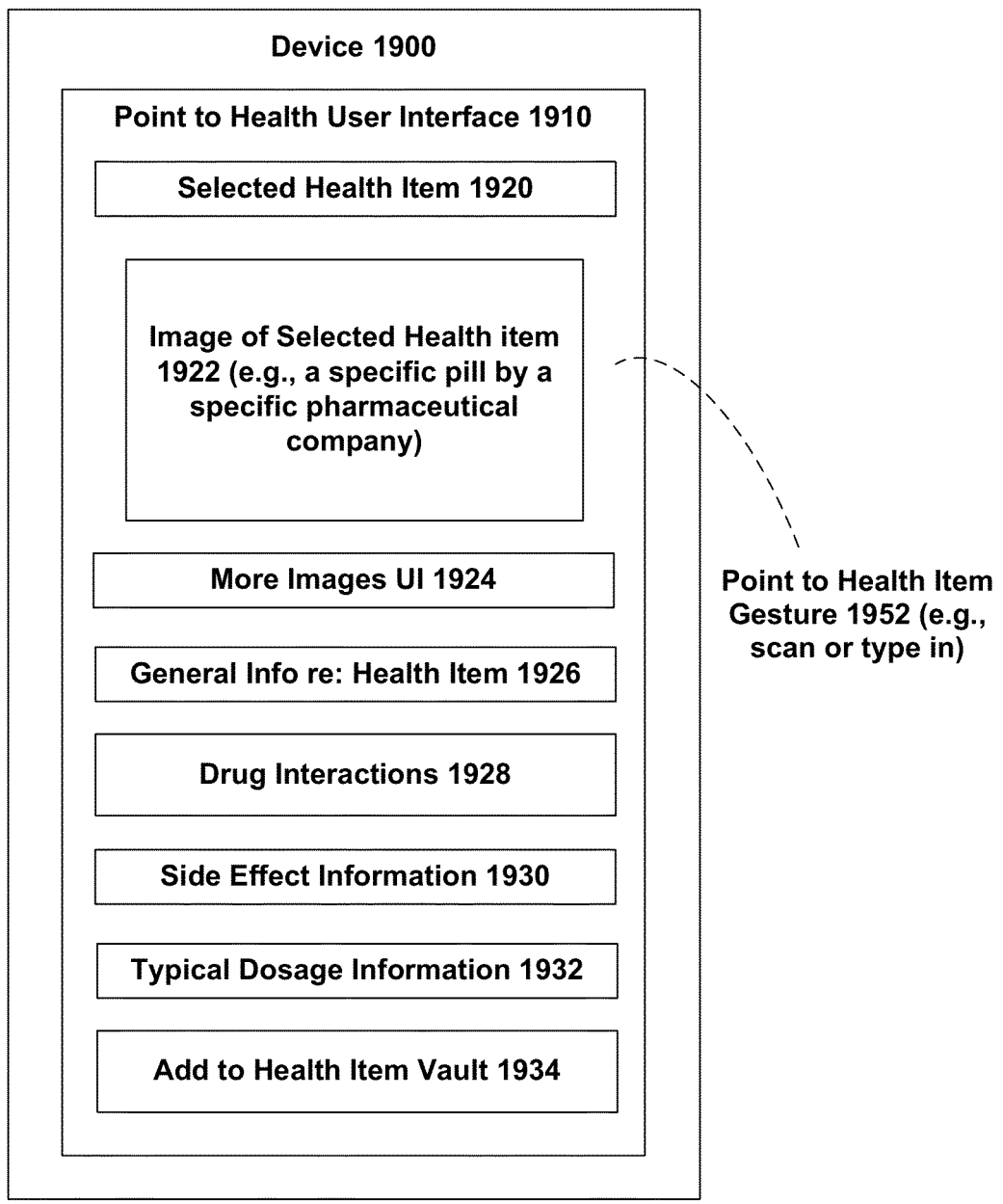
FIG. 19 is a block diagram providing a non-limiting implementation for a point to health user interface for a device.

FIG. 19 is a block diagram providing a non-limiting implementation for a point to health user interface 1910 for a device 1900. In this embodiment, point to health user interface 1910 includes a selected health item 1920, e.g., a specific pill by a specific pharmaceutical company, an image of selected health item 1922, optional additional images UI 1924, general info re: health item 1926, drug interaction information 1928, side effect information 1930, typical dosage information 1932, etc. or the ability to add the item to a health item vault 1934. In this regard, a user can engage in a point to health item gesture 1952, e.g., scanning an image of the item, which is analyzed to identify the item, or type in the item explicitly if the user has clues about the item's identity.

Figure 20:
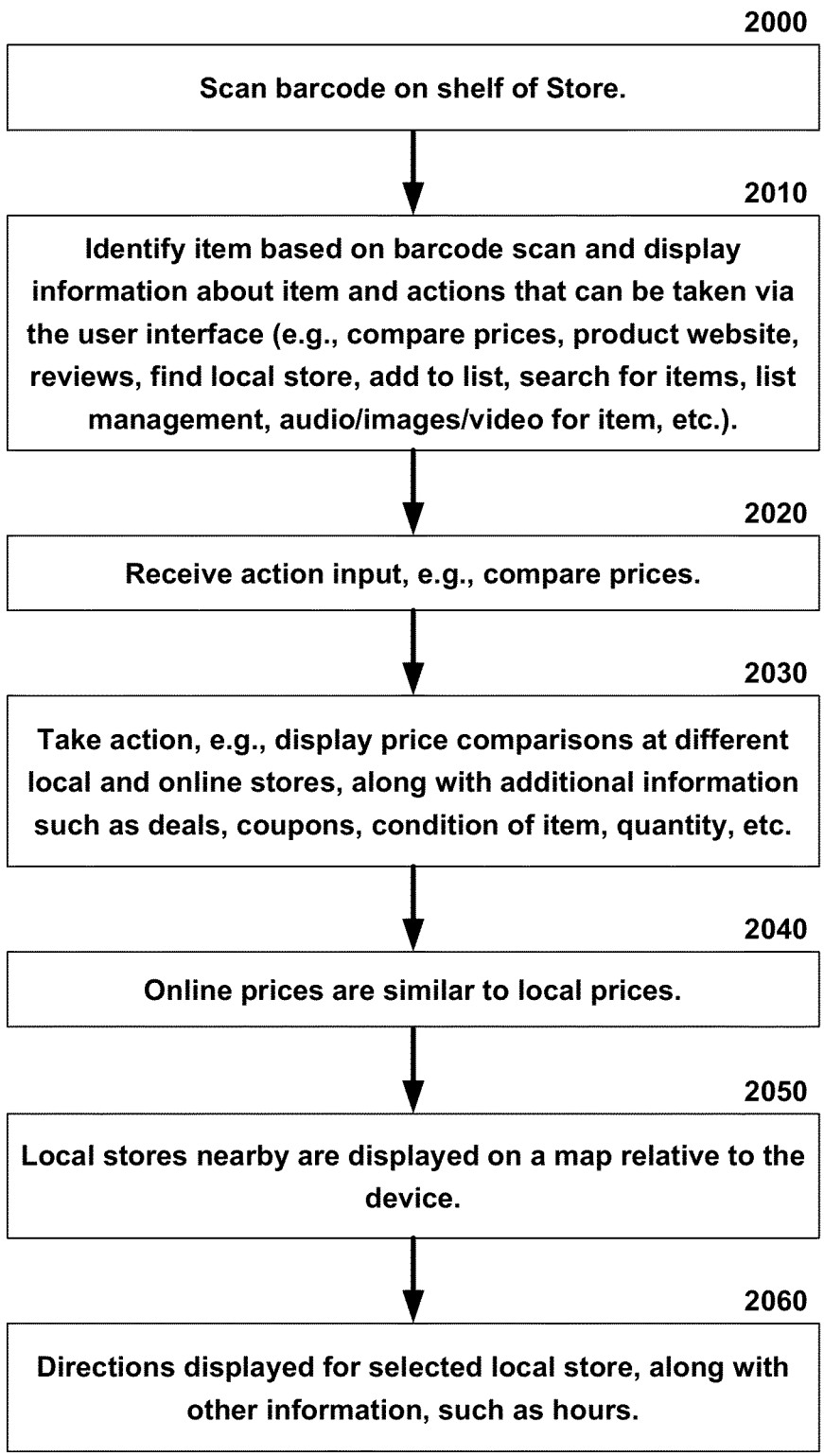
FIG. 20 is a flow diagram of a non-limiting scan and price compare process that can be performed with a pointing device using gestures in accordance with an embodiment.

FIG. 20 is a flow diagram of a non-limiting scan and price compare process that can be performed with a pointing device using gestures in accordance with an embodiment to create an enhanced shopping experience seamless between online and offline worlds. At 2000, a barcode of an item is scanned, e.g., via a gesture, on a shelf of a store. At 2010, the item is identified based on the barcode scan and information about the item and actions that can be taken are displayed via the user interface (e.g., compare prices, product website, reviews, find local store, add to list, search for items, list management, audio/images/video for item, etc.). At 2020, action input is received, e.g., the user requests to compare prices. This can be achieved with a "price compare" gesture at an item when in the shopping context. At 2030, the action requested is taken, e.g., price comparisons at different local and online stores are displayed along with additional information such as deals, coupons, condition of item, quantity, etc. At 2040, the user notices that online prices are similar to local prices, so might as well buy locally and take the item home today. At 2050, local stores nearby are displayed on a map relative to the device and at 2060, directions are displayed for a selected local store, along with other information, such as hours and whether the store is still open.

Figure 21:
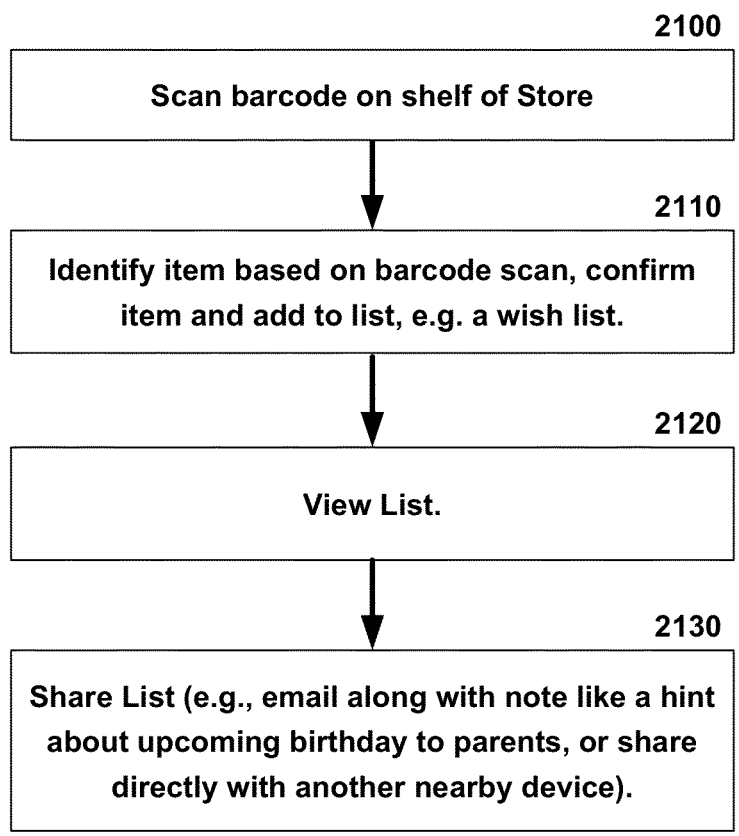
FIG. 21 is a flow diagram of a non-limiting scan and add to list process that can be performed with a pointing device using gestures in accordance with an embodiment.

FIG. 21 is a flow diagram of a non-limiting scan and add to list process that can be performed with a pointing device using gestures in accordance with an embodiment for improved list fulfillment by geoplanting items on the list. At 2100, a barcode of an item is scanned, e.g., via a gesture, on a shelf of a store. At 2110, the item is identified based on a barcode scan, confirmed and then added to a list, such as a wish list. At 2120, the list is displayed. At 2130, the list can be shared, e.g., emailed along with note like a hint about upcoming birthday to parents, or shared directly with another nearby device.

Figure 22:
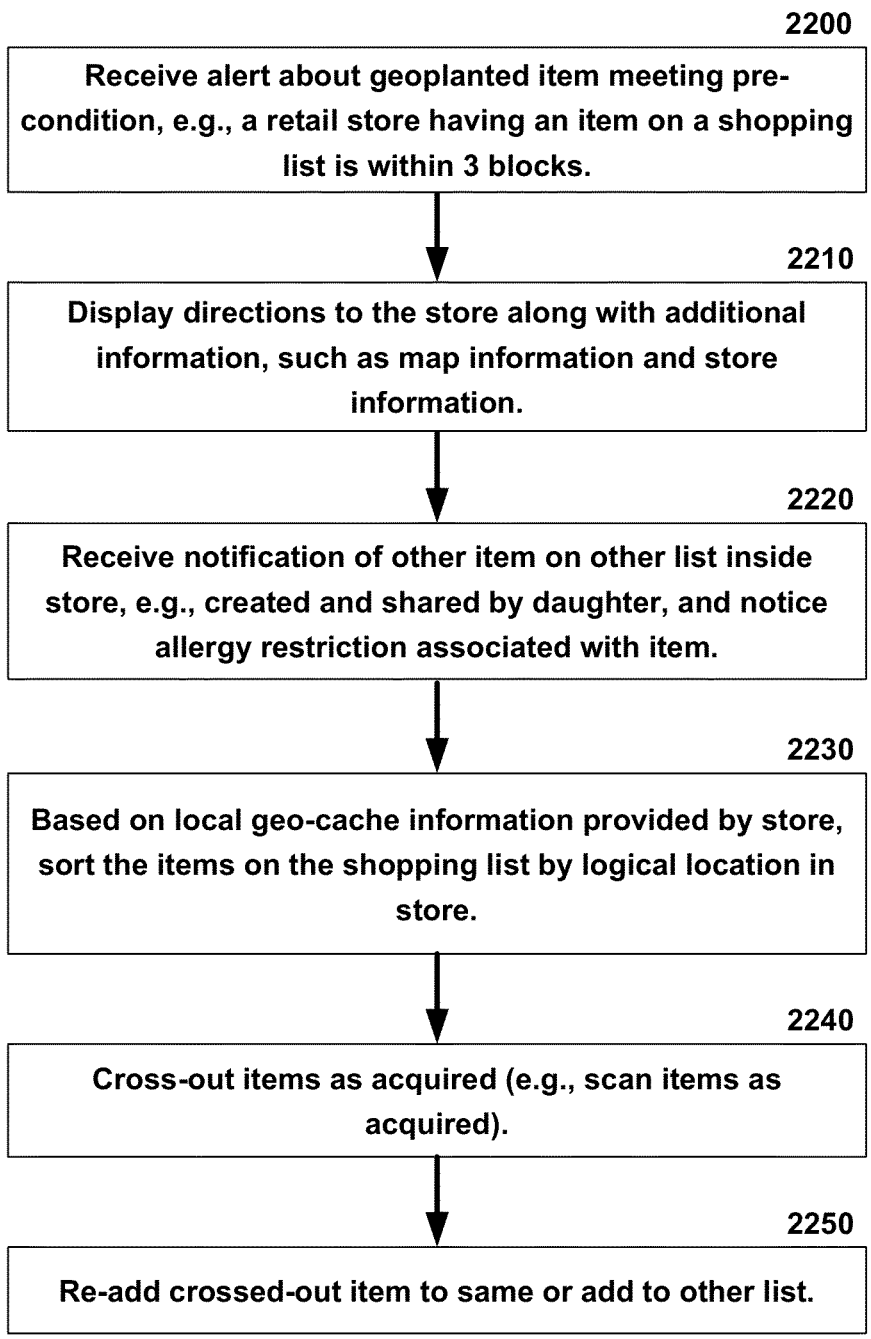
FIG. 22 is a flow diagram of a non-limiting geoplanted reminder process that can be performed with a pointing device using gestures in accordance with an embodiment.

FIG. 22 is a flow diagram of a non-limiting geoplanted reminder process that can be performed with a pointing device using gestures in accordance with an embodiment for interacting with an item on a hunt list. At 2200, an alert is received about a geoplanted item meeting a pre-condition, e.g., a retail store having an item on a shopping list is within three blocks. At 2210, directions are displayed to the store along with additional information, such as map information and store information. At 2220, a notification is received of another item on another list inside the store, e.g., the item and list where created and shared by the daughter of the device user, or a notice about an allergy restriction associated with item. At 2230, based on local geo-cache information provided by store, the items on the shopping list can be sorted by logical location in store. At 2240, items are automatically crossed-out as acquired (e.g., items are scanned as acquired triggering the automatic update of the list). At 2250, crossed-out items can be re-added to the same list or added to another list for convenience of re-use of the item.

Figure 23:
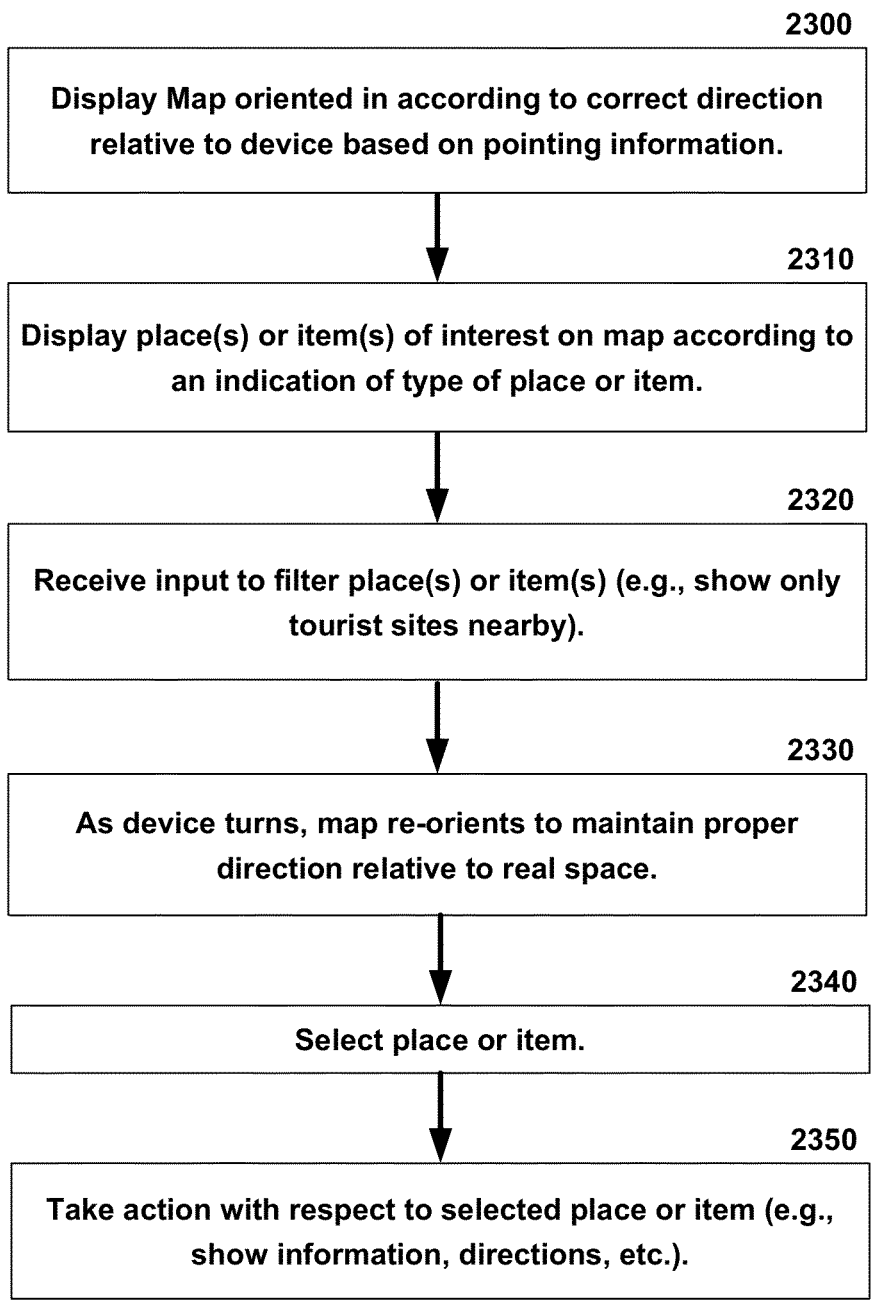
FIG. 23 is a flow diagram of a non-limiting process whereby it is anticipated that a user will hold a device substantially in a horizontal plane.

FIG. 23 is a flow diagram of a non-limiting process whereby it is anticipated that a user will hold a device substantially in a horizontal plane, such as in the palm of the user's hand while viewing the device. At 2300, a map on display is oriented in according to a direction relative to the device based on pointing information. At 2310, place(s) or item(s) of interest are displayed on the map according to an indication of type of place or item. At 2320, the place(s) or item(s) are filtered, e.g., to show only nearby tourist sites. At 2330, as the device turns, the map continuously updates and re-orients based on any new direction the device points at, in order to maintain proper direction relative to real space. At 2340, a place or item on the map is selected. At 2350, action can be taken with respect to selected place or item by performing a gesture, e.g., show information gesture, get directions gesture, etc. In this regard, because it is intuitive to give a ground view when the viewing plane is parallel to the ground plane, in the present embodiment, a 2-D map view is implemented when the device is held substantially in the horizontal plane.

Figure 24:
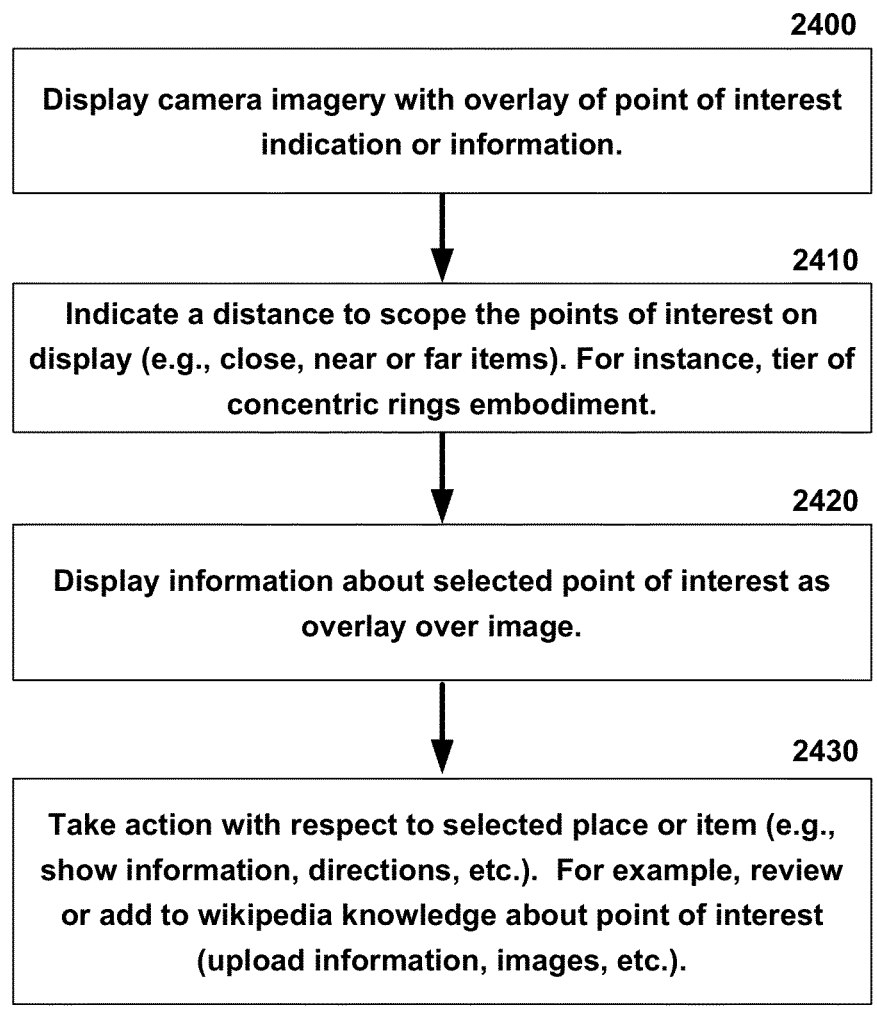
FIG. 24 is a flow diagram of a non-limiting process whereby it is anticipated that a user will hold a device substantially in a vertical plane.

FIG. 24 is a flow diagram of a non-limiting process whereby it is anticipated that a user will hold a device substantially in a vertical plane, as if scanning an area in a camera viewfinder with overlay information and actions introduced to give the viewfinder context for POI action. For instance, when a user's arm is extended forward in front of the user's eyes, and the user observes the display by looking forward towards the landscape. In such a case where the device is held upright, which can be detected by motion information of the device, substantially in the vertical plane, at 2400, camera imagery is displayed with overlay of point of interest indication or information. At 2410, a distance is indicated to scope the points of interest on display, e.g., close, near or far items. For instance, FIG. 10 illustrates a non-limiting embodiment based on tiers of concentric rings.

At 2420, information about a selected point of interest is displayed as overlay over the image. At 2430, an action is requested with respect to the selected place or item, e.g., show information, directions, etc. For example, a user may wish to review the item or add to wikipedia knowledge about point of interest, e.g., upload information, images, etc. In this regard, because it is intuitive to give a 3-D perspective view when the viewing plane is orthogonal to the ground plane, in the present embodiment, a 3-D perspective view with POI information overlay is implemented when the device is held substantially in the vertical plane. In effect, the camera shows the real space behind the device, and indications of points of interest in that space as if the user was performing a scan of his or her surroundings with the device. Direction information of the device 2600 enables data and network services to know what the scope of objects for interaction with the device is.

Figure 25:
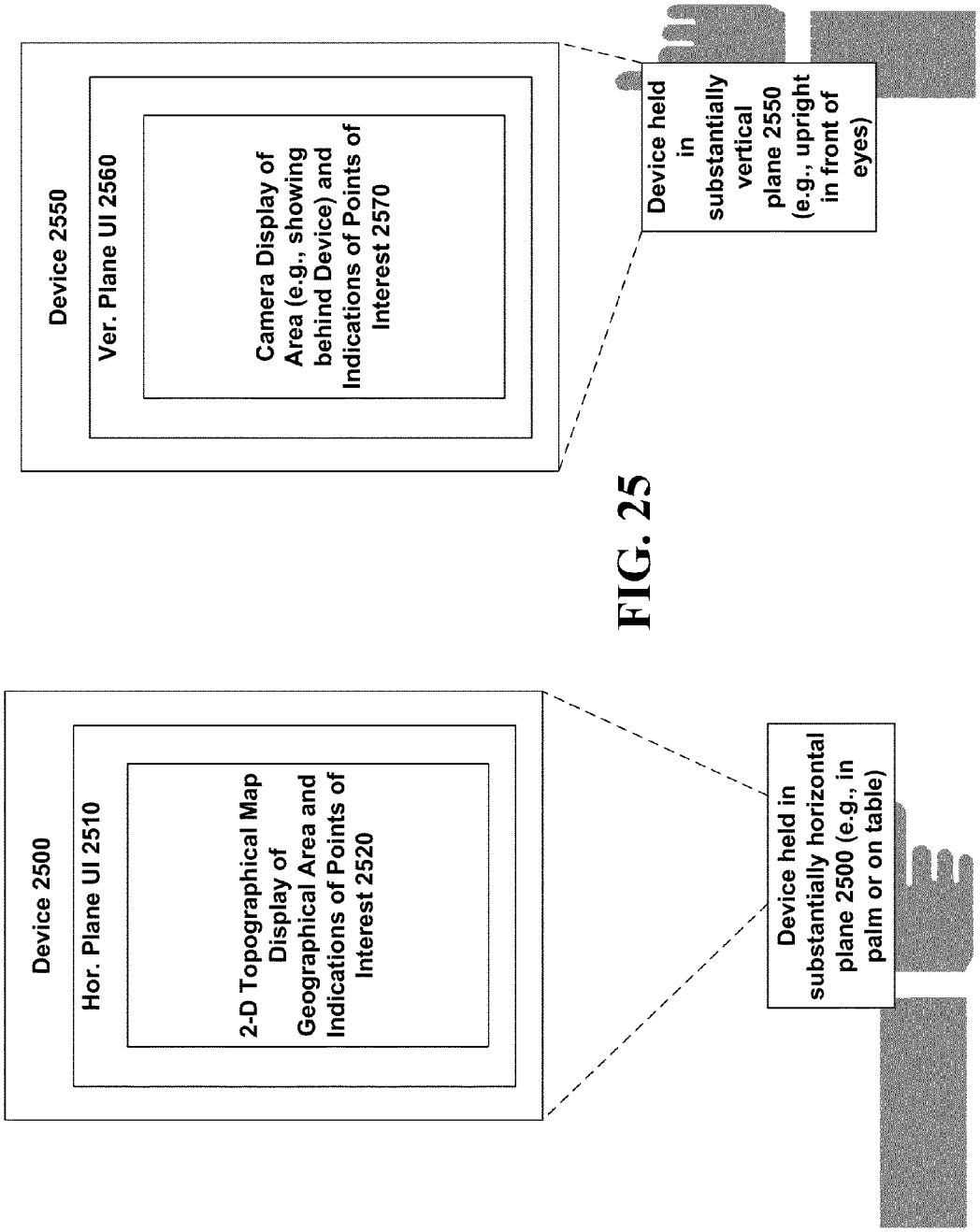
FIG. 25 illustrates a switching between the embodiments of FIGS. 23 and 24 according to planar orientation.

FIG. 25 illustrates a general difference between the embodiments of FIGS. 23 and 24. With device 2500 in the horizontal plane, a 2-D topographical map display of geographical area and indications of points of interest 2520 is displayed. In this regard, device 2500 detects it is substantially in the horizontal plane and displays UI 2510 When device 2550 detects it is in the substantially vertical plane 2550, upright, a vertical plane UI 2560 is invoked which, instead of a 2-D plan view of the world, includes a 3-D perspective view 2570 as reflected by the 2-D imagery of the camera input.

Figure 26:
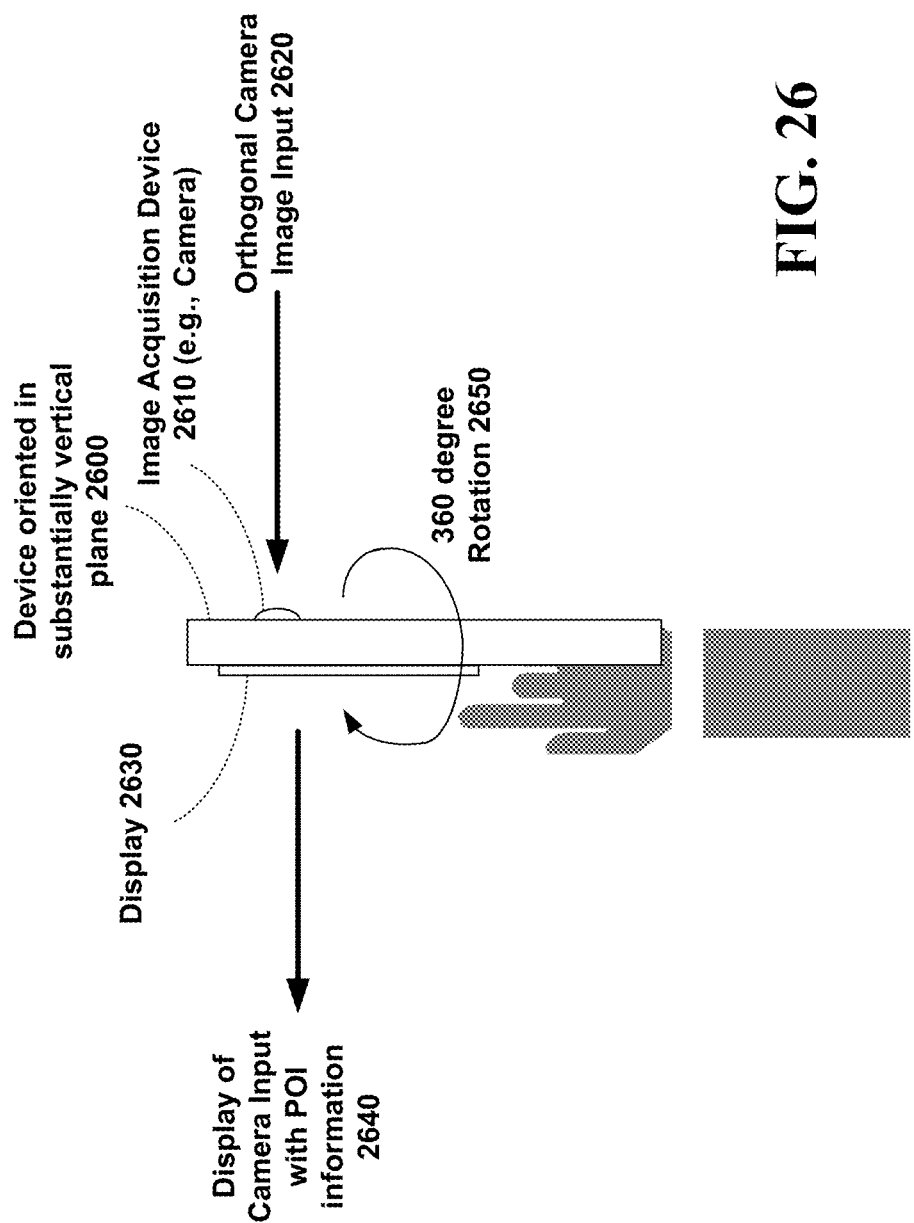
FIG. 26 further illustrates an embodiment that detects the device is substantially in the vertical plane or horizontal plane.

FIG. 26 further illustrates an embodiment that detects the device 2600 is substantially in the vertical plane 2600, thereby invoking the image acquisition device 2610 to acquire input 2620 and display the input on display 2630 with POI information 2640. In this regard, as the user rotates the camera according to the arrow 2650, the POI information changes along with the scope of the camera input 2610 as it changes with the device 2600 spinning around.

Figure 27:
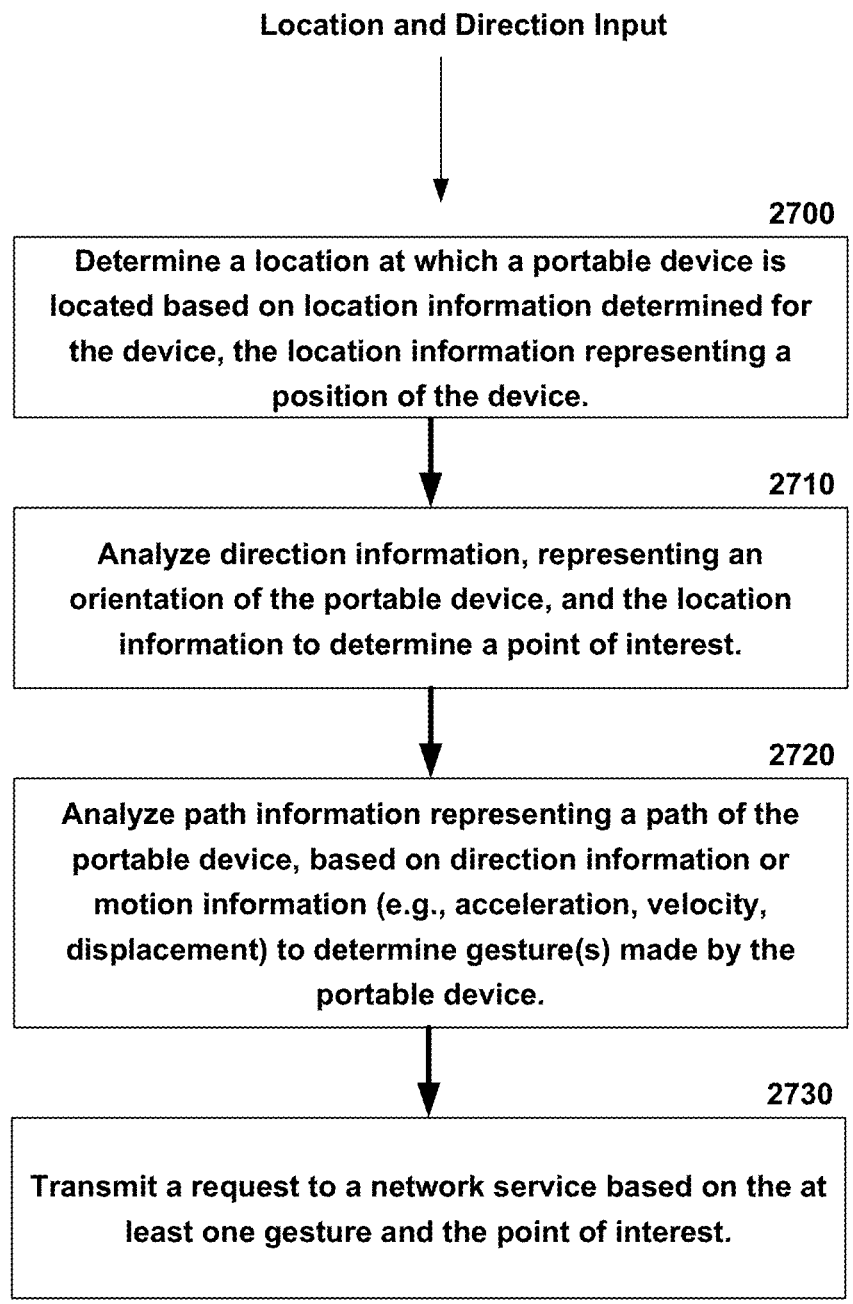
FIG. 27 is a flow diagram representing a non-limiting process for ascertaining what gestures are being made with a portable device.

FIG. 27 is a flow diagram representing a non-limiting process for ascertaining what gestures are being made with a portable device. With at least location and direction input from the device, and also optionally motion information, at 2700, a location at which a portable device is located is determined based on location information determined for the device.

At 2710, path information representing a path traversed by the portable device, is determined based on direction information or motion information defining the path information, to determine at least one gesture made by the portable device. Any of tilt, spin, rotation along any axes, translation, etc. can be taken into account for the path information when determining if a gesture has been made. In one non-limiting embodiment, the path information is represented as a set of vectors varying over time. A user can indicate that a gesture is about to be made, and when it will stop, by explicitly or implicitly defining a start of a gesture or an end of a gesture. This input for starting and stopping a gesture can itself be a gesture for starting or a gesture for stopping. In the same way, a user can define a gesture, but performing start and stop operations for defining the gesture, and the path information between start and stop represents the user-defined gesture.

At 2720, direction information, representing an orientation of the portable device, and the location information are processed to determine a point of interest to which the at least one gesture applies. At 2730, a request is transmitting, e.g., automatically, to a network service based on the at least one gesture and the point of interest.

Figure 28:
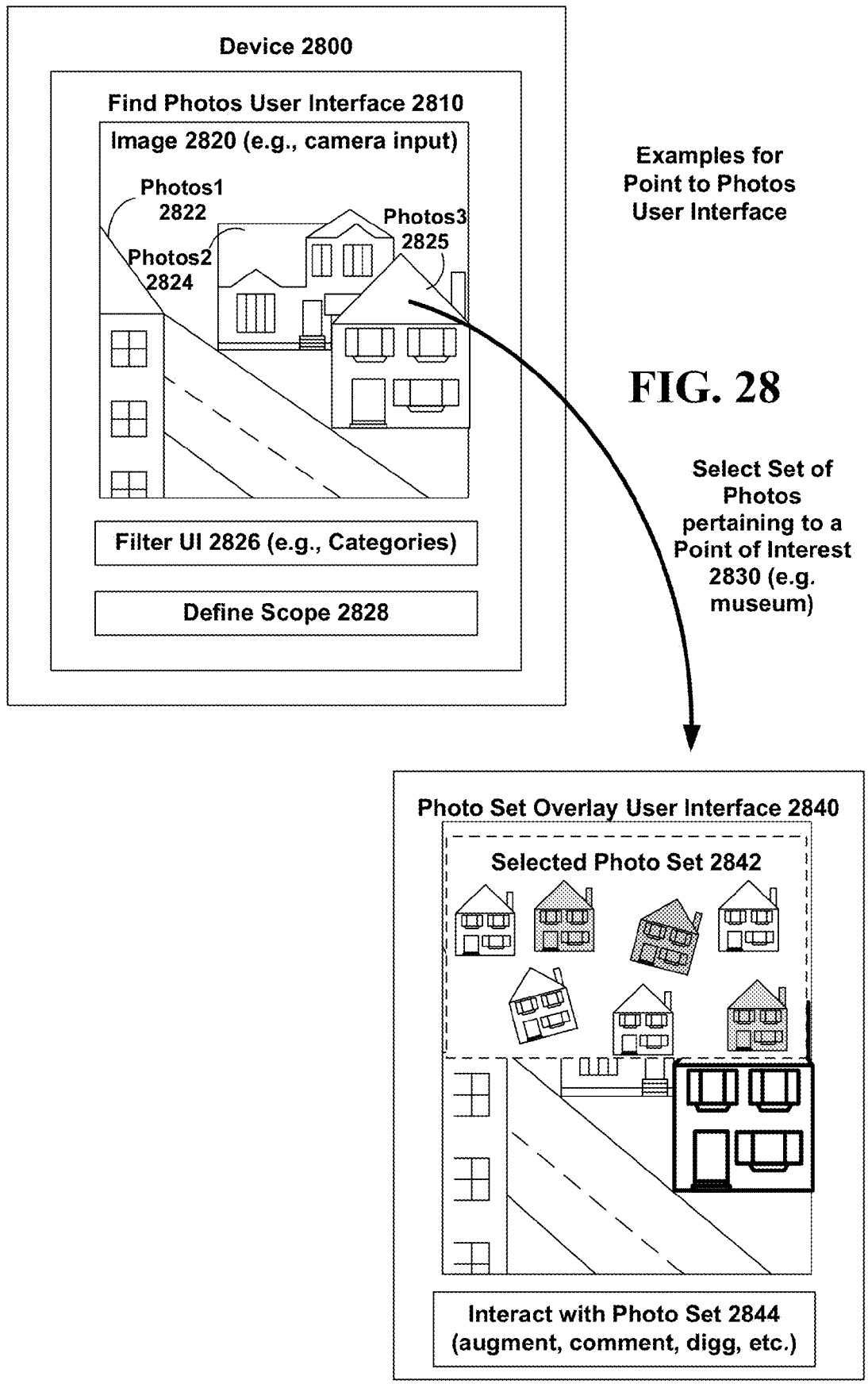
FIG. 28 is a block diagram providing a non-limiting implementation for a point to photos user interface for a device.

FIG. 28 is a block diagram providing a non-limiting implementation for a point to photos user interface 2810 for a device 2800. Find photos user interface 2810 includes a section for images 2820, e.g., camera input, which includes photos1 2822, photos2 2824 and photos3 2825 indicated as points of interest in section 2820. As with the other embodiments, filter UI 2826 can be used to filter the photo sets on display and UI 2828 can be used to define scope. In this regard, a user selects a set of photos pertaining to a point of interest 2830, such as a museum with great architecture, and the user is led to a photo set overlay user interface 2840. The selected photo set 2842, e.g., thumbnails or other subset of the photos or information about the photos, can be displayed as overlay near or over the designated item, here the museum in the image section. In this regard, a user can interact with the photo set 2844, e.g., augment, modify, comment, digg, etc., or perform any other action with respect to the photo set.

Figure 29:
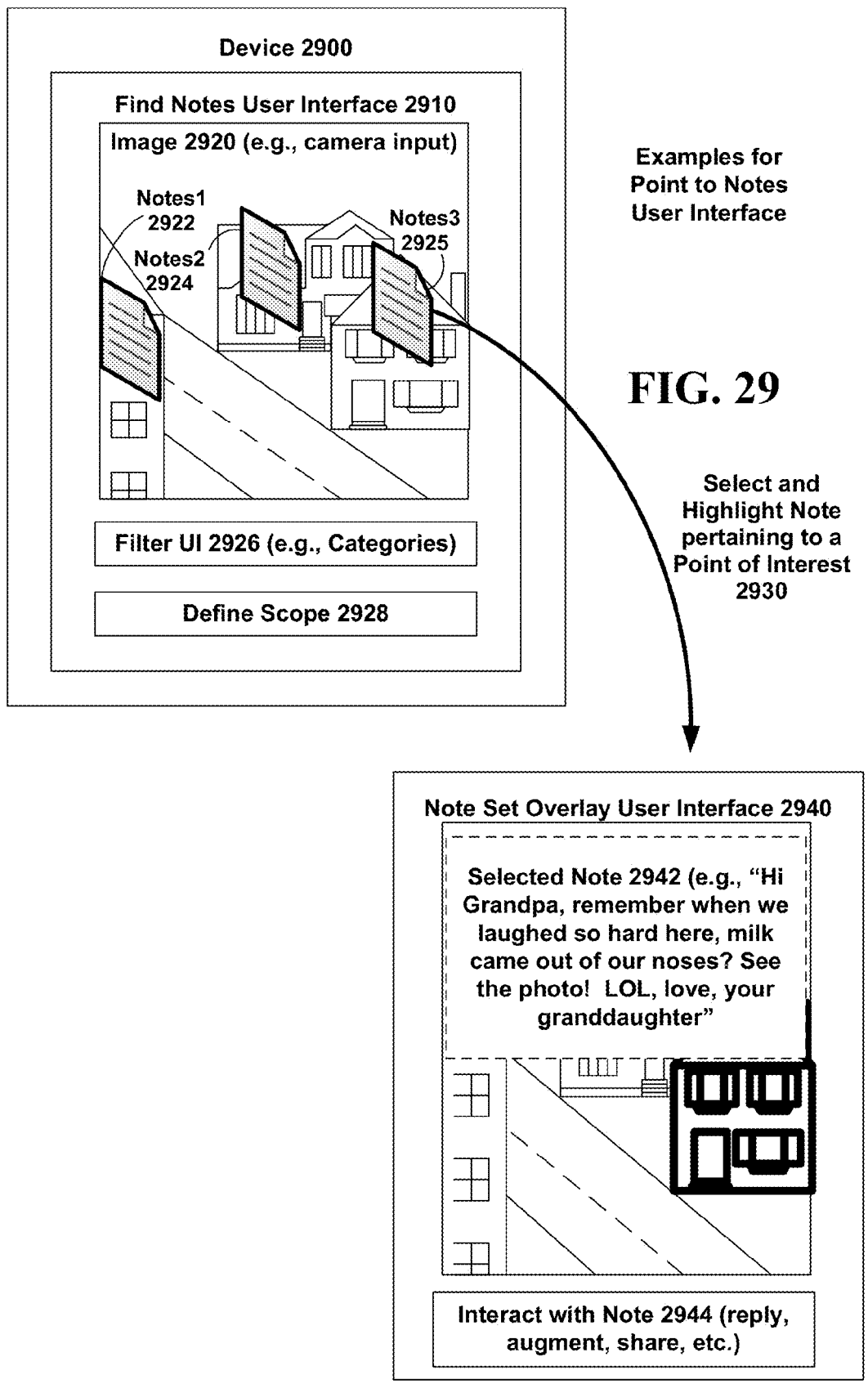
FIG. 29 is a block diagram providing a non-limiting implementation for a point to notes user interface for a device.

FIG. 29 is a block diagram providing a non-limiting implementation for a point to notes user interface 2910 for a device 2900. Find notes user interface 2910 includes a section for images 2920, e.g., camera input, which includes notes1 2922, notes2 2924 and notes3 2925 indicated as points of interest in section 2920. As with the other embodiments, filter UI 2926 can be used to filter the notes on display and UI 2928 can be used to define scope. In this regard, a user selects a note or set of notes pertaining to a point of interest 2930, such as a museum where a grandfather and granddaughter visited, and the user is led to a note set overlay user interface 2940. The selected note set 2942, e.g., a subset of the notes or information about the notes, or the entire note, can be displayed for scrolling, if need be, as overlay near or over the designated item, here the museum in the image section. For example, the note might say "Hi Grandpa, remember when we laughed so hard here, milk came out of our noses? See the photo! LOL, love, your granddaughter." In this regard, a user, here Grandpa, can interact with the note set 2944, e.g., augment, modify, comment, digg, etc., or perform any other action with respect to the note set like reply, forward, share, etc.

Figure 30:
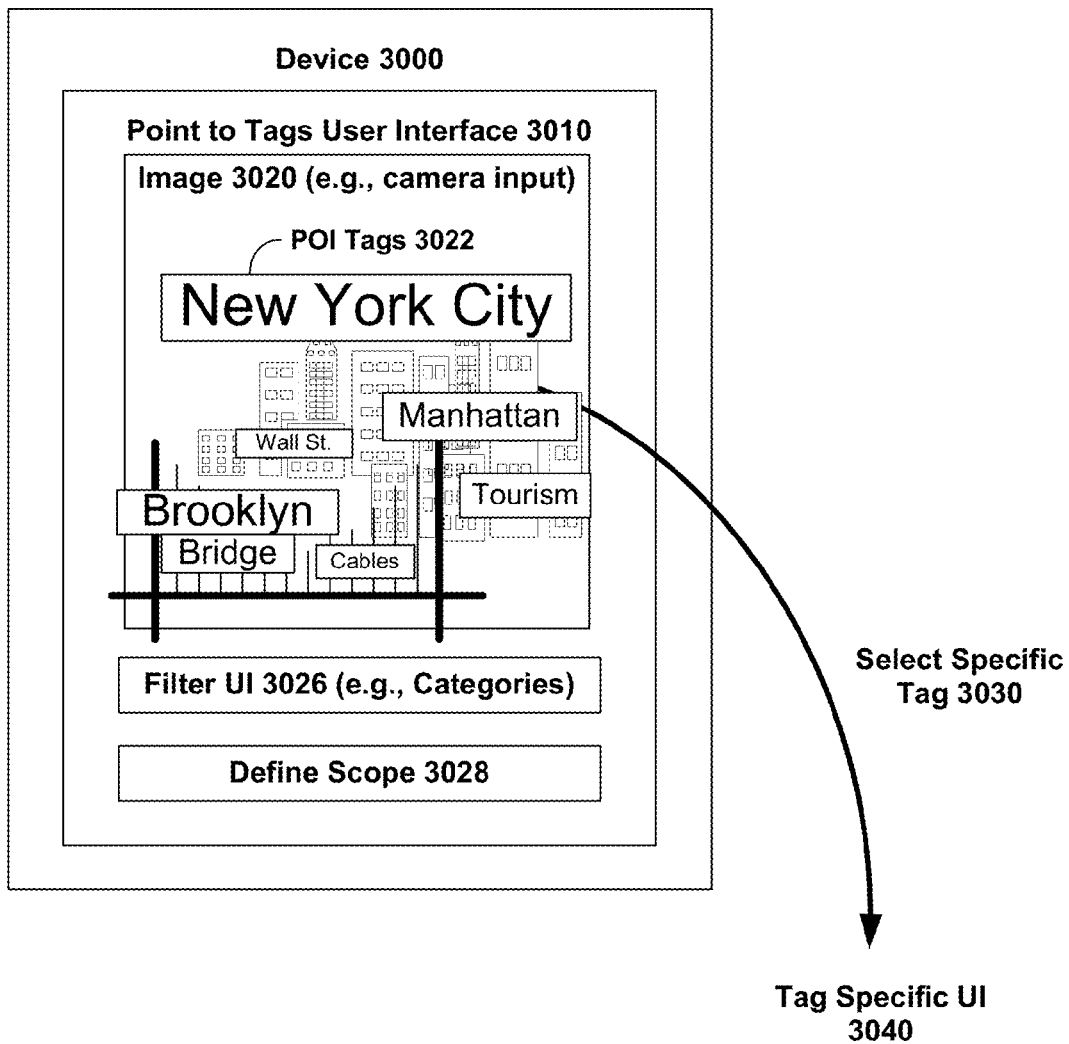
FIG. 30 is a block diagram providing a non-limiting implementation for a point to notes user interface for a device.

FIG. 30 is a block diagram providing a non-limiting implementation for a point to notes user interface 3010 for a device 3000. Point to tags user interface 3010 includes an image section 3020, e.g., fueled by camera input, that includes POI tags 3022, e.g., keywords, overlaid. Filter UI 3026 and scope UI 3028 can be included. In this regard, by gesturing with respect to a tag, a specific tag 3030 can be selected which leads to tag specific UI 3040, e.g., based on an automatic keyword query. For instance, the user might gesture with the device at the Brooklyn Bridge thereby selecting the Brooklyn bridge keyword search or other services automatically.

Figure 31:
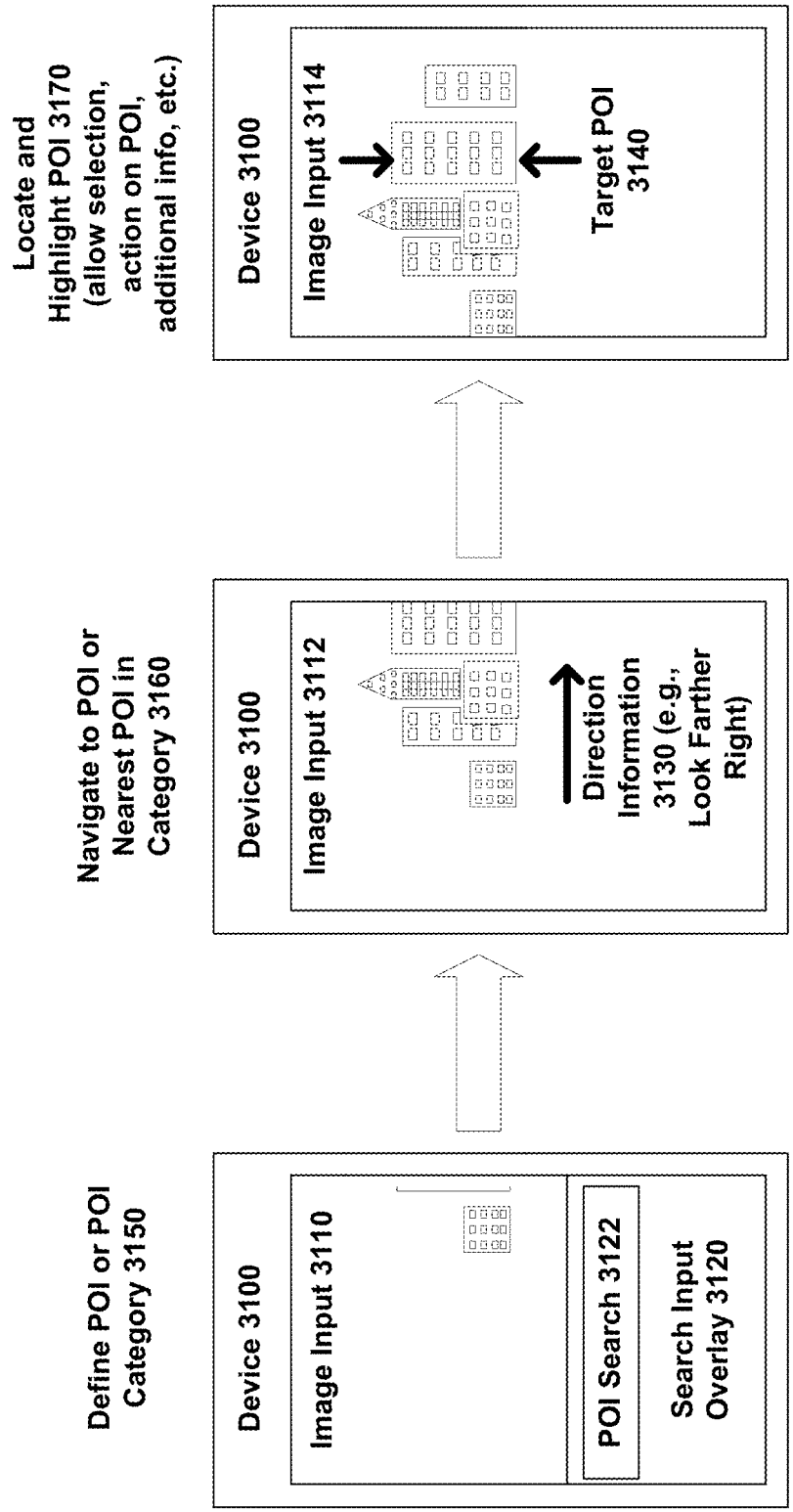
FIG. 31 is a non-limiting embodiment for navigating to a point of interest with a device.

FIG. 31 is a non-limiting embodiment for navigating to a point of interest with a device 3100. First, a user defines a POI 3150, or selects a category of POIs and a set of criteria (e.g., food within 2 blocks) and then selects a POI. POI search input 3122 enables an explicit search for a POI (e.g., a specific address to which the user wants to go). In one embodiment, a user selects a position in the image input 3110 to which the user wants to go, which automatically selects the nearest POI to that position. A search input overlay 3120 can host the POI search input 3122.

Next, to navigate to the POI or nearest POI in a given category 3160, the image input 3112 includes direction information 3130 that tells the user where to point the device 3100. In this case, the directions indicate to swivel the angle of the device or translate the device to the right to see more imagery 3112 to the right. Since the user still cannot see the target POI in this example, the user again swivels the device to the right resulting in image input 3114 that includes the target POI 3140, and the direction of the user's outstretched arm points exactly to where the user wants to go. An intelligent algorithm can also be applied to directions taking into account that humans cannot yet walk through walls, fences, etc., or that cars by law must stay on streets, etc. In this way, a POI can be located and highlighted 3170, from which further operations can be defined. For instance, the POI can be selected, or otherwise acted upon consistent with any of the other embodiments described herein.

Figure 32:
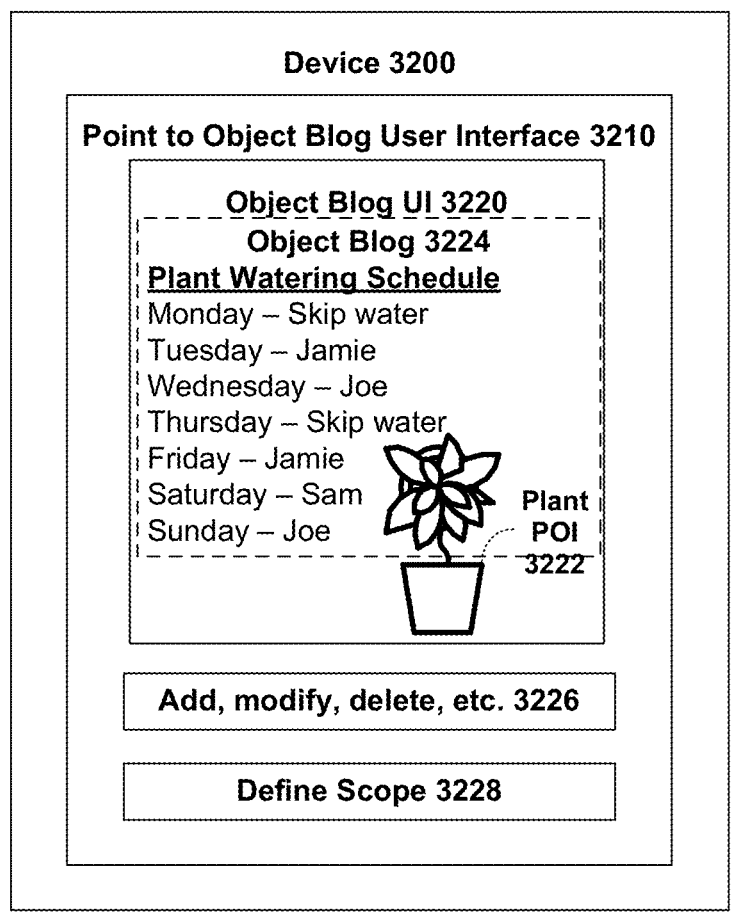
FIG. 32 is a block diagram providing a non-limiting implementation for a point to object blog user interface for a device.

FIG. 32 is a block diagram providing a non-limiting implementation for a point to object blog user interface 3210 for a device 3200. Notifications/reminders 3240, e.g., based on proximity and/or pointing to object, can be rendered, e.g., displayed, to a user via an object blog UI 3220 which represents a block for an object 3224, such as a plant POI 3222. On an item level basis, therefore, a user can create an ecosystem with respect to that object from which a whole group of people can benefit. For instance, anyone authorized can add, modify, delete, etc. 3226 the object blog, define scope 3228 of what a user wants to know about within the object blog 3224, etc.

Figure 33:
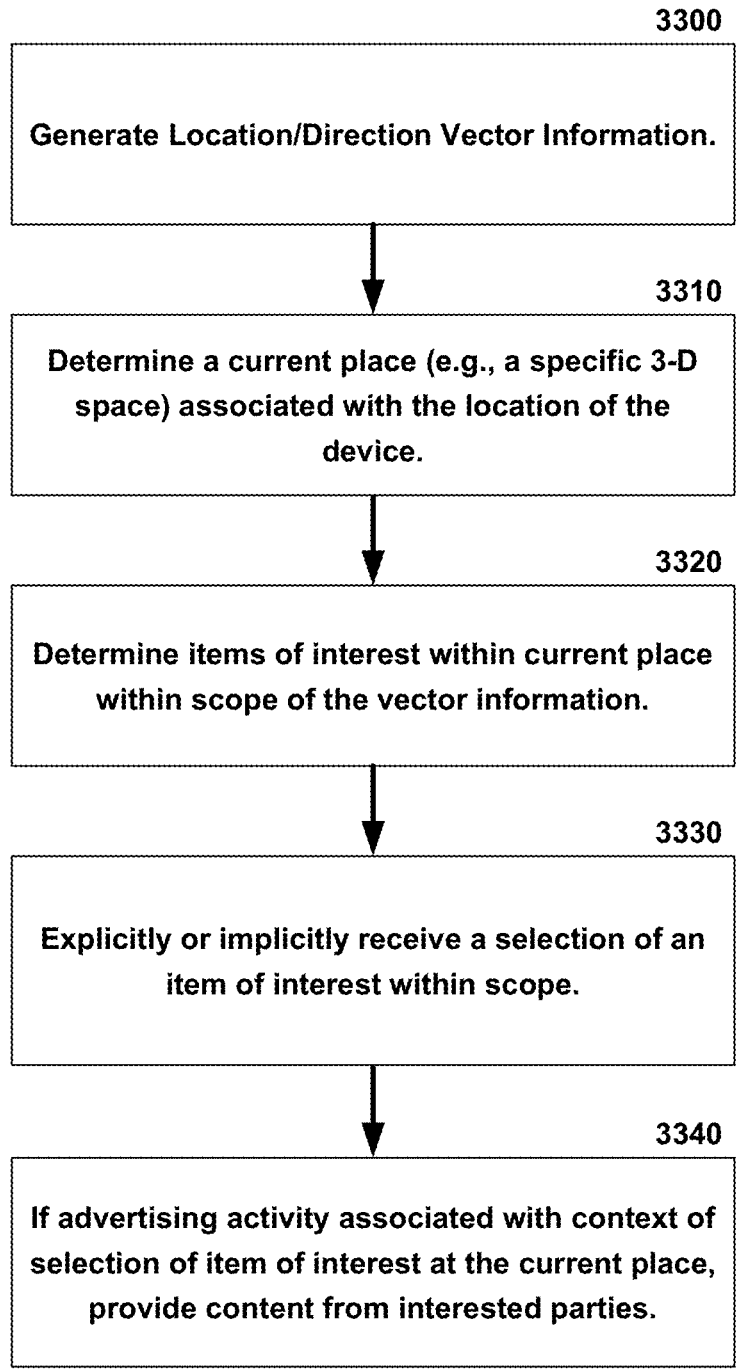
FIG. 33 illustrates a representative interaction with a pointing device as provided in one or more embodiments herein.

A representative interaction with a pointing device as provided in one or more embodiments herein is illustrated in FIG. 33. At 3300, location/direction vector information is determined based on the device measurements. This information can be recorded so that a user's path or past can be used when predictively factoring what the user will be interested in next. At 3310, a place is determined for the device based on at least location information. Based on the vector information, or more informally, the act of pointing by the user, at 3320, an object or point of interest is selected based on any of a variety of "line of sight" algorithms that fall within or outside of the vector path. It is noted that occlusion culling techniques can optionally be used to facilitate overlay techniques. Whether the point of interest at issue falls within the vector can factor in the error in precision of any of the measurements, e.g., different GPS subsystems have different error in precision. In this regard, one or more items or points of interest may be found along the vector path or arc, within a certain distance depending on context, or within scope.

At 3330, some action enables an explicit and/or implicit selection of an item of interest within scope. Then, any of a great variety of services can be performed with respect to any point of interest selected by the user via a user interface. In one aspect, at 3340, interested parties can advertise based on the selection of the items of interest and parties can be compensated according to agreed upon advertising models.

Figure 34:
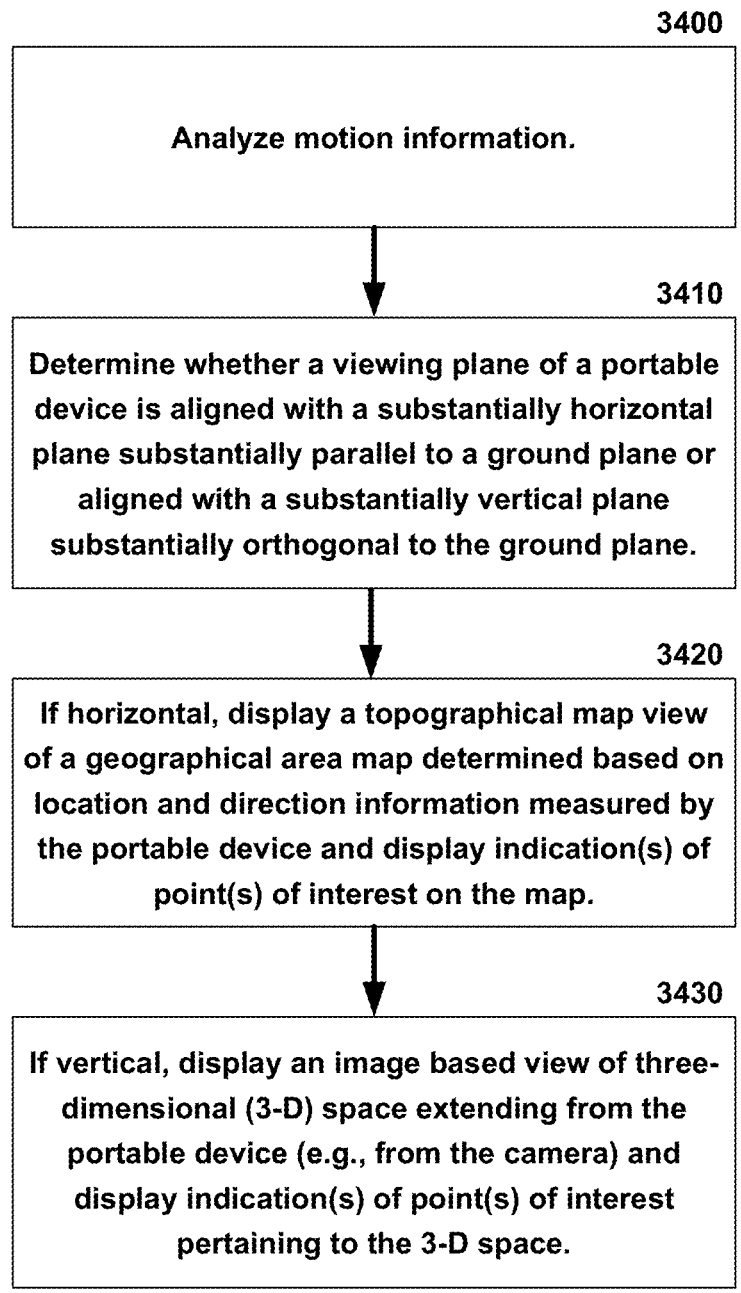
FIG. 34 is another non-limiting flow diagram relating to a process for determining whether a portable device is aligned substantially vertically or horizontally with respect to a viewing plane of the device.

FIG. 34 is another non-limiting flow diagram relating to a process for determining whether a portable device is aligned substantially vertically or horizontally with respect to a viewing plane of the device. At 3400, motion information of the device is analyzed, e.g., accelerometer input. At 3410, it is determined whether a viewing plane of a portable device is aligned with a substantially horizontal plane substantially parallel to a ground plane or aligned with a substantially vertical plane substantially orthogonal to the ground plane. At 3420, if the answer is horizontal, a topographical map view of a geographical area map is displayed determined based on location and direction information measured by the portable device. Indication(s) of the point(s) of interest on the map can also be displayed, e.g., highlighting or other designation, or enhancement. At 3430, if the answer is vertical, then an image based view of three-dimensional (3-D) space extending from the portable device (e.g., from the camera) is displayed. Similarly to the topographical map view, indication(s) of point(s) of interest pertaining to the 3-D space can be displayed.

Figure 35:
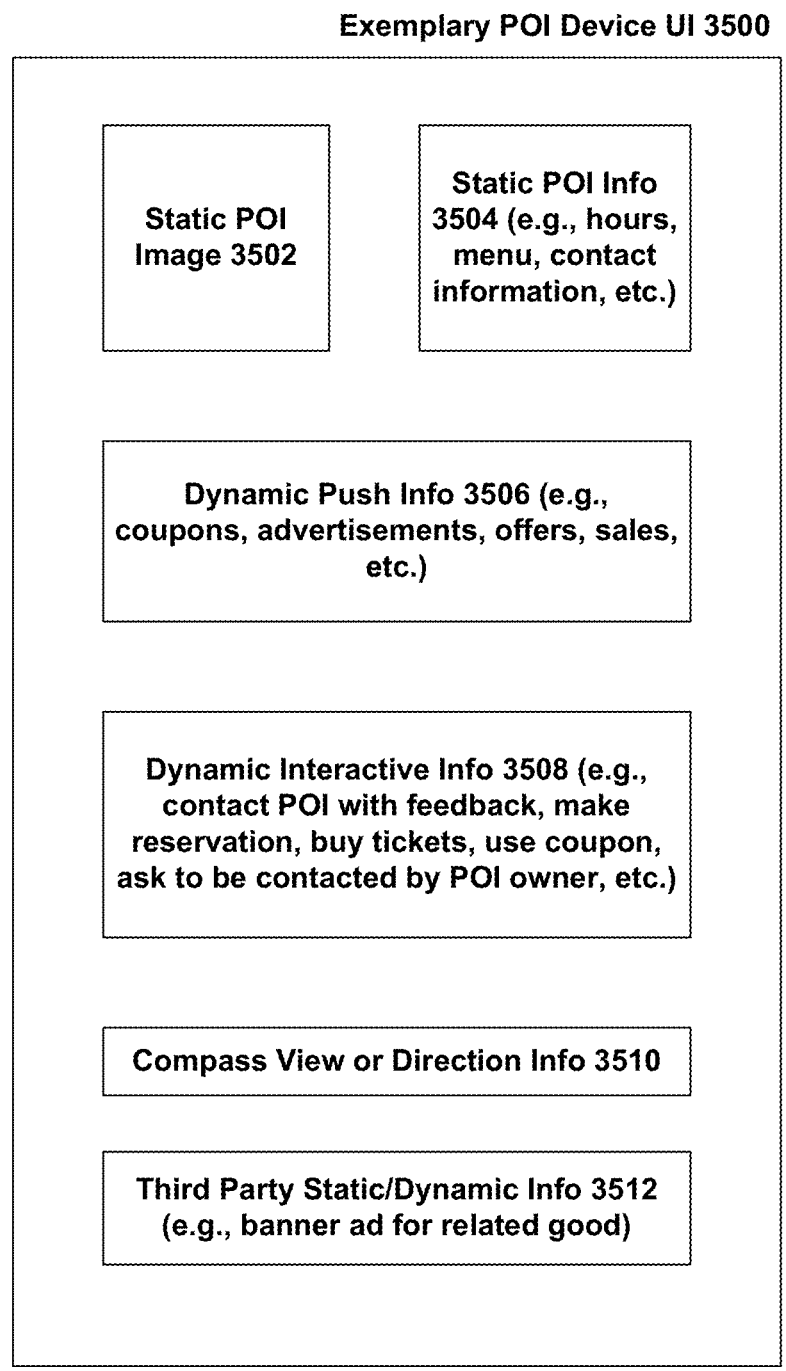
FIG. 35 illustrates a non-limiting user interface for displaying information about a point of interest in accordance with an embodiment.

FIG. 35 illustrates a general block diagram for an optional encoding technique for the POI information of the various embodiments described herein. Once a single POI is implicated or selected, then a full screen view for the single POI can be displayed, such as the exemplary UI 3500. UI 3500 can have one or more of any of the following representative areas. UI 3500 can include a static POI image 3502 such as a trademark of a store, or a picture of a person. UI 3500 can also include other media, and a static POI information portion 3504 for information that tends not to change such as restaurant hours, menu, contact information, etc. In addition, UI 3500 can include an information section for dynamic information to be pushed to the user for the POI, e.g., coupons, advertisements, offers, sales, etc. In addition, a dynamic interactive information are 3508 can be included where the user can fill out a survey, provide feedback to the POI owner, request the POI to contact the user, make a reservation, buy tickets, etc. UI 3500 also can include a representation of the direction information output by the compass for reference purposes. Further, UI 3500 can include other third party static or dynamic content in area 3512.

Figure 36:
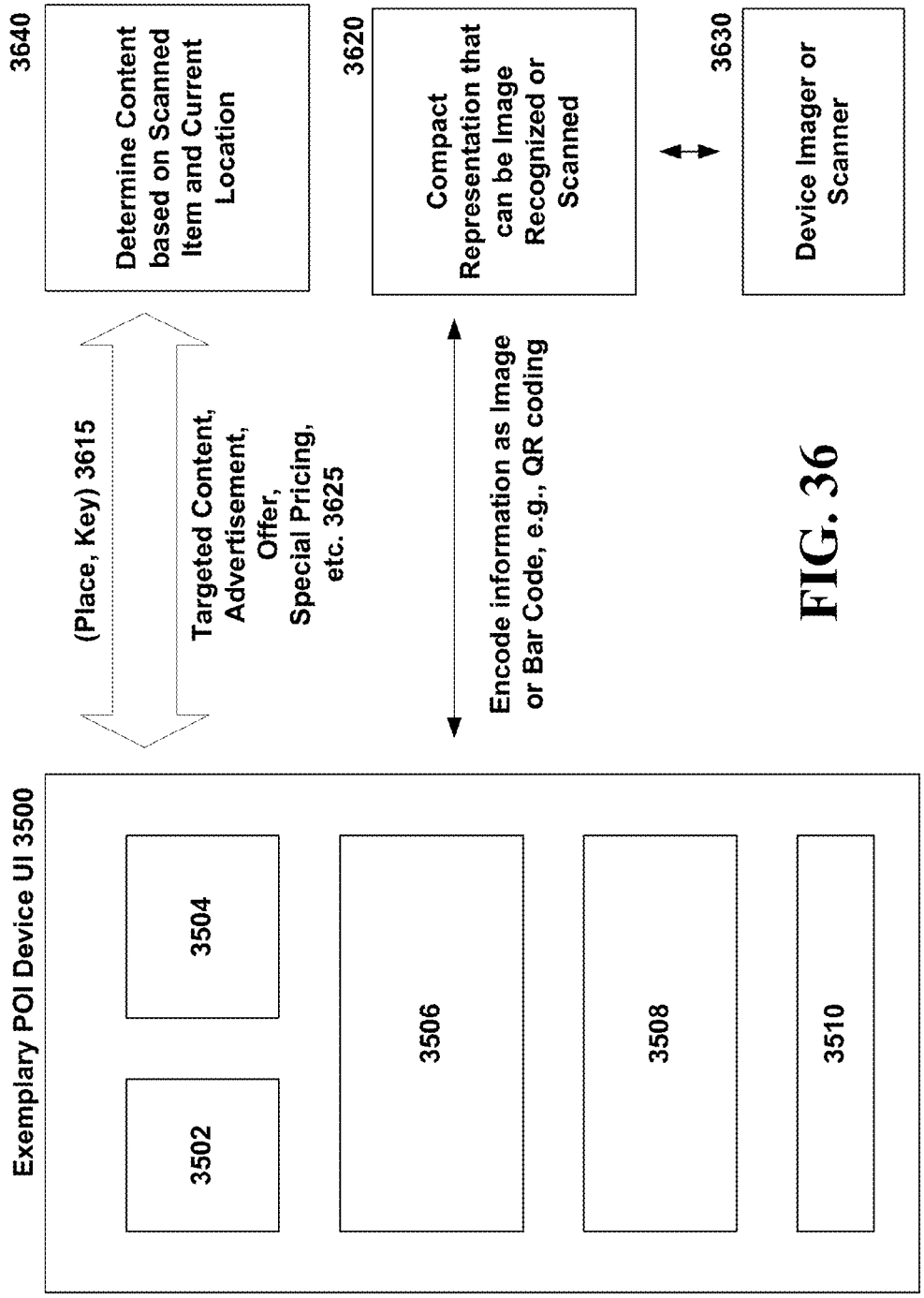
FIG. 36 illustrates a block diagram of a non-limiting mobile scan scenario based on bar codes or imaging scan.

FIG. 36 represents an alternate embodiment in which an image scan gesture can be used to initiate action. The idea is that the various pieces of static and dynamic information 3502, 3504, 3506, 3508, 3510, etc. for a POI, which are normally represented as UI 3500 on the device, can also be encoded as an image or a bar code 3620, or some other device readable compact encoding. Then, a user can scan an item of interest, and coupled with presence in a physical store, a request 3615 can be made to a service 3640 with a key representing the scanned item and information representing the place, whereby the service 3640 determines content 3625 to return to the device 3600 based on the scanned item and the place.

For instance, in an optional Quick Response (QR) support embodiment, decompression allows users to take pictures of a QR code and process its contents where information has been encoded into a sticker/printout for display outside of a business (e.g., in the form of a copyrighted URL). The code need not be a QR code, but could be any code that can be read or scanned or processed to determine its underlying content. For instance, with a visual representation, a picture can be taken and processed, or with the bar code, the device can scan it. RF identification technology could also be used. For the avoidance of doubt, any encoded image format can be used, like a bar code, only one example of which is a QR code.

In effect, this enables a query for POI information via a QR code or other encoding. The user scans or images the code with a device 3630, and then transmits the code to the service, which translates the code into static and dynamically updated user information for display as a UI 3600 (or other user interface representation) so that the user can query about a POI merely by pointing at it. A URL for the POI can also be encoded in a format such as a QR code. In one non-limiting embodiment, the user can point the device at a QR code, and decode a given image with the QR code.

Figure 37:
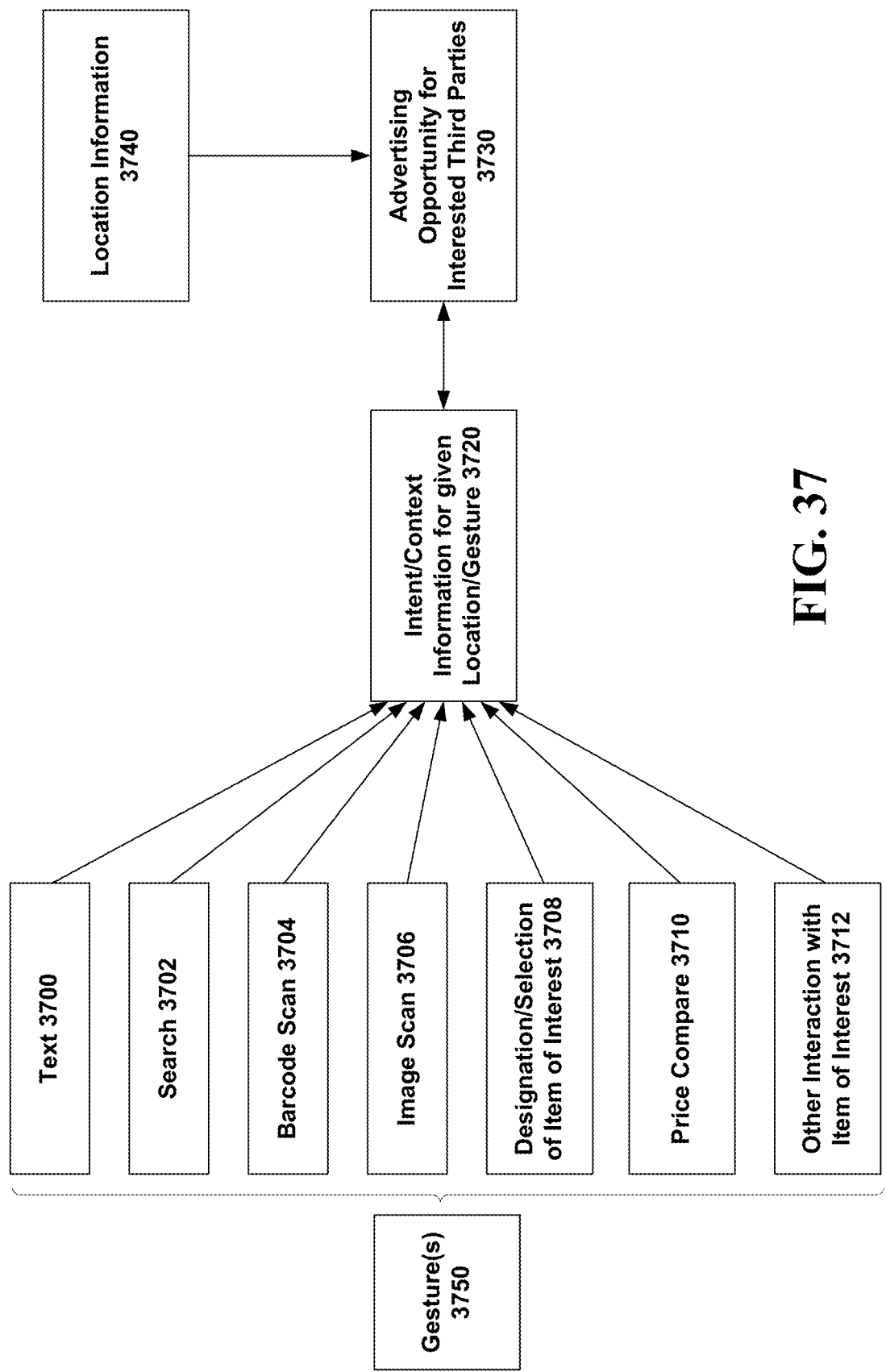
FIG. 37 illustrates a block diagram of various non-limiting ways to establish intent with a pointing enabled device as described herein.

FIG. 37 is a block diagram illustrating the vast wealth of actions and interactions that can help define intent/context 3720 for a given place in which the device is present. For instance, text 3700 may be received by the device, a product search query 3702 local to the store, bar code scan 3704, image scan 3706, explicit designation of a product (e.g., by pointing at a product, or taking an image of the product and performing image recognition) 3708, price compare request 3710, other interaction 3712, etc. can all be taken into account in discerning intent of the device at a given place. Any one or more of these actions can be accomplished with gestures 3750. This combined with location information 3740 for discerning the place in which the device is in results in advertising opportunities 3730 for a whole host of third party advertising transactions for potential delivery to the device. Next, some supplemental context is provided regarding devices, architectures and services in which any one or more of the above described embodiments can be deployed.

Supplemental Context Regarding Pointing Devices, Architectures and Services

Figure 38:
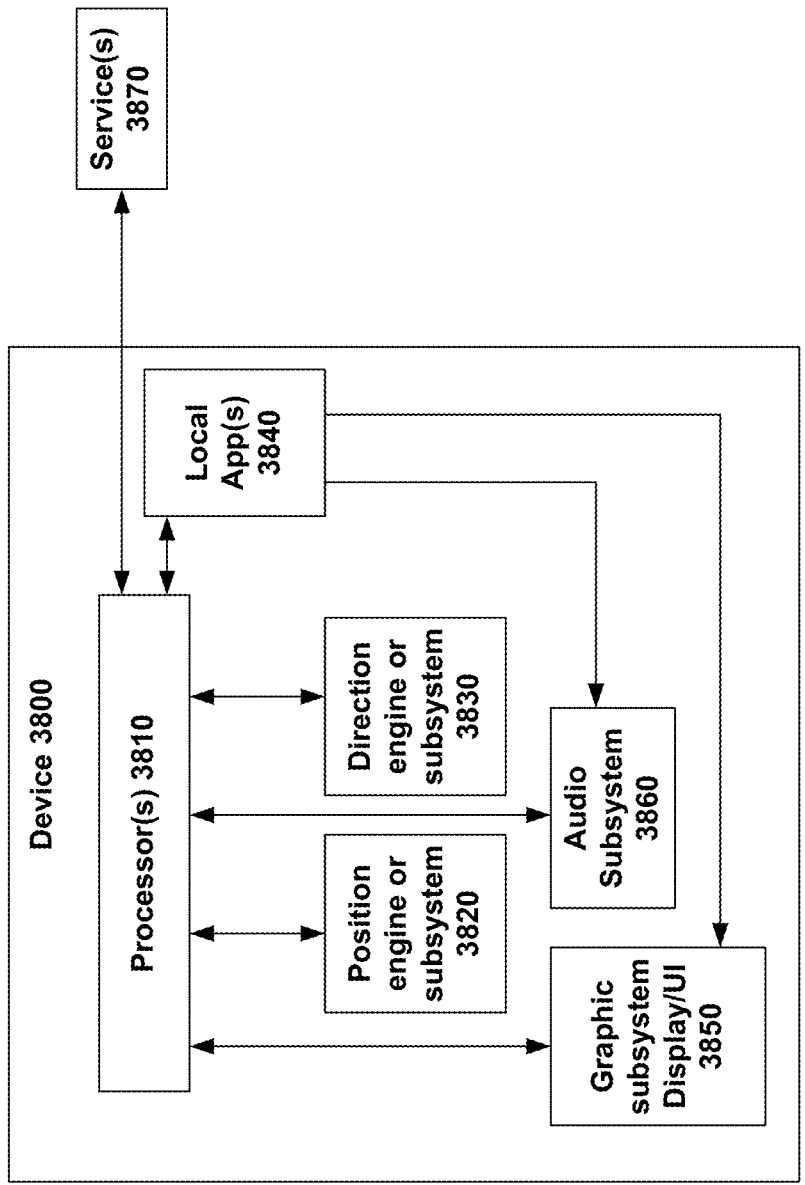
FIG. 38 illustrates a block diagram of a non-limiting device consistent with one or more embodiments described herein.

FIG. 38 illustrates an exemplary non-limiting device 3800 including processor(s) 3810 having a position engine or subsystem 3820 for determining a location of the device 3800 and a direction engine or subsystem 3830 for determining a direction or orientation of the device 3800. By interacting with local application(s) 3840 and/or service(s) 3870, content can be delivered to the device, which is tailored to device intent and a place in which the device is present. The tailored content can be rendered by graphic subsystem or display/UI 3850 or audio Subsystem 3860.

The following description contains supplemental context regarding potential non-limiting pointing devices, architectures and associated services to further aid in understanding one or more of the above embodiments. Any one or more of any additional features described in this section can be accommodated in any one or more of the embodiments described above with respect to direction based services at a particular location. While such combinations of embodiments or features are possible, for the avoidance of doubt, no embodiments set forth in the subject disclosure should be considered limiting on any other embodiments described herein.

As mentioned, a broad range of scenarios can be enabled by a device that can take location and direction information about the device and build a service on top of that information. For example, by effectively using an accelerometer in coordination with an on board digital compass, an application running on a mobile device updates what each endpoint is "looking at" or pointed towards, attempting hit detection on potential points of interest to either produce real-time information for the device or to allow the user to select a range, or using the GPS, a location on a map, and set information such as "Starbucks—10% off cappuccinos today" or "The Alamo—site of . . . " for others to discover. One or more accelerometers can also be used to perform the function of determining direction information for each endpoint as well. As described herein, these techniques can become more granular to particular items within a Starbucks, such as "blueberry cheesecake" on display in the counter, enabling a new type of sale opportunity.

Accordingly, a general device for accomplishing this includes a processing engine to resolve a line of sight vector sent from a mobile endpoint and a system to aggregate that data as a platform, enabling a host of new scenarios predicated on the pointing information known for the device. The act of pointing with a device, such as the user's mobile phone, thus becomes a powerful vehicle for users to discover and interact with points of interest around the individual in a way that is tailored for the individual. Synchronization of data can also be performed to facilitate roaming and sharing of POV data and contacts among different users of the same service.

In a variety of embodiments described herein, 2-dimensional (2D), 3-dimensional (3D) or N-dimensional directional-based search, discovery, and interactivity services are enabled for endpoints in the system of potential interest to the user.

In this regard, the pointing information and corresponding algorithms ultimately depend upon the assets available in a device for producing the pointing or directional information. The pointing information, however produced according to an underlying set of measurement components, and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest, e.g., those that span a certain angle defined by a panning gesture by the user.

In this respect, a device can include a variety of spatial and map components and intelligence to determine intersections for directional arcs. For instance, objects of interest could be represented with exact boundaries, approximated with spheres, subshells (stores in a mall) of a greater shell (mall), hierarchically arranged, etc. Dynamically generated bounding boxes can also be implemented work, i.e., any technique can be used to obtain boundary information for use in an intersection algorithm. Thus, such boundaries can be implicitly or explicitly defined for the POIs.

Thus, a device can include an intersection component that interprets pointing information relative to a set of potential points of interest. The engine can perform such intersections knowing what the resolution of the measuring instruments are on the device, such as a given resolution of a GPS system. Such techniques can include taking into account how far a user is from a plane of objects of interest, such as items on a shelf or wall, the size of the item of interest and how that is defined, as well as the resolution of location instrumentation, such as the GPS system. The device can also optionally include an altimeter, or any other device that gives altitude information, such as measuring radar or sonar bounce from the floor. The altitude information can supplement existing location information for certain specialized services where points of interest vary significantly at different altitudes. It is noted that GPS itself has some information about altitude in its encoding.

In one non-limiting embodiment, a portable electronic device includes a positional component for receiving positional information as a function of a location of the portable electronic device, a directional component that outputs direction information as a function of an orientation of the portable electronic device and a location based engine that processes the positional information and the direction information to determine a subset of points of interest relative to the portable electronic device as a function of at least the positional information and the direction information.

The positional component can be a positional GPS component for receiving GPS data as the positional information. The directional component can be a magnetic compass and/or a gyroscopic compass that outputs the direction information. The device can include acceleration component(s), such as accelerometer(s), that outputs acceleration information associated with movement of the portable electronic device. The use of a separate sensor can also be used to further compensate for tilt and altitude adjustment calculations.

In one embodiment, the device includes a cache memory for dynamically storing a subset of endpoints of interest that are relevant to the portable electronic device and at least one interface to a network service for transmitting the positional information and the direction information to the network service. In return, based on real-time changes to the positional information and direction/pointing information, the device dynamically receives in the cache memory an updated subset of endpoints that are potentially relevant to the portable electronic device.

For instance, the subset of endpoints can be updated as a function of endpoints of interest within a pre-defined distance substantially along a vector defined by the orientation of the portable electronic device. Alternatively or in addition, the subset of endpoints can be updated as a function of endpoints of interest relevant to a current context of the portable electronic device. In this regard, the device can include a set of Representational State Transfer (REST)-based application programming interfaces (APIs), or other stateless set of APIs, so that the device can communicate with the service over different networks, e.g., Wi-Fi, a GPRS network, etc. or communicate with other users of the service, e.g., Bluetooth. For the avoidance of doubt, the embodiments are in no way limited to a REST based implementation, but rather any other state or stateful protocol could be used to obtain information from the service to the devices.

The directional component outputs direction information including compass information based on calibrated and compensated heading/directionality information. The directional component can also include direction information indicating upward or downward tilt information associated with a current upward or downward tilt of the portable electronic device, so that the services can detect when a user is pointing upwards or downwards with the device in addition to a certain direction. The height of the vectors itself can also be taken into account to distinguish between an event of pointing with a device from the top of a building (likely pointing to other buildings, bridges, landmarks, etc.) and the same event from the bottom of the building (likely pointing to a shop at ground level), or towards a ceiling or floor to differentiate among shelves in a supermarket. A 3-axis magnetic field sensor can also be used to implement a compass to obtain tilt readings.

Secondary sensors, such as altimeters or pressure readers, can also be included in a mobile device and used to detect a height of the device, e.g., what floor a device is on in a parking lot or floor of a department store (changing the associated map/floorplan data). Where a device includes a compass with a planar view of the world (e.g., 2-axis compass), the inclusion of one or more accelerometers in the device can be used to supplement the motion vector measured for a device as a virtual third component of the motion vector, e.g., to provide measurements regarding a third degree of freedom. This option may be deployed where the provision of a 3-axis compass is too expensive, or otherwise unavailable.

In this respect, a gesturing component can also be included in the device to determine a current gesture of a user of the portable electronic device from a set of pre-defined gestures. For example, gestures can include zoom in, zoom out, panning to define an arc, all to help filter over potential subsets of points of interest for the user.

For instance, web services can effectively resolve vector coordinates sent from mobile endpoints into <x,y,z> or other coordinates using location data, such as GPS data, as well as configurable, synchronized POV information similar to that found in a GPS system in an automobile. In this regard, any of the embodiments can be applied similarly in any motor vehicle device. One non-limiting use is also facilitation of endpoint discovery for synchronization of data of interest to or from the user from or to the endpoint.

Figure 39:
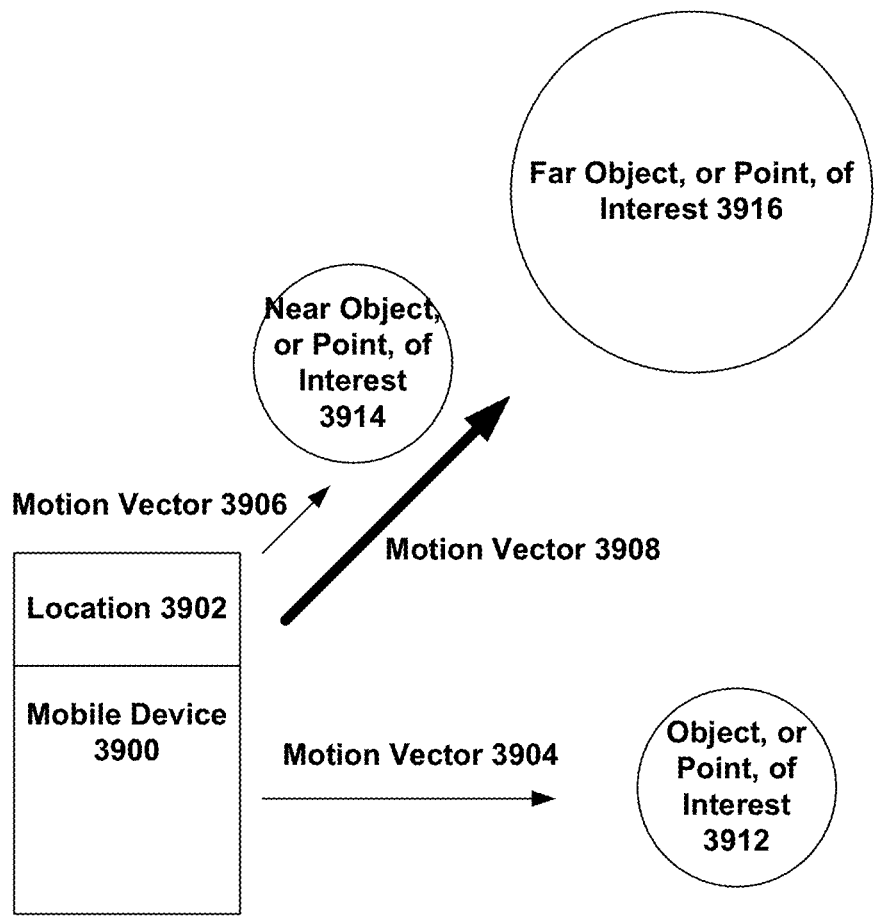
FIG. 39 is a block diagram illustrating the formation of motion vectors for use in connection with location based services.

Among other algorithms for interpreting position/motion/direction information, as shown in FIG. 39, a device 3900 employing the direction based location based services 3902 as described herein in a variety of embodiments herein include a way to discern between near objects, such as POI 3914 and far objects, such as POI 3916. Depending on the context of usage, the time, the user's past, the device state, the speed of the device, the nature of the POIs, etc., the service can determine a general distance associated with a motion vector. Thus, a motion vector 3906 will implicate POI 3914, but not POI 3916, and the opposite would be true for motion vector 3908.

In addition, a device 3900 includes an algorithm for discerning items substantially along a direction at which the device is pointing, and those not substantially along a direction at which the device is pointing. In this respect, while motion vector 3904 might implicate POI 3912, without a specific panning gesture that encompassed more directions/vectors, POIs 3914 and 3916 would likely not be within the scope of points of interest defined by motion vector 3904. The distance or reach of a vector can also be tuned by a user, e.g., via a slider control or other control, to quickly expand or contract the scope of endpoints encompassed by a given "pointing" interaction with the device.

In one non-limiting embodiment, the determination of at what or whom the user is pointing is performed by calculating an absolute "Look" vector, within a suitable margin of error, by a reading from an accelerometer's tilt and a reading from the magnetic compass. Then, an intersection of endpoints determines an initial scope, which can be further refined depending on the particular service employed, i.e., any additional filter. For instance, for an apartment search service, endpoints falling within the look vector that are not apartments ready for lease, can be pre-filtered.

In addition to the look vector determination, the engine can also compensate for, or begin the look vector, where the user is by establish positioning (~15 feet) through an A-GPS stack (or other location based or GPS subsystem including those with assistance strategies) and also compensate for any significant movement/acceleration of the device, where such information is available.

As mentioned, in another aspect, a device can include a client side cache of potentially relevant points of interest, which, based on the user's movement history can be dynamically updated. The context, such as geography, speed, etc. of the user can be factored in when updating. For instance, if a user's velocity is 2 miles an hour, the user may be walking and interested in updates at a city block by city block level, or at a lower level granularity if they are walking in the countryside. Similarly, if a user is moving on a highway at 60 miles per hour, the block-by-block updates of information are no longer desirable, but rather a granularity can be provided and predictively cached on the device that makes sense for the speed of the vehicle.

In an automobile context, the location becomes the road on which the automobile is travelling, and the particular items are the places and things that are passed on the roadside much like products in a particular retail store on a shelf or in a display. The pointing based services thus creates a virtual "billboard" opportunity for items of interest generally along a user's automobile path. Proximity to location can lead to an impulse buy, e.g., a user might stop by a museum they are passing and pointing at with their device, if offered a discount on admission.

In various alternative embodiments, gyroscopic or magnetic compasses can provide directional information. A REST based architecture enables data communications to occur over different networks, such as Wi-Fi and GPRS architectures. REST based APIs can be used, though any stateless messaging can be used that does not require a long keep alive for communicated data/messages. This way, since networks can go down with GPRS antennae, seamless switching can occur to Wi-Fi or Bluetooth networks to continue according to the pointing based services enabled by the embodiments described herein.

A device as provided herein according to one or more embodiments can include a file system to interact with a local cache, store updates for synchronization to the service, exchange information by Bluetooth with other users of the service, etc. Accordingly, operating from a local cache, at least the data in the local cache is still relevant at a time of disconnection, and thus, the user can still interact with the data. Finally, the device can synchronize according to any updates made at a time of re-connection to a network, or to another device that has more up to date GPS data, POI data, etc. In this regard, a switching architecture can be adopted for the device to perform a quick transition from connectivity from one networked system (e.g., cell phone towers) to another computer network (e.g., Wi-Fi) to a local network (e.g., mesh network of Bluetooth connected devices).

With respect to user input, a set of soft keys, touch keys, etc. can be provided to facilitate in the directional-based pointing services provided herein. A device can include a windowing stack in order to overlay different windows, or provide different windows of information regarding a point of interest (e.g., hours and phone number window versus interactive customer feedback window). Audio can be rendered or handled as input by the device. For instance, voice input can be handled by the service to explicitly point without the need for a physical movement of the device. For instance, a user could say into a device "what is this product right in front of me? No, not that one, the one above it" and have the device transmit current direction/movement information to a service, which in turn intelligently, or iteratively, determines what particular item of interest the user is pointing at, and returns a host of relevant information about the item.

Figure 40:
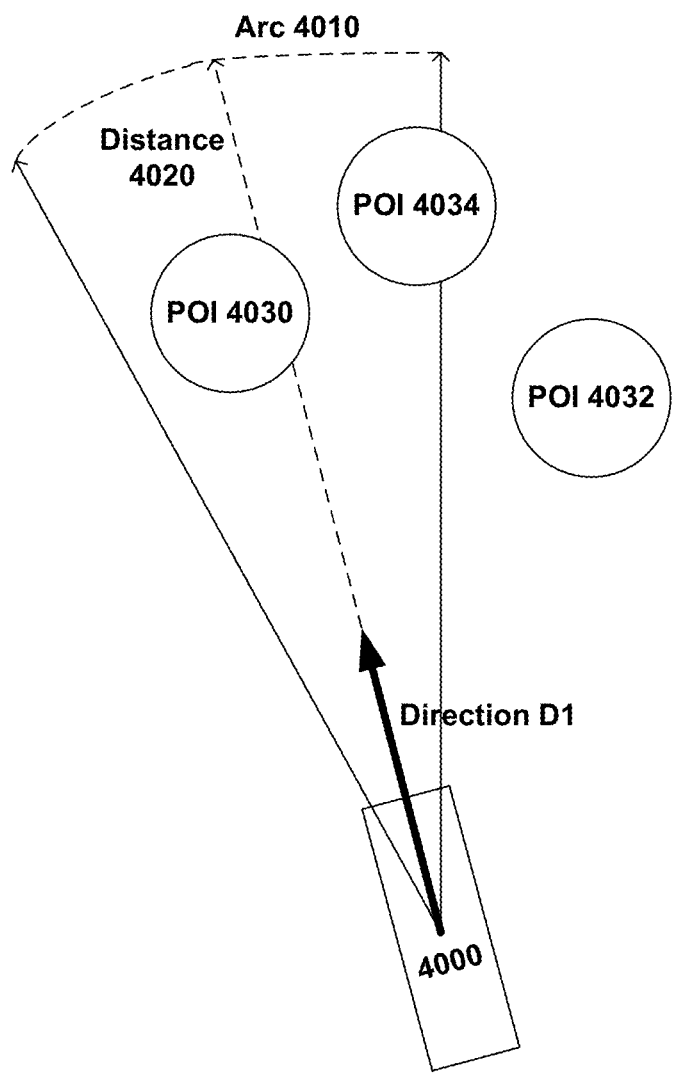
FIG. 40, FIG. 41 and FIG. 42 illustrate aspects of algorithms for determining intersection endpoints with a pointing direction of a device.

One non-limiting way for determining a set of points of interest is illustrated in FIG. 40. In FIG. 40, a device 4000 is pointed (e.g., point and click) in a direction D1, which according to the device or service parameters, implicitly defines an area within arc 4010 and distance 4020 that encompasses POI 4030, but does not encompass POI 4032. Such an algorithm will also need to determine any edge case POIs, i.e., whether POIs such as POI 4034 are within the scope of pointing in direction D1, where the POI only partially falls within the area defined by arc 4010 and distance 4020.

Figure 41:
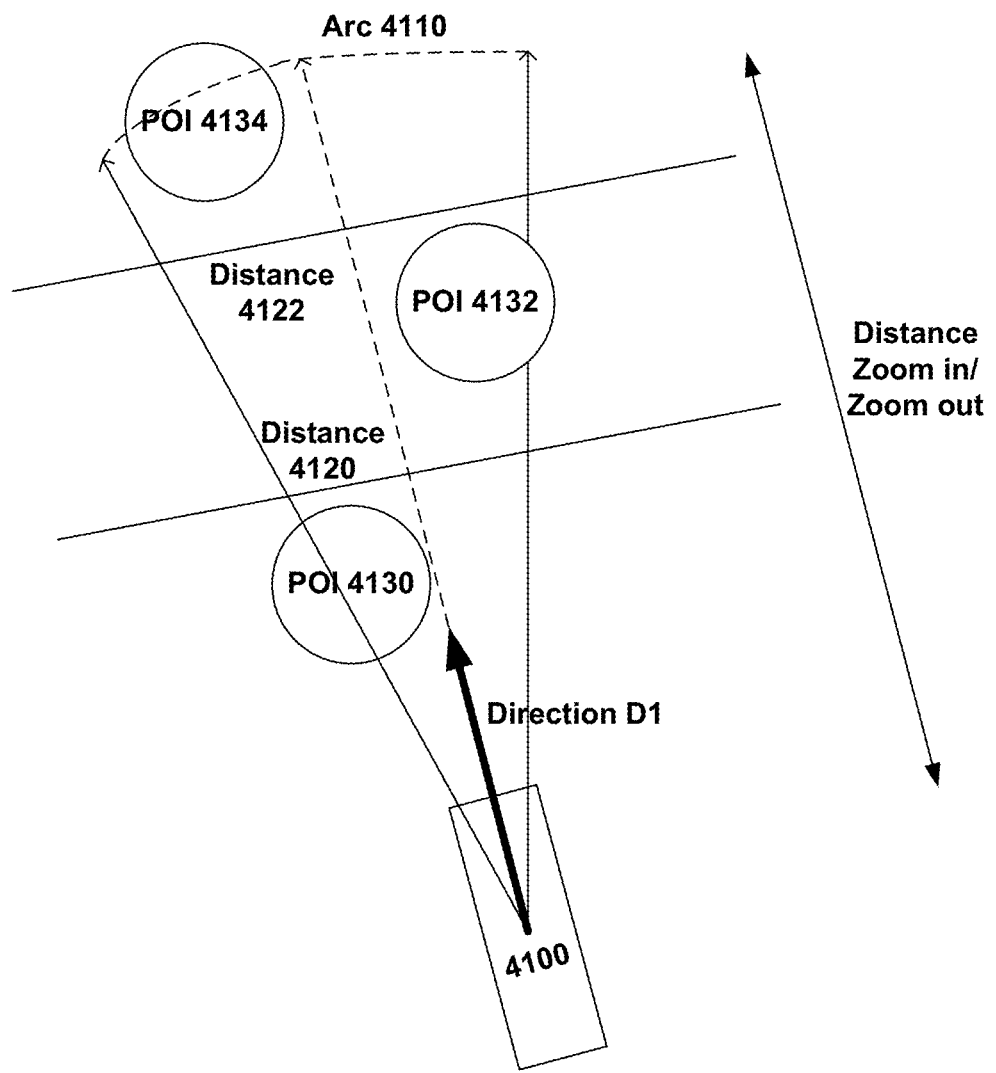

Other gestures that can be of interest in for a gesturing subsystem include recognizing a user's gesture for zoom in or zoom out. Zoom in/zoom out can be done in terms of distance like FIG. 41. In FIG. 41, a device 4100 pointed in direction D1 may include zoomed in view which includes points of interest within distance 4120 and arc 4110, or a medium zoomed view representing points of interest between distance 4120 and 4122, or a zoomed out view representing points of interest beyond distance 4122. These zoom zones correspond to POIs 4130, 4132 and 4134, respectively. More or fewer zones can be considered depending upon a variety of factors, the service, user preference, etc.

Figure 42:
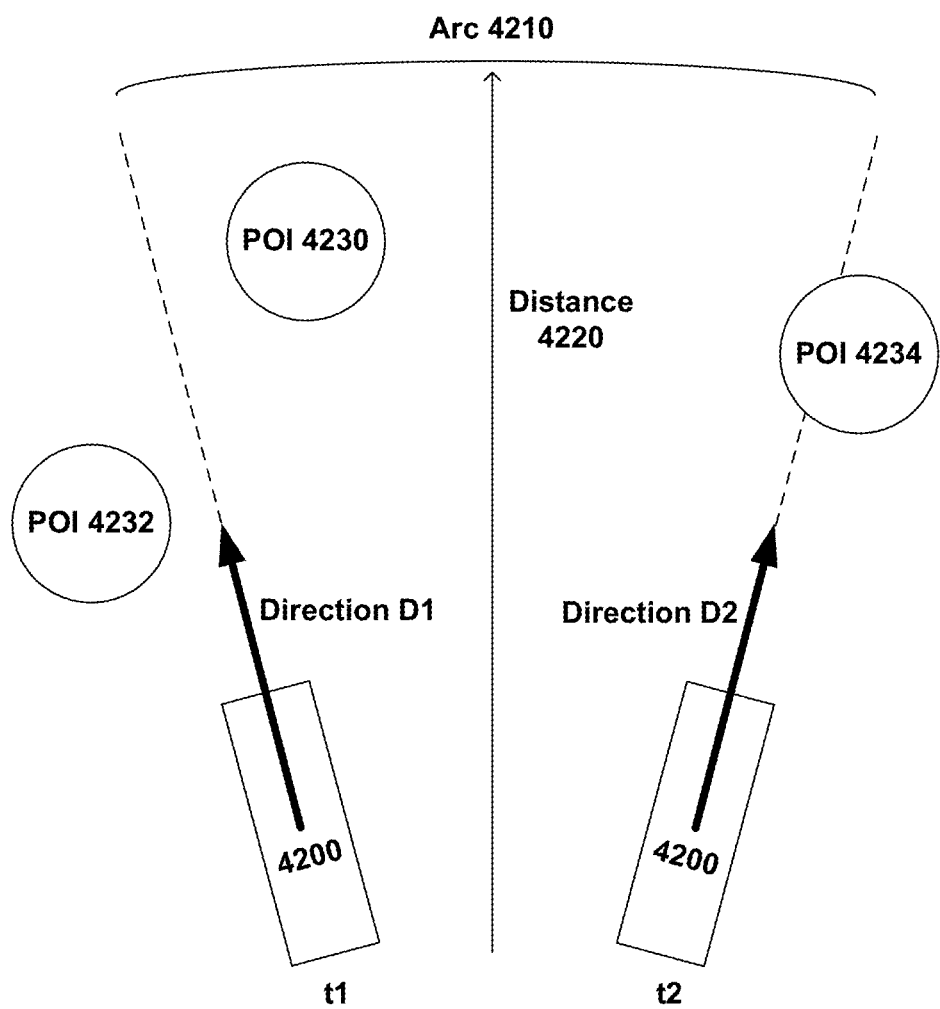

For another non-limiting example, with location information and direction information, a user can input a first direction via a click, and then a second direction after moving the device via a second click, which in effect defines an arc 4210 for objects of interest in the system, such as objects 4230, 4232, 4234 as illustrated in FIG. 42. For instance, via first pointing act by the user at time t1 in direction D1 and a second pointing act at time t2 by the user in direction D2, an arc 4210 is implicitly defined. The area of interest implicitly includes a search of points of object within a distance 4220, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions D1 and D2 can also be implemented. In the example, POI 4230 is encompassed by the arc 4210 defined by the gesture.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment.

Furthermore, with relatively accurate upward and downward tilt of the device, in addition to directional information such as calibrated and compensated heading/directional information, other services can be enabled. Typically, if a device is ground level, the user is outside, and the device is "pointed" up towards the top of buildings, the granularity of information about points of interest sought by the user (building level) is different than if the user was pointing at the first floor shops of the building (shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

Also, when a device is moving in a car, it may appear that direction is changing as the user maintains a pointing action on a single location, but the user is still pointing at the same thing due to displacement. Thus, thus time varying location can be factored into the mathematics and engine of resolving at what the user is pointing with the device to compensate for the user experience based upon which all items are relative.

Accordingly, armed with the device's position, one or more web or cloud services can analyze the vector information to determine at what or whom the user is looking/pointing. The service can then provide additional information such as ads, specials, updates, menus, happy hour choices, etc., depending on the endpoint selected, the context of the service, the location (urban or rural), the time (night or day), etc. As a result, instead of a blank contextless Internet search, a form of real-time visual search for users in real 3-D environments is provided.

In one non-limiting embodiment, the direction based pointing services are implemented in connection with a pair of glasses, headband, etc. having a corresponding display means that acts in concert with the user's looking to highlight or overlay features of interest around the user.

Figure 43:
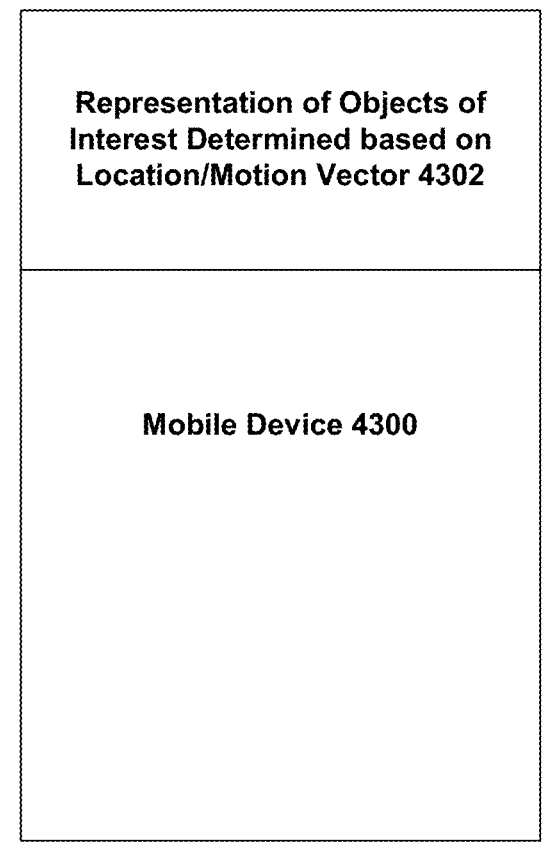
FIG. 43 represents a generic user interface for a mobile device for representing points of interest based on pointing information.

As shown in FIG. 43, once a set of objects is determined from the pointing information according to a variety of contexts of a variety of services, a mobile device 4300 can display the objects via representation 4302 according to a variety of user experiences tailored to the service at issue. For instance, a virtual camera experience can be provided, where POI graphics or information can be positioned relative to one another to simulate an imaging experience. A variety of other user interface experiences can be provided based on the pointing direction as well.

Figure 44:
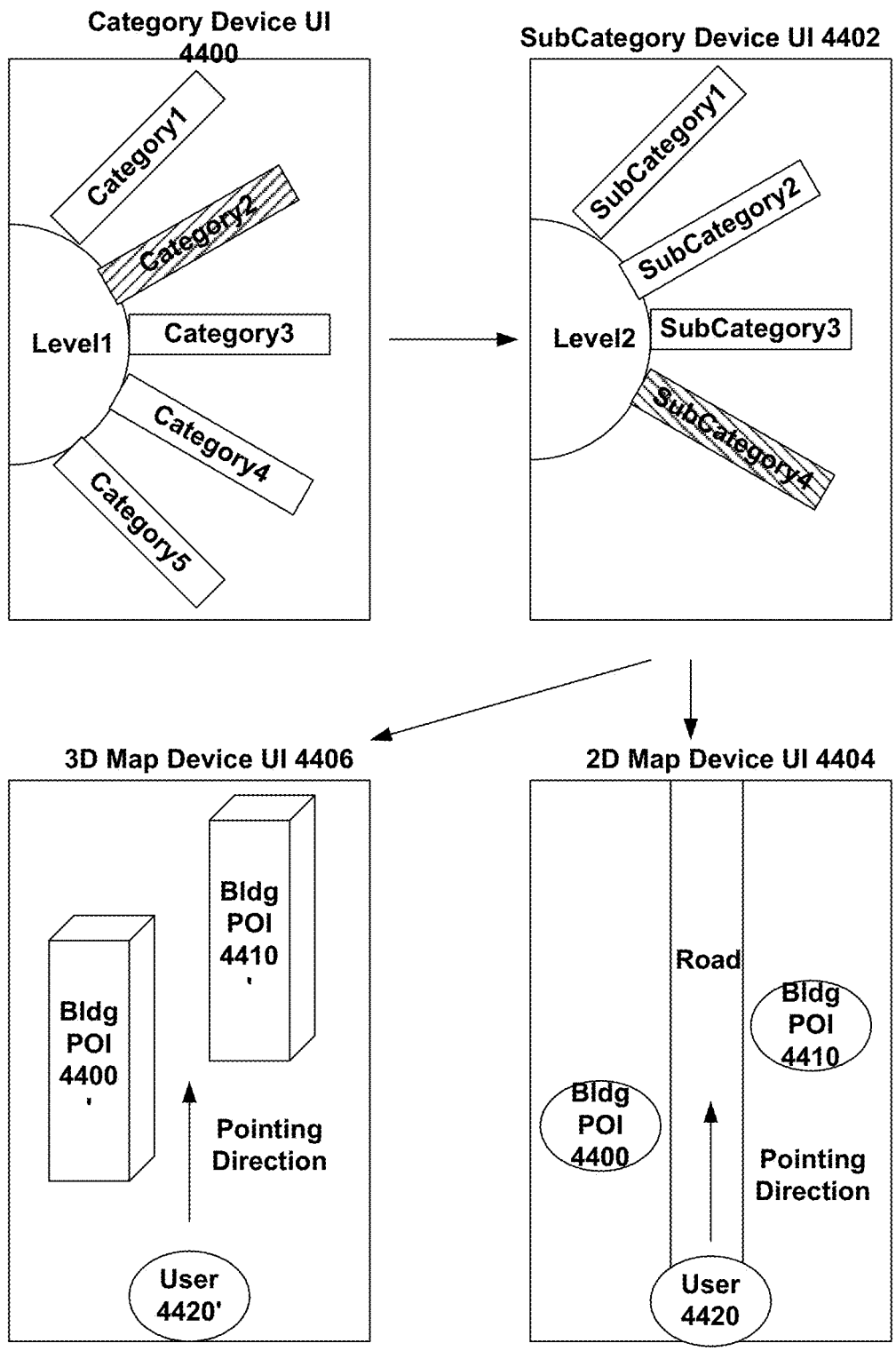
FIG. 44 represents some exemplary, non-limiting alternatives for user interfaces for representing point of interest information.

For instance, a set of different choices are shown in FIG. 44. UI 4400 and 4402 illustrate navigation of hierarchical POI information. For instance, level1 categories may include category1, category2, category3, category4 and category5, but if a user selects around the categories with a thumb-wheel, up-down control, or the like, and chooses one such as category2. Then, subcategory1, subcategory2, subcategory3 and subcategory4 are displayed as subcategories of category2. Then, if the user selects, for instance, subcategory4, perhaps few enough POIs, such as buildings 4400 and 4410 are found in the subcategory in order to display on a 2D map UI 4404 along the pointing direction, or alternatively as a 3D virtual map view 4406 along the pointing direction.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to services ecosystem where the user interacts. The system thus advantageously supports both static and dynamic content.

Figure 45:
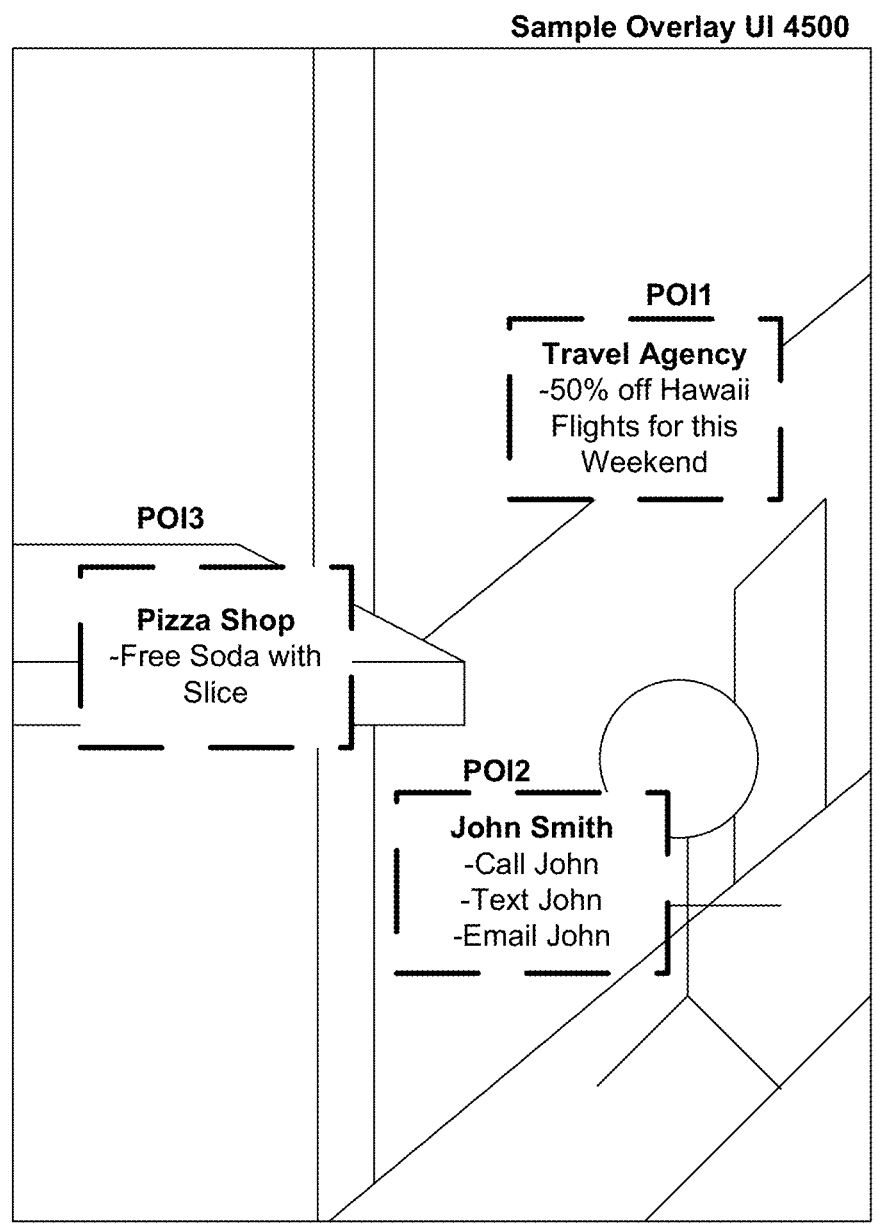
FIG. 45 illustrates a sample overlay user interface for overlaying point of interest information over a camera view of a mobile device.

Other user interfaces can be considered such as left-right, or up-down arrangements for navigating categories or a special set of soft-keys can be adaptively provided.

Where a device includes a camera, in one embodiment shown in FIG. 45, a representative non-limiting overlay UI 4500 is shown having 3 POIs POI1, POI2 and POI3. The POIs are overlaid over actual image data being real time viewed on the device via an LCD screen or like display. The actual image data can be of products on a shelf or other display or exhibit in a store. Thus, as the user aims the camera around his or her environment, the lens becomes the pointer, and the POI information can be overlaid intelligently for discovery of endpoints of interest. Moreover, a similar embodiment can be imagined even without a camera, such as a UI in which 3-D objects are virtually represented based on real geometries known for the objects relative to the user. Thus, the device UI can be implemented consistent with a camera, or a virtual camera, view for intuitive use of such devices. The pointer mechanism of the device could also switch based on whether the user was currently in live view mode for the camera or not. Moreover, assuming sufficient processing power and storage, real time image processing could discern an object of interest and based on image signatures, overlay POI information over such image in a similar manner to the above embodiments. In this regard, with the device provided herein, a variety of gestures can be employed to zoom in zoom out, perform tilt detection for looking down or up, or panning across a field of view to obtain a range of POIs associated with the panning scope.

With respect to a representative set of user settings, a number or maximum number of desired endpoints delivered as results can be configured. How to filter can also be configured, e.g., 5 most likely, 5 closest, 5 closest to 100 feet away, 5 within category or sub-category, alphabetical order, etc. In each case, based on a pointing direction, implicitly a cone or other cross section across physical space is defined as a scope of possible points of interest. In this regard, the width or deepness of this cone or cross section can be configurable by the user to control the accuracy of the pointing, e.g., narrow or wide radius of points and how far out to search.

To support processing of vector information and aggregating POI databases from third parties, a variety of storage techniques, such as relational storage techniques can be used. For instance, Virtual Earth data can be used for mapping and aggregation of POI data can occur from third parties such as Tele Atlas, NavTeq, etc. In this regard, businesses not in the POI database will want to be discovered and thus, the service provides a similar, but far superior from a spatial relevance standpoint, Yellow Pages experiences where businesses will desire to have their additional information, such as menus, price sheets, coupons, pictures, virtual tours, etc. accessible via the system.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about in the here and in the now through the act of pointing with the device, the system generates high cost per thousand impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

As mentioned, different location subsystems, such as tower triangulation, GPS, A-GPS, E-GPS, etc. have different tolerances. For instance, with GPS, tolerances can be achieved to about 10 meters. With A-GPS, tolerances can be tightened to about 12 feet. In turn, with E-GPS, tolerance may be a different error margin still. Compensating for the different tolerances is part of the interpretation engine for determining intersection of a pointing vector and a set of points of interest. In addition, as shown in FIGS. 39-42, a distance to project out the pointing vector can be explicit, configurable, contextual, etc.

In this regard, the various embodiments described herein can employ any algorithm for distinguishing among boundaries of the endpoints, such as boundary boxes, or rectangles, triangles, circles, etc. As a default radius, e.g., 150 feet could be selected, and such value can be configured or be context sensitive to the service provided. On-line real estate sites can be leveraged for existing POI information. Since different POI databases may track different information at different granularities, a way of normalizing the POI data according to one convention or standard can also be implemented so that the residential real estate location data of Zillow can be integrated with GPS information from Starbucks of all the Starbucks by country.

In addition, similar techniques can be implemented in a moving vehicle client that includes GPS, compass, accelerometer, etc. By filtering based on scenarios (e.g., I need gas), different subsets of points of interest (e.g., gas stations) can be determined for the user based not only on distance, but actual time it may take to get to the point of interest. In this regard, while a gas station may be 100 yards to the right off the highway, the car may have already passed the corresponding exit, and thus more useful information to provide is what gas station will take the least amount of time to drive from a current location based on direction/location so as to provide predictive points of interest that are up ahead on the road, and not already aged points of interest that would require turning around from one's destination in order to get to them.

For existing motor vehicle navigation devices, or other conventional portable GPS navigation devices, where a device does not natively include directional means such as a compass, the device can have an extension slot that accommodates direction information from an external directional device, such as a compass. Similarly, for laptops or other portable electronic devices, such devices can be outfitted with a card or board with a slot for a compass. While any of the services described herein can make web service calls as part of the pointing and retrieval of endpoint process, as mentioned, one advantageous feature of a user's locality in real space is that it is inherently more limited than a general Internet search for information. As a result, a limited amount of data can be predictively maintained on a user's device in cache memory and properly aged out as data becomes stale.

Figure 46:
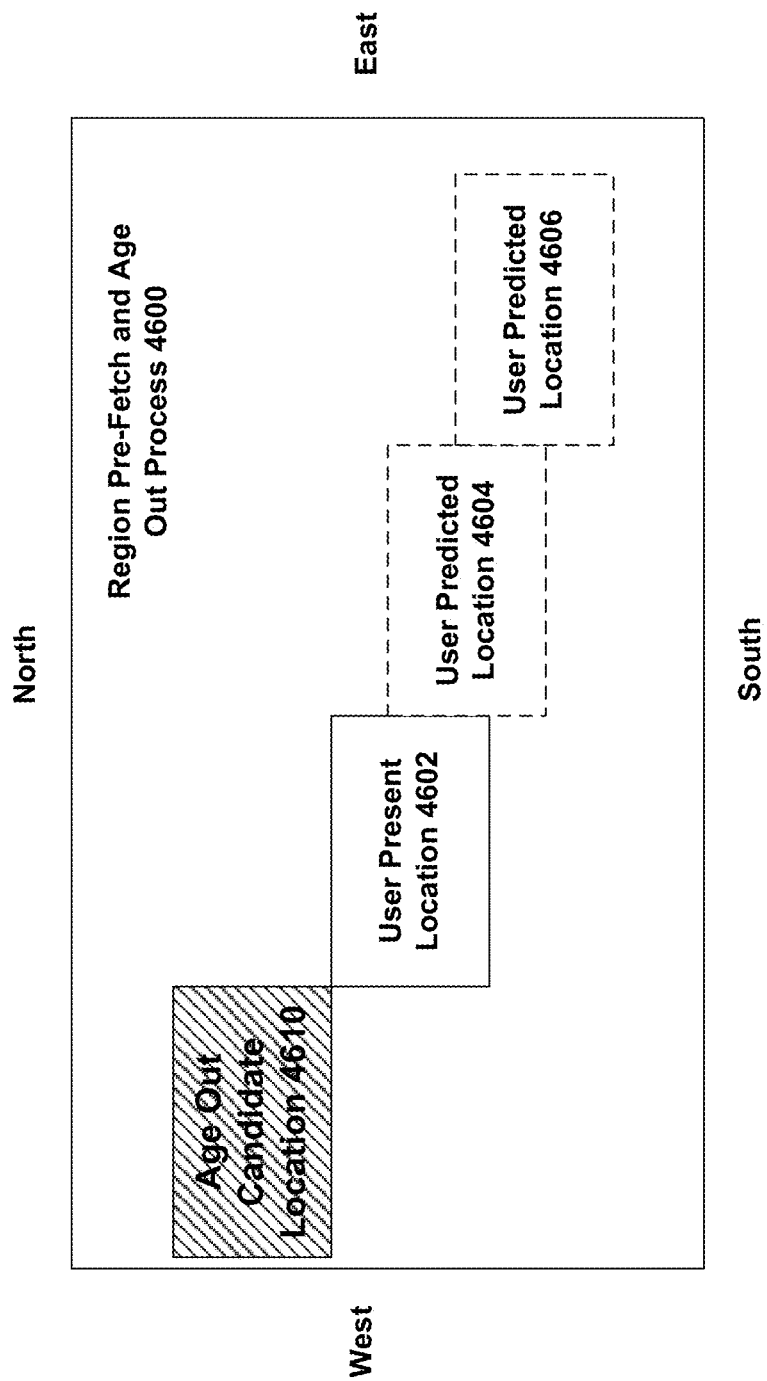
FIG. 46 illustrates a process for predicting points of interest and aging out old points of interest in a region-based algorithm.

While there are a variety of implementations, and ways to sub-divide regions, whether overlapping or not, predictive caching and aging 4600 is conceptually illustrated by FIG. 46 in which a user's present location 4602 is discerned. At this point, the local cache still includes age out candidate location 4610, but as the velocity of the user indicates the user will be at predicted locations 4604 and 4606 in the future, these regions of POIs are downloaded to the mobile device. Accordingly, as the user travels to predicted location 4606, it starts to be clear that the user no longer needs the data from the age out candidate location 4610, which can then be removed, or flagged for removal when storage is challenged.

Accordingly, using the regional data cache, callbacks and an update mechanism that is updated dynamically based on movement, new point of interest can be added by a service or by a user. Update is thus performed continuously or substantially continuously based on updated travel, velocity, speed, etc. In this regard, a user can add a new point of interest in the region, add info to a local cache, and then upload to the zone. To appreciate the problem, the number of worldwide POIs is practically limitless, however only a small number of POIs will be relevant to a user at a given time. Thus, predictively, a cube of data can be taken to the device, the user can go offline such that when the user reconnects, the device is intelligent to figure out what has changed, been weighted, etc., so that the device can synchronize with the network services and expose the user's changes for other people.

The predictive algorithms again depend on what the user is interested in finding, what service the user may be using, the context of the user, etc. They can also be based on velocity, direction, time, etc. For instance, if it is nighttime, assumptions based on demographics or preferences may lead the device to return information about nightclubs or all night diners. Or, instead of giving directions as driving directions that calculate distances as absolute distances, i.e., as the crow flies, a device can take road curves into account since instantaneous pointing information on roads can be collected and handled by a corresponding service when giving driving directions. Or, as another alternative, the direction one is heading on a road, such as a highway with a concrete divider, is relevant to the directions that a navigation system should give. Where a U-turn is unavailable and user passes an exit with a point of interest, for instance, directions should take this into account and consider the heading of the vehicle.

Any device can include the embodiments described herein, including MP3 players, such as a Zune device, GPS navigation devices, bike computers, sunglass/visor systems, motor vehicles, mobile phones, laptops, PDA, etc.

One way to obtain the service applications, assuming the underlying measuring instruments to participate in the real-time gathering of directional information, is to message to a service to obtain the application, e.g., by text messaging to service, or getting a client download link. Another vehicle for enabling the service is to provide it natively in the operating system or applications of a mobile devices. Since a hardware abstraction layer accommodates different methods for collecting position, direction, acceleration information, the same platform can be used on any device regardless of the precise underlying hardware.

In another aspect of any of the embodiments described herein, because stateless messaging is employed, if communications drop with one network, the device can begin further communicating via another network. For instance, a device has two channels, and a user gets on a bus, but no longer have GPRS or GPS activity. Nonetheless the user is able to get the information the device needs from some other channel. Just because a tower, or satellites are down, does not mean that the device cannot connect through an alternative channel, e.g., the bus's GPS location information via Bluetooth.

With respect to exemplary mobile client architectures, a representative device can include, as described variously herein, client Side Storage for housing and providing fast access to cached POI data in the current region including associated dynamically updated or static information, such as annotations, coupons from businesses, etc. This includes usage data tracking and storage. In addition, regional data can be a cached subset of the larger service data, always updated based on the region in which the client is roaming. For instance, POI data could include as a non-limiting example, the following information:

POI coordinates and data //{-70.26322, 43.65412, "STARBUCK'S"}

Localized annotations //Menu, prices, hours of operation, etc

Coupons and ads //Classes of coupons (new user, returning, etc)

Support for different kinds of information (e.g., blob v structured information (blob for storage and media; structured for tags, annotations, etc.)

A device can also include usage data and preferences to hold settings as well as usage data such as coupons "activated," waypoints, businesses encountered per day, other users encountered, etc. to be analyzed by the cloud services for business intelligence analysis and reporting.

A device can also include a continuous update mechanism, which is a service that maintains the client's cached copy of a current region updated with the latest. Among other ways, this can be achieved with a ping-to-pull model that pre-fetches and swaps out the client's cached region using travel direction and speed to facilitate roaming among different regions. This is effectively a paging mechanism for upcoming POIs. This also includes sending a new or modified POI for the region (with annotations+coupons), sending a new or modified annotation for the POIs (with coupons), or sending a new or modified coupon for the POI.

A device can also include a Hardware Abstraction Layer (HAL) having components responsible for abstracting the way the client communicates with the measuring instruments, e.g., the GPS driver for positioning and LOS accuracy (e.g., open eGPS), magnetic compass for heading and rotational information (e.g., gyroscopic), one or more accelerometers for gestured input and tilt (achieves 3D positional algorithms, assuming gyroscopic compass).

As described earlier, a device can also include methods/interfaces to make REST calls via GPRS/Wi-Fi and a file system and storage for storing and retrieving the application data and settings.

A device can also include user input and methods to map input to the virtual keys. For instance, one non-limiting way to accomplish user input is to have softkeys as follows, though it is to be understood a great variety of user inputs can be used to achieve interaction with the user interfaces of the pointing based services.

SK up/down: //Up and down on choices

SK right, SK ok/confirm: //Choose an option or drill down/next page

SK left, SK cancel/back, //Go back to a previous window, cancel

Exit/Incoming Call events //Exit the app or minimize

In addition, a representative device can include a graphics and windowing stack to render the client side UI, as well as an audio stack to play sounds/alerts.

As mentioned, such a device may also include spatial and math computational components including a set of APIs to perform 3D collision testing between subdivided surfaces such as spherical shells (e.g., a simple hit testing model to adopt and boundary definitions for POIs), rotate points, and cull as appropriate from conic sections.

Figure 47:
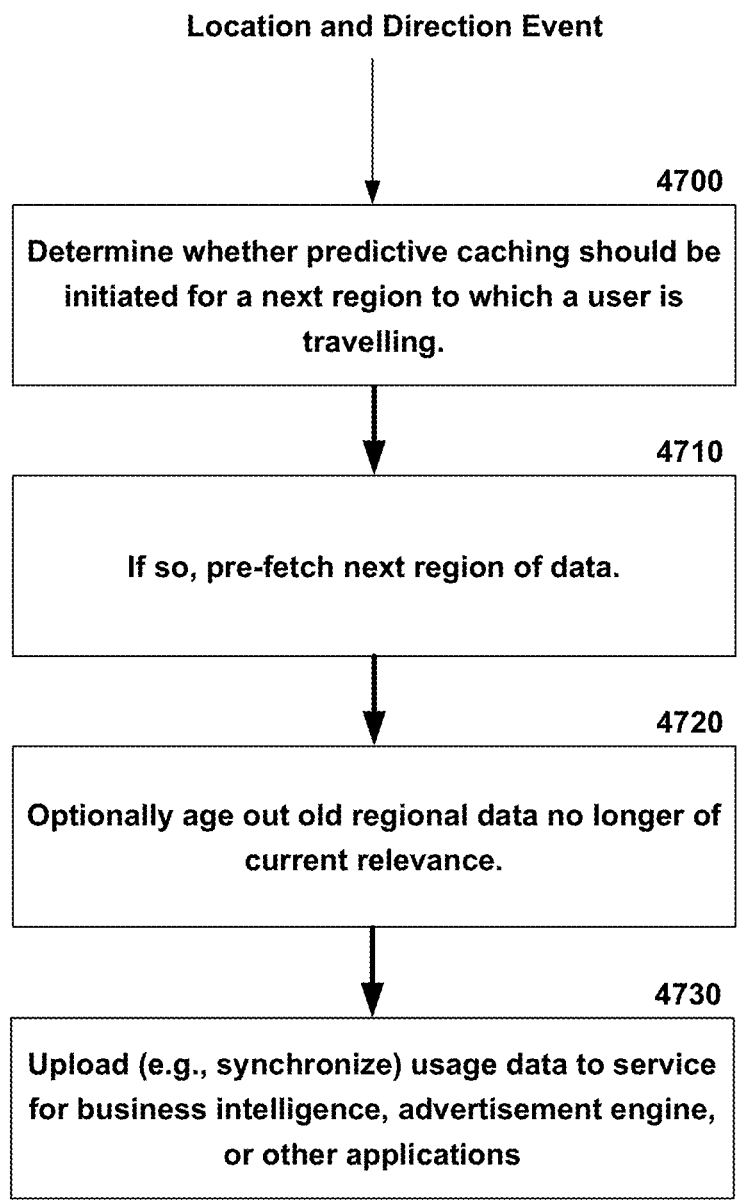
FIG. 47 illustrates a first process for a device upon receiving a location and direction event.
Figure 48:
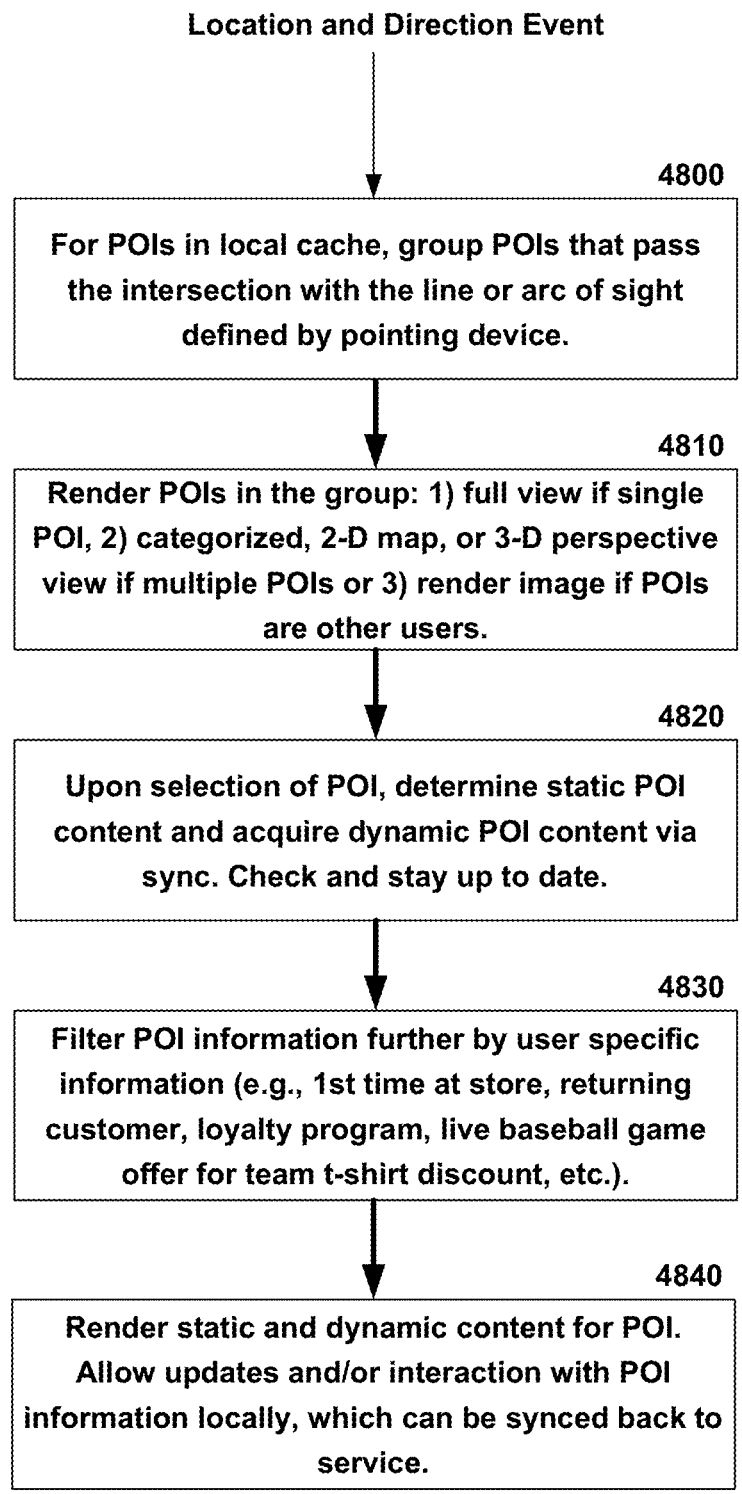
FIG. 48 illustrates a second process for a device upon receiving a location and direction event.

As described in various embodiments herein, FIGS. 47 and 48 illustrate two processes for a device when location (e.g., GPS) and direction (e.g., compass) events occur. In FIG. 47, upon the occurrence of a location or direction event, at 4700, it is determined whether predictive caching should be initiated for a next region to which a user is travelling. At 4710, if so, then the next region of data can be pre-fetched. At 4720, old regional data no longer of relevance can be aged out. At 4730, any usage data can be uploaded to the service framework for business intelligence, input to an advertisement engine, etc.

FIG. 48 represents another process for filtering potential POIs after a pointing event. Upon the detection of a location and direction event, at 4800, for POIs in the device's local cache, a group of POIs are determined that pass an intersection algorithm for the direction of pointing of the device. At 4810, POIs in the group can be represented in some fashion on a UI, e.g., full view if only 1 POI, categorized view, 2-D map view, 3-D perspective view, or user images if other users, etc. The possibilities for representation are limitless; the embodiments described herein are intuitive based on the general notion of pointing based direction services.

At 4820, upon selection of a POI, static content is determined and any dynamic content is acquired via synchronization. When new data becomes available, it is downloaded to stay up to date. At 4830, POI information is filtered further by user specific information (e.g., if it is the user's first time at the store, returning customer, loyalty program member, live baseball game offer for team clothing discounts, etc.). At 4840, static and dynamic content that is up to date is rendered for the POI. In addition, updates and/or interaction with POI information is allowed which can be synced back to the service.

Exemplary Networked and Distributed Environments

One of ordinary skill in the art can appreciate that the various embodiments of methods and devices for pointing based services and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 49:
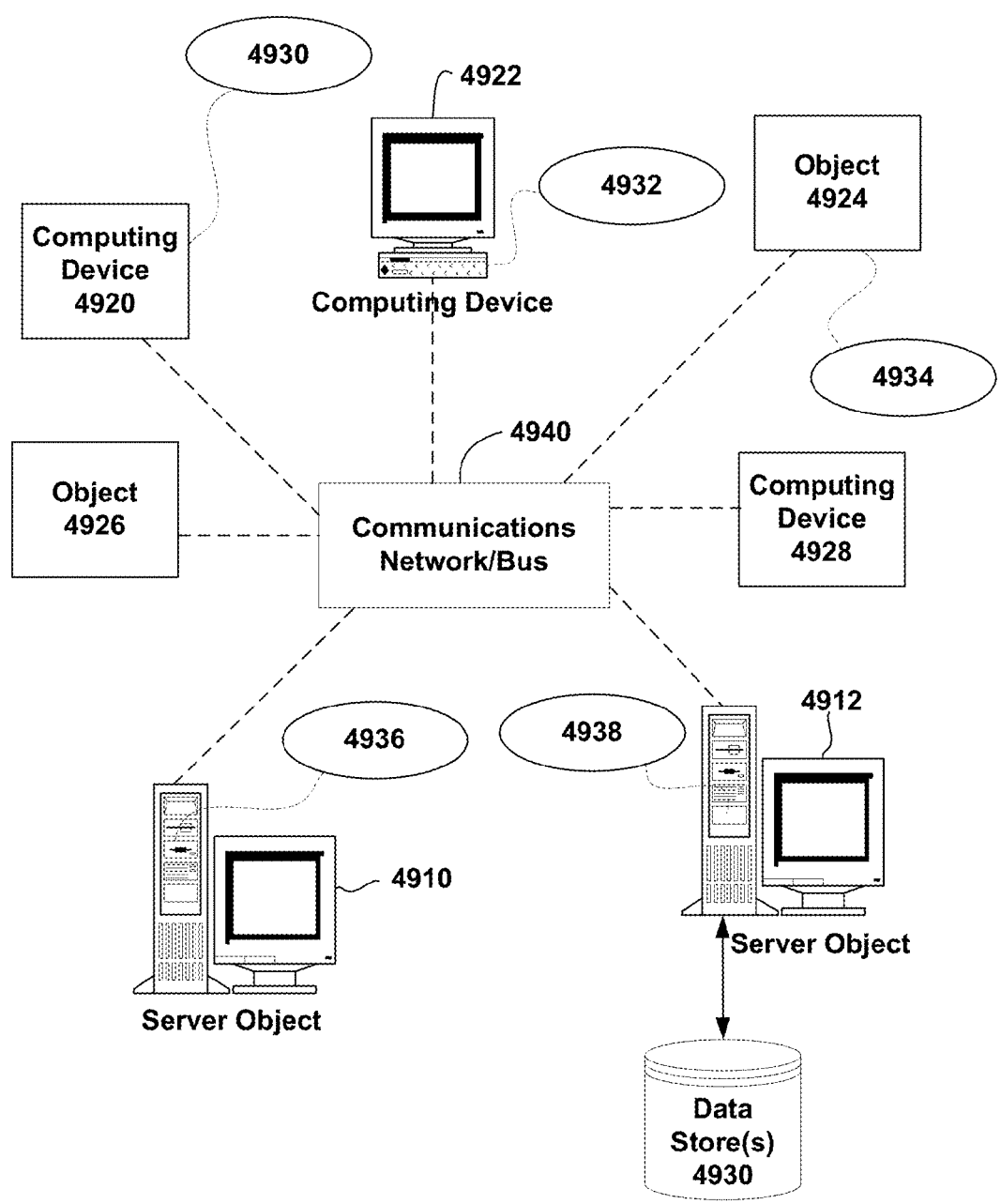
FIG. 49 is a block diagram representing an exemplary non-limiting networked environment in which embodiment(s) may be implemented.

FIG. 49 provides a non-limiting schematic diagram of an exemplary networked or distributed computing environment. The distributed computing environment comprises computing objects 4910, 4912, etc. and computing objects or devices 4920, 4922, 4924, 4926, 4928, etc., which may include programs, methods, data stores, programmable logic, etc., as represented by applications 4930, 4932, 4934, 4936, 4938. It can be appreciated that objects 4910, 4912, etc. and computing objects or devices 4920, 4922, 4924, 4926, 4928, etc. may comprise different devices, such as PDAs, audio/video devices, mobile phones, MP3 players, laptops, etc.

Each object 4910, 4912, etc. and computing objects or devices 4920, 4922, 4924, 4926, 4928, etc. can communicate with one or more other objects 4910, 4912, etc. and computing objects or devices 4920, 4922, 4924, 4926, 4928, etc. by way of the communications network 4940, either directly or indirectly. Even though illustrated as a single element in FIG. 49, network 4940 may comprise other computing objects and computing devices that provide services to the system of FIG. 49, and/or may represent multiple interconnected networks, which are not shown. Each object 4910, 4912, etc. or 4920, 4922, 4924, 4926, 4928, etc. can also contain an application, such as applications 4930, 4932, 4934, 4936, 4938, that might make use of an API, or other object, software, firmware and/or hardware, suitable for communication with or implementation of the user profiling in a transaction and advertising platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 49, as a non-limiting example, computers 4920, 4922, 4924, 4926, 4928, etc. can be thought of as clients and computers 4910, 4912, etc. can be thought of as servers where servers 4910, 4912, etc. provide data services, such as receiving data from client computers 4920, 4922, 4924, 4926, 4928, etc., storing of data, processing of data, transmitting data to client computers 4920, 4922, 4924, 4926, 4928, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 4940 is the Internet, for example, the servers 4910, 4912, etc. can be Web servers with which the clients 4920, 4922, 4924, 4926, 4928, etc. communicate via any of a number of known protocols, such as the hypertext transfer protocol (HTTP). Servers 4910, 4912, etc. may also serve as clients 4920, 4922, 4924, 4926, 4928, etc., as may be characteristic of a distributed computing environment.

Exemplary Computing Device

As mentioned, various embodiments described herein apply to any device wherein it may be desirable to perform pointing based services. It should be understood, therefore, that handheld, portable and other computing devices and computing objects of all kinds are contemplated for use in connection with the various embodiments described herein, i.e., anywhere that a device may request pointing based services. Accordingly, the below general purpose remote computer described below in FIG. 50 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 50:
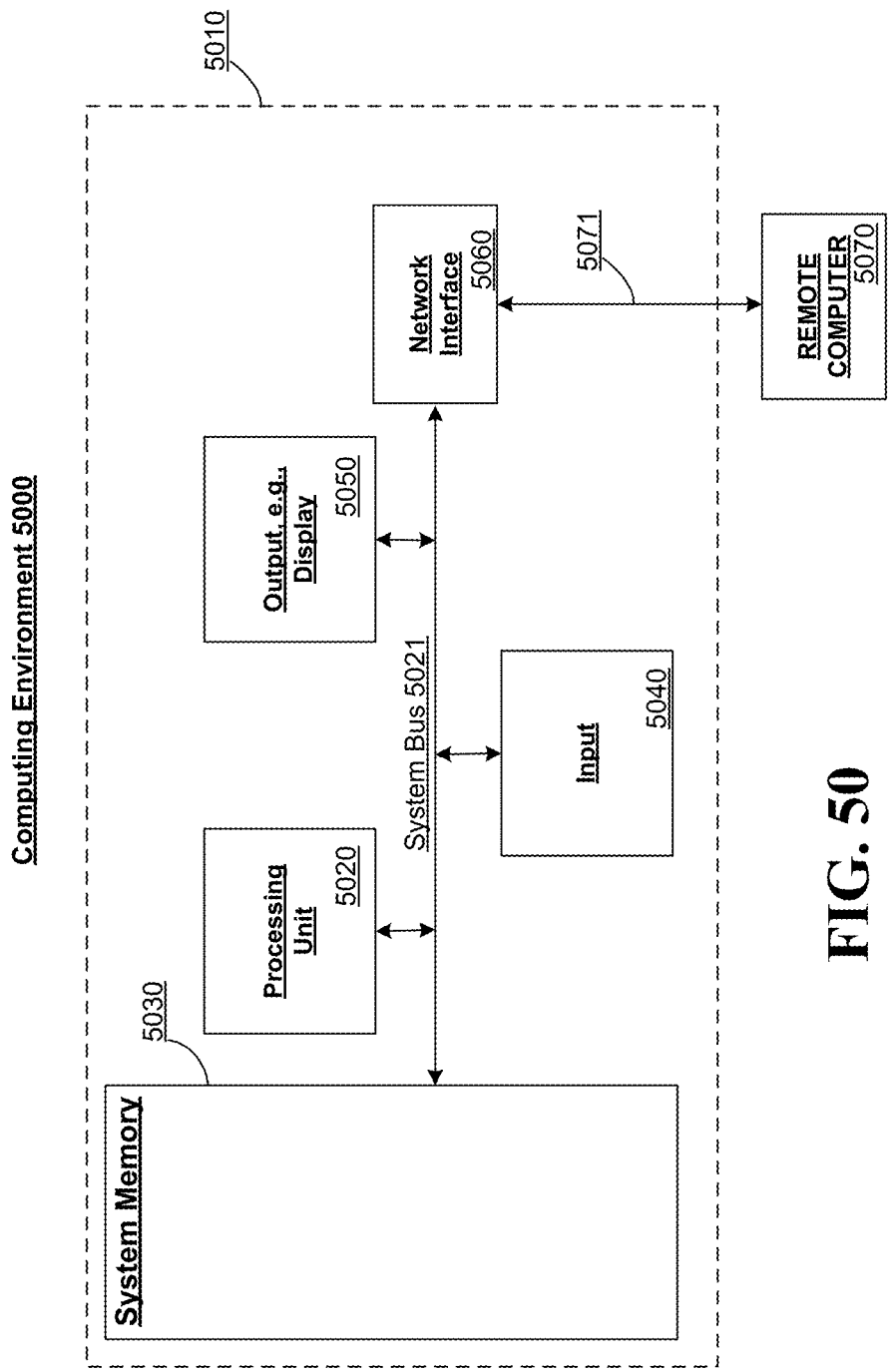
FIG. 50 is a block diagram representing an exemplary non-limiting computing system or operating environment in which aspects of embodiment(s) may be implemented.

FIG. 50 thus illustrates an example of a suitable computing system environment 5000 in which one or more of the embodiments may be implemented, although as made clear above, the computing system environment 5000 is only one example of a suitable computing environment and is not intended to suggest any limitation as to the scope of use or functionality of any of the embodiments. Neither should the computing environment 5000 be interpreted as having any dependency or requirement relating to any one or combination of components illustrated in the exemplary operating environment 5000.

With reference to FIG. 50, an exemplary remote device for implementing one or more embodiments herein can include a general purpose computing device in the form of a handheld computer 5010. Components of handheld computer 5010 may include, but are not limited to, a processing unit 5020, a system memory 5030, and a system bus 5021 that couples various system components including the system memory to the processing unit 5020.

Computer 5010 typically includes a variety of computer readable media and can be any available media that can be accessed by computer 5010. The system memory 5030 may include computer storage media in the form of volatile and/or nonvolatile memory such as read only memory (ROM) and/or random access memory (RAM). By way of example, and not limitation, memory 5030 may also include an operating system, application programs, other program modules, and program data.

A user may enter commands and information into the computer 5010 through input devices 5040 A monitor or other type of display device is also connected to the system bus 5021 via an interface, such as output interface 5050. In addition to a monitor, computers may also include other peripheral output devices such as speakers and a printer, which may be connected through output interface 5050.

The computer 5010 may operate in a networked or distributed environment using logical connections to one or more other remote computers, such as remote computer 5070. The remote computer 5070 may be a personal computer, a server, a router, a network PC, a peer device or other common network node, or any other remote media consumption or transmission device, and may include any or all of the elements described above relative to the computer 5010. The logical connections depicted in FIG. 50 include a network 5071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method, implemented at a portable computing device that includes one or more processors, for displaying different views at the portable computing device, the method comprising:
   receiving a first gesture at the portable computing device, the first gesture received at a physical location, the first gesture comprising one or more physical movements of the portable computing device in which one or more detected change in motion, direction or orientation of the portable computing device is used to define the first gesture;
   based on receiving the first gesture:
      displaying a two-dimensional (2D) map-based view of a geographical area corresponding to the physical location based on location and direction information measured by the portable computing device; and
      displaying at least one indication of a particular point of interest that is contextually relevant to the portable computing device within the 2D map-based view of the geographical area; and
   receiving a second gesture at the portable computing device, the second gesture received at the physical location, the second gesture comprising one or more physical movements of the portable computing device in which one or more detected change in motion, direction or orientation of the portable computing device is used to define the second gesture;
   based on receiving the second gesture:
      displaying a three-dimensional (3D) perspective view of the geographical area instead of the 2D map-based view of the geographical area; and
      displaying at least one indication of the particular point of interest within the 3D perspective view of the geographical area.

2. The method of claim 1, wherein receiving the first gesture comprises detecting a first type of physical motion of the portable computing device.

3. The method of claim 2, wherein receiving the second gesture comprises detecting a second type of physical motion of the portable computing device.

4. The method of claim 1, wherein the 2D map-based view of the geographical area comprises a topographical map.

5. The method of claim 1, wherein the 3D perspective view of the geographical area comprises an image view of a real space as captured by a camera at the portable computing device, and wherein the at least one indication of the particular point of interest is overlaid over the image view of the real space.

6. The method of claim 1, further comprising:
   receiving a third gesture comprising a tilting of the portable computing device.

7. The method of claim 6, further comprising:
   in response to receiving the third gesture, zooming the 2D map-based view of the geographical area or the 3D perspective view of the geographical area.

8. The method of claim 6, further comprising:
   in response to receiving the third gesture, displaying one or more additional details about the particular point of interest.

9. A computer program product comprising one or more physical storage media having stored thereon computer-executable instruction that, when executed by one or more processors of a portable computing device, cause the portable computing device to implement a method for displaying different views at the portable computing device, including the following:
   receiving a first gesture at the portable computing device, the first gesture received at a physical location, the first gesture comprising one or more physical movements of the portable computing device in which one or more detected change in motion, direction or orientation of the portable computing device is used to define the first gesture;
   based on receiving the first gesture:
      displaying a two-dimensional (2D) map-based view of a geographical area corresponding to the physical location based on location and direction information measured by the portable computing device; and displaying at least one indication of a particular point of interest that is contextually relevant to the portable computing device within the 2D map-based view of the geographical area; and receiving a second gesture at the portable computing device, the second gesture received at the physical location, the second gesture comprising one or more physical movements of the portable computing device in which one or more detected change in motion, direction or orientation of the portable computing device is used to define the second gesture;

based on receiving the second gesture:
   displaying a three-dimensional (3D) perspective view of the geographical area instead of the 2D map-based view of the geographical area; and
   displaying at least one indication of the particular point of interest within the 3D perspective view of the geographical area.

10. The computer program product of claim 9, wherein receiving the first gesture comprises detecting a first type of physical motion of the portable computing device.

11. The computer program product of claim 9, wherein receiving the second gesture comprises detecting a second type of physical motion of the portable computing device.

12. The computer program product of claim 9, wherein the 2D map-based view of the geographical area comprises a topographical map.

13. The computer program product of claim 9, wherein the 3D perspective view of the geographical area comprises an image view of a real space as captured by a camera at the portable computing device, and wherein the at least one indication of the particular point of interest is overlaid over the image view of the real space.

14. The computer program product of claim 9, further comprising:
   receiving a third gesture comprising a tilting of the portable computing device.

15. The computer program product of claim 14, further comprising:
   in response to receiving the third gesture, zooming the 2D map-based view of the geographical area or the 3D perspective view of the geographical area.

16. The computer program product of claim 14, further comprising:
   in response to receiving the third gesture, displaying one or more additional details about the particular point of interest.

17. A computer system, comprising:
one or more processors; and
one or more computer-readable media having stored thereon computer-executable instruction that, when executed by one or more processors of a portable computing device, cause the portable computing device to implement a method for displaying different views at the portable computing device, including the following:
   receiving a first gesture at the portable computing device, the first gesture received at a physical location, the first gesture comprising one or more physical movements of the portable computing device in which one or more detected change in motion, direction or orientation of the portable computing device is used to define the first gesture;
   based on receiving the first gesture:
     displaying a two-dimensional (2D) map-based view of a geographical area corresponding to the physical location based on location and direction information measured by the portable computing device; and
     displaying at least one indication of a particular point of interest that is contextually relevant to the portable computing device within the 2D map-based view of the geographical area;
   receiving a second gesture at the portable computing device, the second gesture received at the physical location, the second gesture comprising one or more physical movements of the portable computing device in which one or more detected change in motion, direction or orientation of the portable computing device is used to define the second gesture;
   based on receiving the second gesture:
     displaying a three-dimensional (3D) perspective view of the geographical area instead of the 2D map-based view of the geographical area; and
     displaying at least one indication of the particular point of interest within the 3D perspective view of the geographical area; and
   while displaying the 3D perspective view of the geographical area or the 2D map-based view of the geographical area, receiving a third gesture comprising a tilting of the portable computing device, the third gesture comprising one or more physical movements of the portable computing device in which one or more detected change in motion, direction or orientation of the portable computing device is used to define the third gesture;
   based on receiving the third gesture:
     zooming the 2D map-based view of the geographical area or the 3D perspective view of the geographical area; or
     displaying one or more additional details about the particular point of interest.

18. The computer system of claim 17, wherein zooming the 2D map-based view of the geographical area or the 3D perspective view of the geographical area comprises increasing or decreasing the granularity of information displayed on the 2D map-based view or the 3D perspective view.

19. The computer system of claim 17, wherein displaying at least one indication of a particular point of interest comprises displaying a plurality of points of interest.

20. The computer system of claim 19, wherein the plurality of points of interest include one or more of venues within a determined distance from the portable device, one or more properties for sale within a determined distance from the portable device, or one or more people within a determined distance from the portable device.

* * * * *